United States Patent
Heckmeier et al.

(10) Patent No.: US 7,419,706 B2
(45) Date of Patent: Sep. 2, 2008

(54) LIQUID CRYSTALLINE MEDIUM

(75) Inventors: Michael Heckmeier, Hemsbach (DE); Achim Goetz, Alsbach-Hähnlein (DE); Markus Czanta, Darmstadt (DE); John Patrick, Poole (GB); Louise Diane Farrand, Dorset (GB); Cecile Schott, Southampton (GB); Elvira Montenegro, Weinheim (DE); Peer Kirsch, Kanagawa (JP)

(73) Assignee: Merck Patent Gesellschaft mit Beschrankter Haftung, Darmstadt (DE)

( * ) Notice: Subject to any disclaimer, the term of this patent is extended or adjusted under 35 U.S.C. 154(b) by 0 days.

(21) Appl. No.: 10/569,460

(22) PCT Filed: Aug. 3, 2004

(86) PCT No.: PCT/EP2004/008678

§ 371 (c)(1),
(2), (4) Date: Feb. 24, 2006

(87) PCT Pub. No.: WO2005/019381

PCT Pub. Date: Mar. 3, 2005

(65) Prior Publication Data

US 2006/0210724 A1  Sep. 21, 2006

(30) Foreign Application Priority Data

Aug. 25, 2003 (EP) .................. 03018709

(51) Int. Cl.
- C09K 19/30 (2006.01)
- C09K 19/32 (2006.01)
- C09K 19/34 (2006.01)
- C09K 19/12 (2006.01)
- C09K 19/20 (2006.01)

(52) U.S. Cl. .............. 428/1.1; 252/299.61; 252/299.62; 252/299.63; 252/299.66; 252/299.67

(58) Field of Classification Search .................. 428/1.1; 252/299.61, 299.62, 299.63, 299.66, 299.67
See application file for complete search history.

(56) References Cited

U.S. PATENT DOCUMENTS

| | | |
|---|---|---|
| 6,177,154 B1 | 1/2001 | Matsui et al. |
| 6,902,777 B2 * | 6/2005 | Hirschmann et al. .......... 428/1.1 |
| 7,056,561 B2 * | 6/2006 | Heckmeier et al. ............ 428/1.1 |
| 7,175,891 B2 * | 2/2007 | Heckmeier et al. ............ 428/1.3 |
| 7,189,440 B2 * | 3/2007 | Manabe et al. ................ 428/1.3 |
| 2003/0234384 A1 * | 12/2003 | Heckmeier et al. ...... 252/299.63 |
| 2004/0016906 A1 | 1/2004 | Kondo et al. |
| 2004/0112275 A1 * | 6/2004 | Heckmeier et al. .............. 117/2 |
| 2004/0140452 A1 * | 7/2004 | Hirschmann et al. ... 252/299.61 |
| 2004/0150633 A1 | 8/2004 | Heckmeier et al. |
| 2005/0040365 A1 * | 2/2005 | Heckmeier et al. ...... 252/299.63 |
| 2005/0179007 A1 * | 8/2005 | Manabe et al. ........ 252/299.61 |
| 2005/0205842 A1 * | 9/2005 | Heckmeier et al. ..... 252/299.61 |
| 2006/0061699 A1 * | 3/2006 | Kirsch et al. ................. 349/24 |

FOREIGN PATENT DOCUMENTS

| | | |
|---|---|---|
| DE | 102 17 273 A | 12/2002 |
| DE | 102 41 301 A | 3/2004 |
| EP | 1 182 186 A | 2/2002 |
| EP | 1335014 | * 8/2003 |
| WO | WO 2004/048501 A | 6/2004 |

\* cited by examiner

*Primary Examiner*—Shean C Wu
(74) *Attorney, Agent, or Firm*—Millen, White, Zelano & Branigan, P.C.

(57) ABSTRACT

The present invention relates to a liquid crystalline mixture comprising a) 1-25% by weight of at least one compound of the formula I

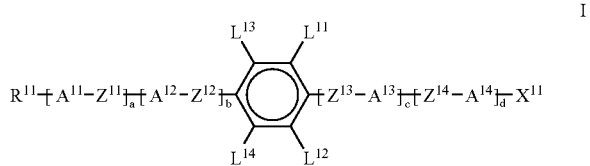

b) 5-80% by weight of at least one compound of the formula II

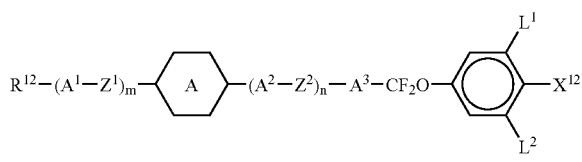

c) and optionally 1-20% by weight of at least one chiral compound with a HTP of $\leq 20$ μm, wherein
$R^{11}, A^{11}, Z^{11}, A^{12}, Z^{12}, L^{11}, L^{12}, L^{13}, L^{14}, Z^{13}, A^{13}, Z^{14}, A^{14}, X^{11}$, a, b, c, d, $R^{12}, A^1, Z^1$,

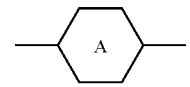

$A^2, Z^2, A^3, L^1, L^2, X^{12}$, m and n have the meanings given in claim 1 and their use in TFT, TN, IPS applications and expecially for devices utilizing electro-optical effects in an optically isotropic state.

20 Claims, No Drawings

LIQUID CRYSTALLINE MEDIUM

The present invention is related to a liquid crystal medium and the use of said media in electro-optical devices, and especially for the use in electro-optical devices that may be operated in an optically isotropic state.

Liquid crystals are used generally as dielectrics in display devices, since the optical properties of such substances can be modified by an applied voltage. Electro-optical devices based on liquid crystals are extremely well known to the person skilled in the art and can be based on various effects. Examples of such devices are cells having dynamic scattering, DAP (deformation of aligned phases) cells, guest/host cells, TN cells having a twisted nematic structure, STN (supertwisted nematic) cells, SBE (super-birefringence effect) cells and OMI (optical mode interference) cells. The most common display devices are based on the Schadt-Helfrich effect and have a twisted nematic structure.

The liquid crystal materials must have good chemical and thermal stability and good stability to electric fields and electromagnetic radiation. Furthermore, the liquid crystal materials should have low viscosity and produce short addressing times, low threshold voltages and high contrast in the cells.

They should furthermore have a suitable mesophase, for example a nematic or cholesteric mesophase for the above-mentioned cells, at the usual operating temperatures, i.e. in the broadest possible range above and below room temperature. Since liquid crystals are generally used as mixtures of a plurality of components, it is important that the components are readily miscible with one another. Further properties, such as the electrical conductivity, the dielectric anisotropy and the optical anisotropy, have to satisfy various requirements depending on the cell type and area of application. For example, materials for cells having a twisted nematic structure should have positive dielectric anisotropy and low electrical conductivity.

For example, for matrix liquid crystal displays with integrated non-linear elements for switching individual pixels (MLC displays), media having large positive dielectric anisotropy, broad nematic phases, relatively low birefringence, very high specific resistance, good UV and temperature stability and low vapour pressure are desired.

Matrix liquid crystal displays of this type are known. Non-linear elements which can be used for individual switching of the individual pixels are, for example, active elements (i.e. transistors). The term "active matrix" is then used, where a distinction can be made between two types:

1. MOS (metal oxide semiconductor) or other diodes on a silicon wafer as substrate.
2. Thin-film transistors (TFTs) on a glass plate as substrate.

The use of single-crystal silicon as substrate material restricts the display size, since even modular assembly of various part-displays results in problems at the joins.

In the case of the more promising type 2, which is preferred, the electro-optical effect used is usually the TN effect. A distinction is made between two technologies: TFTs comprising compound semiconductors, such as, for example, CdSe, or TFTs based on polycrystalline or amorphous silicon. Intensive work is being carried out world-wide on the latter technology.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully colour-capable displays, in which a mosaic of red, green and blue filters is arranged in such a way that a filter element is opposite each switchable pixel.

The TFT displays usually operate as TN cells with crossed polarisers in transmission and are illuminated from the back.

The term MLC displays here covers any matrix display with integrated non-linear elements, i.e., besides the active matrix, also displays with passive elements, such as varistors or diodes (e.g. MIM diodes=metal-insulator-metal).

MLC displays of this type are particularly suitable for TV applications (for example pocket TVs) or for high-information displays for computer applications (laptops) and in automobile or aircraft construction. Besides problems regarding the angle dependence of the contrast and the response times, difficulties also arise in MLC displays due to insufficiently high specific resistance of the liquid crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210-288 Matrix LCD Controlled by Double Stage Diode Rings, p. 141 ff, Paris; STROMER, M., Proc. Eurodisplay 84, September 1984: Design of Thin Film Transistors for Matrix Addressing of Television Liquid Crystal Displays, p. 145 ff, Paris]. With decreasing resistance, the contrast of an MLC display deteriorates, and the problem of after-image elimination may occur. Since the specific resistance of the liquid crystal mixture generally drops over the life of an MLC display owing to interaction with the interior surfaces of the display, a high (initial) resistance is very important in order to obtain acceptable service lives. In particular in the case of low-volt mixtures, it was hitherto impossible to achieve very high specific resistance values. It is furthermore important that the specific resistance exhibits the smallest possible increase with increasing temperature and after heating and/or UV exposure. The low-temperature properties of the mixtures from the prior art are also particularly disadvantageous. It is demanded that no crystallisation and/or smectic phases occur, even at low temperatures. Furthermore, in order to achieve an appropriate image quality high values of the voltage holding ratio (VHR) as well as a low dependence on temperature of the VHR are required. (The VHR reflects the decrease of a voltage applied to a display pixel as a function of time; a high VHR value indicates an only slight decrease of the voltage applied.) The MLC displays from the prior art thus do not meet today's requirements.

There thus continues to be a great demand for MLC displays having very high specific resistance at the same time as a large working-temperature range, short response times even at low temperatures, low threshold voltage, high VHR values with a low temperature dependence which do not have these disadvantages, or only do so to a lesser extent.

In TN (Schadt-Helfrich) cells, media are desired which facilitate the following advantages in the cells:
  extended nematic phase range (in particular down to low temperatures)
  the ability to switch at extremely low temperatures (outdoor use, automobile, avionics)
  increased resistance to UV radiation (longer service life)
  high $\Delta\epsilon$ for low threshold voltages.

The mixture for the isotrop switching made are desired which facilitate the following advantages in the cells:
  low operating voltage
  broad operating temperature range
  large voltage holding ratio The media available from the prior art do not allow these advantages to be achieved while simultaneously retaining the other parameters.

In the case of supertwisted (STN) cells, media are desired which enable greater multiplexability and/or lower threshold voltages and/or broader nematic phase ranges (in particular at low temperatures). To this end, a further widening of the available parameter latitude (clearing point, smectic-nematic transition or melting point, viscosity, dielectric parameters, elastic parameters) is urgently desired. This applies as well to in-plane switching (IPS) cells, where the electrical field in the cell is not vertically aligned, like in TN or STN cells, but horizontally aligned.

It is therefore an object of the present invention to a liquid crystal media which do not have the above-mentioned disadvantages or only to a reduced extent and which preferably provides said media with advantageous properties such as low threshold voltages, high values of VHR and low temperature dependence of the operating voltage.

It has now been found that this object surprisingly can be achieved by the liquid crystalline medium according to the present invention.

The present invention relates to a liquid crystalline mixture consisting of a) 1-25% by weight of a component A containing at least one compound of the formula I

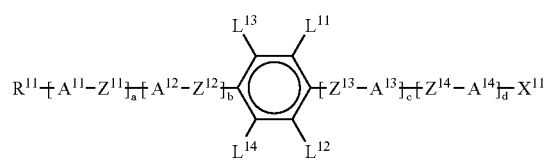

wherein a, b, c and d are each independently of each other 0, 1 or 2, whereby $a+b+c+d \leq 4$;

$R^{11}$ is an alkyl or alkoxy radical having from 1 to 15 carbon atoms, wherein one or more methylene groups of said alkyl or alkoxy radical may be replaced independently of each other by —O—, —S—, —SiR$^x$R$^y$—, —CH═CH—, —C≡C—, —CO—O— and/or —O—CO— such that oxygen and/or sulfur atoms are not linked directly to each other, said alkyl or alkoxy radical being unsubstituted or mono-substituted with a —CN group or mono- or poly-substituted with halogen;

$L^{11}$, $L^{12}$, $L^{13}$ and $L^{14}$ are each independently of each other hydrogen, halogen, a CN group, an alkyl or alkoxy radical having from 1 to 15 carbon atoms wherein one or more methylene groups of said alkyl or alkoxy radical may be replaced independently of each other by —O—, —S—, —SiR$^x$R$^y$—, —CH═CH—, —C≡C—, —CO—O— and/or —O—CO— such that oxygen and/or sulfur atoms are not linked directly to each other, said alkyl or alkoxy radical being unsubstituted or mono-substituted with a —CN group or mono- or poly-substituted with halogen, with the proviso that at least one of $L^{11}$, $L^{12}$, $L^{13}$ and $L^{14}$ is not hydrogen, $X^{11}$ is halogen, —CN, —NCS, —SF$_5$, —S—R$^z$, —SO$_{2-R^z}$, an alkyl or alkoxy radical having from 1 to 15 carbon atoms, wherein one or more methylene groups of said alkyl or alkoxy radical may be replaced independently of each other by —O—, —S—, —SiR$^x$R$^y$—, —CH═CH—, —C≡C—, —CO—O— and/or —O—CO— such that oxygen and/or sulfur atoms are not linked directly to each other, said alkyl or alkoxy radical being unsubstituted or mono-substituted with a —CN group or mono- or poly-substituted with halogen;

$R^x$ and $R^y$ are each independently of each other hydrogen or an alkyl radical having from 1 to 7 carbon atoms;

$R^z$ is an alkyl radical having from 1 to 7 carbon atoms, said alkyl radical being unsubstituted or mono- or poly-substituted with halogen;

$A^{11}$, $A^{12}$, $A^{13}$ and $A^{14}$ are each independently of each other a ring of one of the following formulas:

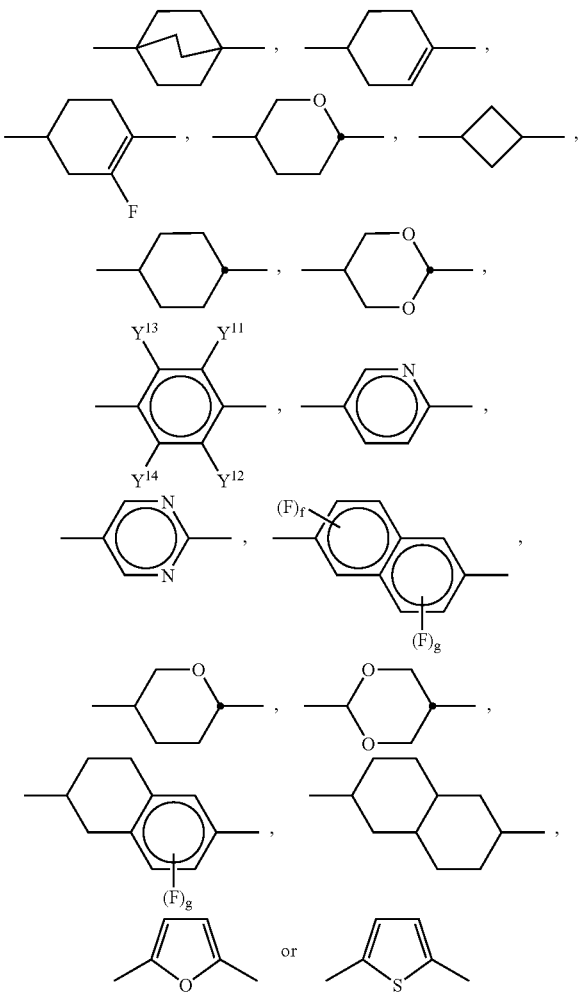

whereby each of $A^{11}$, $A^{12}$, $A^{13}$ and $A^{14}$ may be the same ring or two different rings if present twice;

$Y^{11}$, $Y^{12}$, $Y^{13}$ and $Y^{14}$ are each independently of each other hydrogen, halogen, CN, an alkyl or alkoxy radical having from 1 to 15 carbon atoms wherein one or more methylene groups of said alkyl or alkoxy radical may be replaced independently of each other by —O—, —S—, —SiR$^x$R$^y$—, —CH═CH—, —C≡C—, —CO—O— and/or —O—CO— such that oxygen and/or sulfur atoms are not linked directly to each other, said alkyl or alkoxy radical being unsubstituted or mono- or poly-substituted with halogen, f, g and h are each independently of each other 0, 1, 2 or 3;

$Z^{11}$, $Z^{12}$, $Z^{13}$ and $Z^{14}$ are independently of each other a single bond, —(CH$_2$)$_4$—, —CH$_2$CH$_2$—, —CF$_2$—CF$_2$—, —CF$_2$—CH$_2$—, —CH$_2$—CF$_2$—, —CH═CH—, —CF=CF—, —CF=CH—, —(CH$_2$)$_3$O—, —O(CH$_2$)$_3$—, —CH=CF—, —C≡C—, —CH$_2$O—, —OCH$_2$—, —CF$_2$O—, —OCF$_2$—, —CO—O— or —O—CO— whereby each of Z$^{11}$, Z$^{12}$, Z$^{13}$ and Z$^{14}$ may have the same or a different meaning if present twice;

b) 5-80% by weight of a component B containing at least one compound of the formula II

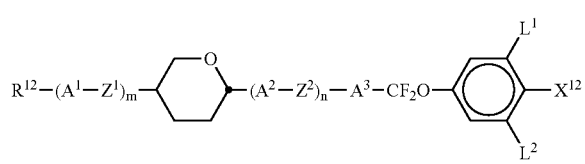

II wherein
R$^{12}$ has the meaning given for R$^{11}$
A$^1$, A$^2$, A$^3$ are each independently of each other

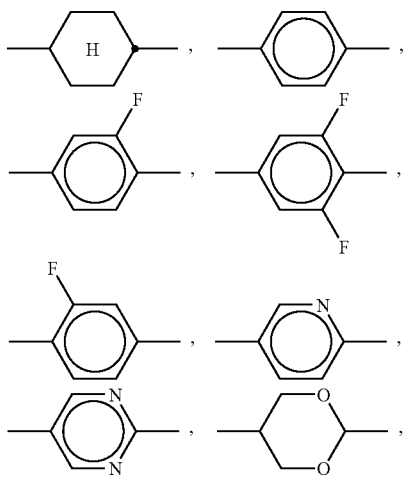

Z$^1$ and Z$^2$ are independently of each other a single bond, —(CH$_2$)$_4$—, —CH$_2$CH$_2$—, —CF$_2$—CF$_2$—, —CF$_2$—CH$_2$—, —CH$_2$—CF$_2$—, —CH=CH—, —CF=CF—, —CF=CH—, —(CH$_2$)$_3$O—, —O(CH$_2$)$_3$—, —CH=CF—, —C≡C—, —CH$_2$O—, —OCH$_2$—, —CF$_2$O—, —OCF$_2$—, —CO—O— or —O—CO— whereby each of Z$^{11}$, Z$^{12}$, Z$^{13}$ and Z$^{14}$ may have the same or a different meaning if present twice;
X$^{12}$ is halogen, —CN, —NCS, —SF$_5$, —SO$_2$CF$_3$, alkyl, alkenyl, alkenyloxy or alkylalkoxy or alkoxy ratical each mono- or polysubstituted by CN and/or halogen,
L$^1$ and L$^2$ are each independently of each other H or F, and
m and n are each independently of each other 0, 1, or 2 and m+n≦2;

c) optionally 1-20% by weight of component C containing at least one chiral compound with a HTP of ≧20 μm$^{-1}$.

The compounds of the formula I have a broad range of applications. In the pure state, the compounds of the formula I are colourless and are stable chemically, thermally and to light.

Preferably, the compounds according to general formula I do not comprise more than four rings in total, i.e. a+b+c+d≦3. It is even more preferred that a+b+c+d is at least 1 and not more than 3. Most preferred are compounds according to the invention with a+b+c+d being 2 or 3.

It is also preferred that in general formula I a is 1 and b is zero so that there is only one further ring A$^{11}$ on the left-hand side of the central ring of the compounds according to general formula I.

With regard to the right-hand side of the central ring of the compounds according to general formula I, it is preferred that at least one ring A$^{14}$ is present, i.e. d=1. In one preferred embodiment of the Invention d=1 and c=0. In another preferred embodiment of the invention both c and d are equal to 1, and hence there are two rings A$^{13}$ and A$^{14}$ present on the right-hand side of the central ring of formula I.

In formula I, R$^{11}$ is preferably an alkyl or alkoxy radical having from 1 to 10 carbon atoms, wherein one or more methylene groups of said alkyl or alkoxy radical may be replaced independently of each other by —O—, —SiR$^x$R$^y$—, with R$^x$ and R$^y$ being independently of each other straight-chain alkyl radicals with 1 to 5 carbon atoms, and/or —CH=CH— such that oxygen atoms are not linked directly to each other, said alkyl or alkoxy radical being unsubstituted or mono- or poly-substituted with fluorine. It is even more preferred that R$^{11}$ is a straight-chain alkyl, alkenyl, alkoxy, alkenyloxy or —O-alkylene-O-alkyl radical or a —O-alkylene-Si(alkyl')$_2$-O—Si(alkyl')$_3$ radical with up to 10 carbon atoms which radicals may be additionally substituted with fluorine whereby alkyl' is preferably a straight-chain alkanyl radical with 1, 2, 3 or 4 carbon atoms. It is still more preferred that R$^{11}$ is one of the following radicals: C$_n$H$_{2n+1}$—O— with n being 1, 2, 3, 4, 5, 6, 7 or 8; C$_m$H$_{2m-1}$—O— with m being 2, 3, 4, 5, 6, 7 or 8; C$_p$H$_{2p+1}$—O—C$_q$H$_{2q}$—O— with p being 1, 2, 3, 4 or 5 and q being 1, 2, 3, 4 or 5; (C$_r$H$_{2r+1}$)$_3$Si—O—Si(C$_s$H$_{2s+1}$)$_2$—C$_t$H$_{2t}$—O— with r being 1, 2, 3 or 4 and s and t being independently of each other 1, 2, 3 or 4. Especially, R$^{11}$ is —O—CH$_3$, —O—C$_2$H$_5$, —O—C$_3$H$_7$, —O-n-C$_4$H$_9$, —O-n-C$_5$H$_{11}$, O-n-C$_6$H$_{13}$, —O—(CH$_2$)$_2$—CH=CH$_2$, —O—(CH$_2$)$_3$—CH=CH$_2$, —O—(CH$_2$)$_4$—CH=CH$_2$, —O—(CH$_2$)$_2$—O—CH$_3$, —O—(CH$_2$)$_2$—O—C$_2$H$_5$, (CH$_3$)$_3$Si—O—Si(CH$_3$)$_2$—(CH$_2$)$_2$—O—, (CH$_3$)$_3$Si—O—Si(CH$_3$)$_2$—(CH$_2$)$_3$—O—. R$^{12}$ is preferably straight chain alkyl with 1 to 6 carbon atoms.

In formula I, L$^{11}$ is preferably an alkyl or alkoxy radical having from 1 to 10 carbon atoms, wherein one or more methylene groups of said alkyl or alkoxy radical may be replaced independently of each other by —O—, —SiR$^x$R$^y$—, with R$^x$ and R$^y$ being independently of each other straight-chain alkyl radicals with 1 to 5 carbon atoms, and/or —CH=CH— such that oxygen atoms are not linked directly to each other, said alkyl or alkoxy radical being unsubstituted or mono- or poly-substituted with fluorine. It is even more preferred that L$^{11}$ is a straight-chain alkyl, alkenyl, alkoxy, alkenyloxy or —O-alkylene-O-alkyl radical or a —O-alkylene-Si(alkyl')$_2$—O—Si(alkyl')$_3$ radical with up to 10 carbon atoms which radicals may be additionally substituted with fluorine whereby alkyl' is preferably a straight-chain alkanyl radical with 1, 2, 3 or 4 carbon atoms. It is still more preferred that L$^{11}$ is one of the following radicals: C$_n$H$_{2n+1}$—O— with n being 1, 2, 3, 4, 5, 6, 7 or 8 whereby one or more of the H atoms may be replaced by F; C$_m$H$_{2m-1}$—O— with m being 2, 3, 4, 5, 6, 7 or 8 whereby one or more of the H atoms may be replaced by F; C$_p$H$_{2p+1}$—O—C$_q$H$_{2q}$—O— with p being 1, 2, 3, 4 or 5 and q being 1, 2, 3, 4 or 5; (C$_r$H$_{2r+1}$)$_3$Si—O—Si(C$_s$H$_{2s+1}$)$_2$—C$_t$H$_{2t}$—O— with r being 1, 2, 3 or 4 and s and t being independently of each other 1, 2, 3 or 4. Especially, L$^{11}$ is —O—CH$_3$, —O—C$_2$H$_5$, —O—C$_3$H$_7$, —O-n-C$_4$H$_9$, —O-n-C$_5$H$_{11}$, O-n-C$_6$H$_{13}$, —O—CF$_3$, —O—CHF$_2$, —O—C$_2$F$_5$, —O—C$_3$F$_7$, —O-n-C$_4$F$_9$, —O—(CH$_2$)$_2$—

CH=CH$_2$, —O—(CH$_2$)$_3$—CH=CH$_2$, —O—(CH$_2$)$_4$—CH=CH$_2$, —O—(CH$_2$)$_2$—O—CH$_3$, —O—(CH$_2$)$_2$—O—C$_2$H$_5$, (CH$_3$)$_3$Si—O—Si(CH$_3$)$_2$-(CH$_2$)$_2$—O—, (CH$_3$)$_3$Si—O—Si(CH$_3$)$_2$—(CH$_2$)$_3$—O—.

In formula I, $L^{12}$ is preferably fluorine, an alkyl or alkoxy radical having from 1 to 10 carbon atoms, wherein one or more methylene groups of said alkyl or alkoxy radical may be replaced independently of each other by —O—, —SiR$^x$R$^y$—, with R$^x$ and R$^y$ being independently of each other straight-chain alkyl radicals with 1 to 5 carbon atoms, and/or —CH=CH— such that oxygen atoms are not linked directly to each other, said alkyl or alkoxy radical being unsubstituted or mono- or poly-substituted with fluorine. It is even more preferred that $L^{12}$ is F, a straight-chain alkyl, alkenyl, alkoxy, alkenyloxy or —O-alkylene-O-alkyl radical or a —O-alkylene-Si(alkyl')$_2$—O—Si(alkyl')$_3$ radical with up to 10 carbon atoms which radicals may be additionally substituted with fluorine whereby alkyl' is preferably a straight-chain alkanyl radical with 1, 2, 3 or 4 carbon atoms. It is still more preferred that $L^{12}$ is either F or one of the following radicals: C$_n$H$_{2n+1}$—O— with n being 1, 2, 3, 4, 5, 6, 7 or 8 whereby one or more of the H atoms may be replaced by F; C$_m$H$_{2m-1}$—O— with m being 2, 3, 4, 5, 6, 7 or 8 whereby one or more of the H atoms may be replaced by F; C$_p$H$_{2p+1}$—O—C$_q$H$_{2q}$—O— with p being 1, 2, 3, 4 or 5 and q being 1, 2, 3, 4 or 5; (C$_t$H$_{2t+1}$)$_3$Si—O—Si(C$_s$H$_{2s+1}$)$_2$—C$_r$H$_{2r}$—O— with r being 1, 2, 3 or 4 and s and t being independently of each other 1, 2, 3 or 4. Especially, $L^{12}$ is —O—CH$_3$, —O—C$_2$H$_5$, —O—C$_3$H$_7$, —O-n-C$_4$H$_9$, —O-n-C$_5$H$_{11}$, O-n-C$_6$H$_{13}$, —O—CF$_3$, —O—CHF$_2$, —O—C$_2$F$_5$, —O—C$_3$F$_7$, —O-n-C$_4$F$_9$, —O—(CH$_2$)$_2$—CH=CH$_2$, —O—(CH$_2$)$_3$—CH=CH$_2$, —O—(CH$_2$)$_4$—CH=CH$_2$, —O—(CH$_2$)$_2$—O—CH$_3$, —O—(CH$_2$)$_2$—O—C$_2$H$_5$, (CH$_3$)$_3$Si—O—Si(CH$_3$)$_2$—(CH$_2$)$_2$—O—, (CH$_3$)$_3$Si—O—Si(CH$_3$)$_2$—(CH$_2$)$_3$—O—.

It is also preferred that $L^{11}$ and $L^{12}$ have the same meaning, most preferably $L^{11}=L^{12}$=alkoxy, especially OCH$_3$, OC$_2$H$_5$ or OC$_3$H$_7$.

It is preferred that $X^{11}$ is a polar substituent. Hence, $X^{11}$ is preferably F, Cl, —NCS, —SF$_5$, —SO$_2$R$^z$, with R$^z$ being a straight-chain alkyl radical that is mono- or poly-substituted with fluorine, —CN, F, Cl, an alkyl or alkoxy radical having from 1 to 10 carbon atoms, wherein one or more methylene groups of said alkyl or alkoxy radical may be replaced independently of each other by —O—, —S—, —SiR$^x$R$^y$—, with R$^x$ and R$^y$ are independently of each other straight-chain alkyl radicals with 1 to 5 carbon atoms, or —CH=CH— such that oxygen and/or sulfur atoms are not linked directly to each other, said alkyl radical being mono- or poly-substituted with fluorine and said alkoxy radical being unsubstituted or mono- or poly-substituted with fluorine. In one preferred embodiment of the invention, $X^{11}$ is —NCS, —SF$_5$ or —SO$_{2-R}^z$, with R$^z$ being a straight-chain alkyl radical that is mono- or poly-substituted with fluorine, especially —CF$_3$, —C$_2$F$_5$ or n-C$_4$F$_9$. In another preferred embodiment of the invention, $X^{11}$ is also selected from F, Cl, CN, an alkyl, alkenyl or alkoxy radical having up to 8 carbon atoms said alkyl or alkenyl radical being mono- or poly-substituted with fluorine and said alkoxy radical being unsubstituted or mono- or poly-substituted with fluorine. It is even more preferred that $X^{11}$ is F, CF$_3$, CHF$_2$, C$_2$F$_5$, —CH=CF$_2$, —CF=CF$_2$, —O—CH$_3$, —O—C$_3$H$_7$, —O-n-C$_4$H$_9$, —O-n-C$_5$H$_{11}$, O-n-C$_6$H$_{13}$, —O—CF$_3$, —O—CHF$_2$, —O—C$_2$F$_5$, —O—C$_3$F$_7$, —O-n-C$_4$F$_9$.

$A^{11}$, $A^{12}$, $A^{13}$ and $A^{14}$ are preferably independently of each other preferably selected from one of the following formulas:

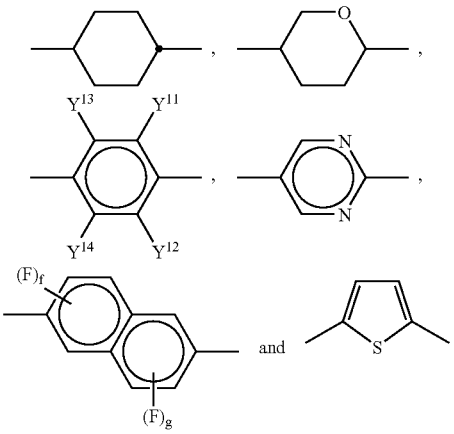

Preferably, $Y^{11}$ is F, Cl, CN, an alkoxy, alkenyloxy or —O-alkylene-O-alkyl radical or a —O-alkylene-Si(alkyl')$_2$-O—Si(alkyl')$_3$ radical with up to 10 carbon atoms which radicals may be additionally substituted with fluorine whereby alkyl' is preferably a straight-chain alkanyl radical with 1, 2, 3 or 4 carbon atoms. It is still more preferred that $y^{11}$ is one of the following radicals: C$_n$H$_{2n+1}$—O— with n being 1, 2, 3, 4, 5, 6, 7 or 8 whereby one or more of the H atoms may be replaced by F; C$_m$H$_{2m-1}$—O— with m being 2, 3, 4, 5, 6, 7 or 8 whereby one or more of the H atoms may be replaced by F; C$_p$H$_{2p+1}$—O—C$_q$H$_{2q}$—O— with p being 1, 2, 3, 4 or 5 and q being 1, 2, 3, 4 or 5; (C$_t$H$_{2t+1}$)$_3$Si—O—Si(C$_s$H$_{2s+1}$)$_2$—C$_r$H$_{2r}$—O— with r being 1, 2, 3 or 4 and s and t being independently of each other 1, 2, 3 or 4. Especially, $Y^{11}$ is —O—CH$_3$, —O—C$_2$H$_5$, —O—C$_3$H$_7$, —O-n-C$_4$H$_9$, —O-n-C$_5$H$_{11}$, O-n-C$_6$H$_{13}$, —O—CF$_3$, —O—CHF$_2$, —O—C$_2$F$_5$, —O—C$_3$F$_7$, —O-n-C$_4$F$_9$, —O—(CH$_2$)$_2$—CH=CH$_2$, —O—(CH$_2$)$_3$—CH=CH$_2$, —O—(CH$_2$)$_4$—CH=CH$_2$, —O—(CH$_2$)$_2$—O—CH$_3$, —O—(CH$_2$)$_2$—O—C$_2$H$_5$, (CH$_3$)$_3$Si—O—Si(CH$_3$)$_2$—(CH$_2$)$_2$—O—, (CH$_3$)$_3$Si—O—Si(CH$_3$)$_2$—(CH$_2$)$_3$—O—.

Preferably, $Y^{12}$ is F, Cl, CN, hydrogen or has the same meaning as the preferred definitions of $Y^{11}$ above. Especially, $Y^{12}$ is H or F.

Further it is preferred that the compounds according to the invention comprise at least one tetrahydropyran-2,5-diyl, naphthyl-2,6-diyl and/or thien-2,5-diyl ring whereby said naphthyl moiety may be substituted with one or more fluorine atoms. It is even more preferred that one of $A^{11}$, $A^{12}$, $A^{13}$ and $A^{14}$ in formula I is

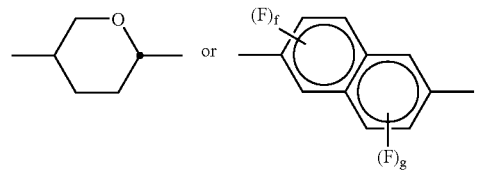

with f and g being independently of each other 0, 1, 2 or 3; especially, f is 1 and g is 2.

In certain preferred embodiments in formula I at least one of $A^{11}$ and $A^{12}$ and especially $A^{11}$ is a tetrahydropyran-2,5-diyl ring. In other preferred embodiments of the invention at least one of $A^{13}$ and $A^{14}$ and particularly only one of $A^{13}$ and $A^{14}$ is of the formula

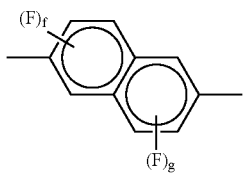

with f and g being independently of each other 0, 1, 2 or 3. It is highly preferred that f is 1 and g is 2 and the fluorine substituents are located in the 1-, 3- and 8-position, respectively, of the naphthyl moiety so that all fluorine subtituents have the same orientation as $X^{11}$, i.e. to the right hand of the compound according to formula I. In a particularly preferred embodiment one of $A^{11}$ and $A^{12}$ is a tetrahydropyran-2,5-diyl moiety and one of $A^{13}$ and $A^{14}$ is an optionally fluorinated naphtha -2,6-diyl moiety.

In another preferred embodiment in formula I $A^{14}$-$X^{11}$ is of the following formula:

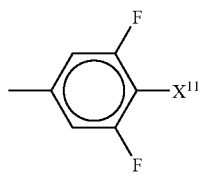

wherein $X^{11}$ is as defined above and preferably NCS, $SF_5$, —$SO_2$—$CF_3$, —$SO_2$—$C_2F_5$, —$SO_2$-n-$C_4F_9$, —CN, F, Cl, $CF_3$, $CHF_2$, $C_2F_5$, —CH=$CF_2$, —CF=$CF_2$, —O—$CH_3$, —O—$C_3H_7$, —O-n-$C_4H_9$, —O—n-$C_5H_{11}$, O-n-$C_6H_{13}$, —O—$CF_3$, —O—$CHF_2$, —O—$C_2F_5$, —O—$C_3F_7$, —O-n-$C_4F_9$, more preferably F, $OCF_3$, $CF_3$, CN, NCS, especially F.

It is furthermore preferred that in formula I $Z^{11}$, $Z^{12}$, $Z^{13}$ and $Z^{14}$ are independently of each other a single bond, —$CF_2$—$CF_2$—, —$CF_2$—$CH_2$—, —$CH_2$—$CF_2$—, —CF=CF—, —CF=CH—, —CH=CF—, —C≡C—, —$CF_2$O— or —CO—O—. It is even more preferred that $Z^{11}$ and $Z^{12}$ are independently of each other a single bond or —CO—O—, especially a single bond, and that $Z^{13}$ and $Z^{14}$ are independently of each other a single bond, —$CF_2$O— or —CO—O—; especially one of $Z^{13}$ and $Z^{14}$ is —$CF_2$O—.

One preferred embodiment of the invention comprises mixtures containing compounds of the formula IA:

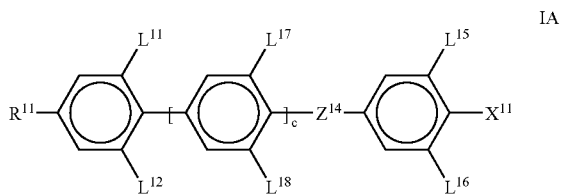

wherein
c is 0 or 1;
$R^{11}$ is an alkyl or alkoxy radical having from 1 to 15 carbon atoms or an alkenyl or alkenyloxy or —O-alkylene-O-alkyl radical having from 2 to 15 carbon atoms, wherein one or more methylene groups of each of said radicals may be replaced independently of each other by —S—, —$SiR^xR^y$—, —C≡C—, —CO—O— and/or —O—CO— such that oxygen and/or sulfur atoms are not linked directly to each other, said radicals being unsubstituted or mono-substituted with a —CN group or mono- or poly-substituted with halogen; preferably $R^{11}$ is a straight-chain alkyl, alkoxy, alkenyl, alkenyloxy or —O-alkylene-O-alkyl radical with up to 10 carbon atoms, said radicals being unsubstituted or mono- or poly-substituted with halogen;

$L^{11}$ is an alkyl or alkoxy radical having from 1 to 15 carbon atoms or an alkenyl or alkenyloxy or —O-alkylene-O-alkyl radical having from 2 to 15 carbon atoms, wherein one or more methylene groups of each of said radicals may be replaced independently of each other by —S—, —$SiR^xR^y$—, —C≡C—, —CO—O— and/or —O—CO— such that oxygen and/or sulfur atoms are not linked directly to each other, said radicals being unsubstituted or mono-substituted with a —CN group or mono- or poly-substituted with halogen; preferably $L^{11}$ is a straight-chain alkyl, alkoxy, alkenyl, alkenyloxy or —O-alkylene-O-alkyl radical with up to 10 carbon atoms, said radicals being unsubstituted or mono- or poly-substituted with halogen;

$L^{12}$ is hydrogen, halogen, an alkyl or alkoxy radical having from 1 to 15 carbon atoms or an alkenyl or alkenyloxy or —O-alkylene-O-alkyl radical having from 2 to 15 carbon atoms, wherein one or more methylene groups of each of said radicals may be replaced independently of each other by —S—, —$SiR^xR^y$—, —C≡C—, —CO—O— and/or —O—CO— such that oxygen and/or sulfur atoms are not linked directly to each other, said radicals being unsubstituted or mono-substituted with a —CN group or mono- or poly-substituted with halogen; preferably $L^{12}$ is H, F, a straight-chain alkyl, alkoxy, alkenyl, alkenyloxy or —O-alkylene-O-alkyl radical with up to 10 carbon atoms, said radicals being unsubstituted or mono- or poly-substituted with halogen;

$L^{15}$, $L^{16}$, $L^{17}$ and $L^{18}$ are independently of each other H or F; preferably at least $L^{15}$ is F;

$Z^{14}$ is a single bond, —$CH_2CH_2$—, (—$CH_2CH_2$—)$_2$, —$CF_2$—$CF_2$—, —$CF_2$—$CH_2$—, —$CH_2$—$CF_2$—, —CH=CH—, —CF=CF—, —CF=CH—, —CH=CF—, —C≡C—, —$CH_2$O—, —$OCH_2$—, —$CF_2$O—, —$OCF_2$—, —CO—O— or —O—CO—; preferably $Z^{14}$ is a single bond, —C≡C—, —$CF_2$O— or —$CO_2$—, in particular a single bond or —$CF_2$O—;

$X^{11}$ is F, Cl, $CF_3$, $OCF_3$, CN, NCS, —$SF_5$ or —$SO_2$—$R^z$;

$R^x$ and $R^y$ are independently of each other hydrogen or an alkyl radical having from 1 to 7 carbon atoms; preferably $R^x$ and $R^y$ are both methyl, ethyl, propyl or butyl; and $R^z$ is an alkyl radical having from 1 to 7 carbon atoms, said alkyl radical being unsubstituted or mono- or poly-substituted with halogen; preferably $R^z$ is $CF_3$, $C_2F_5$ or n-$C_4F_9$.

One preferred subgroup of compounds according to formula IA are compounds in which c is zero. Examples of compounds of said subgroup are the following ones:

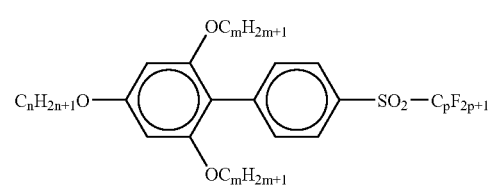

IAa-1

-continued
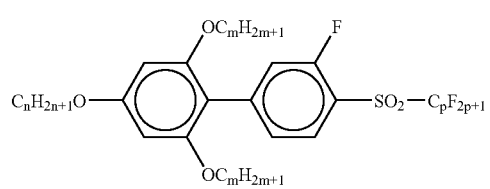
IAa-2
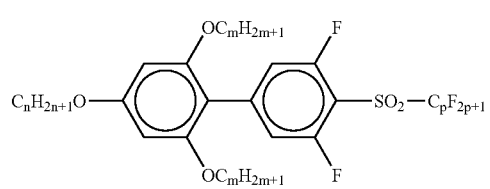
IAa-3
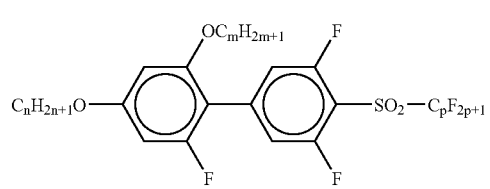
IAa-4
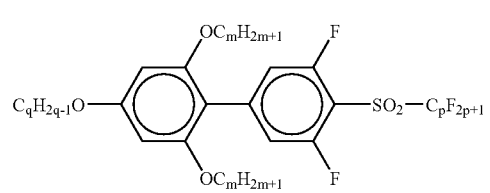
IAa-5
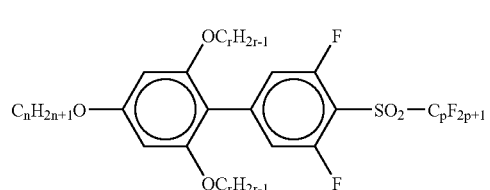
IAa-6
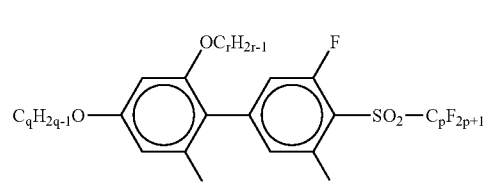
IAa-7
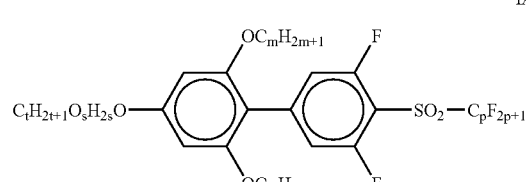
IAa-8
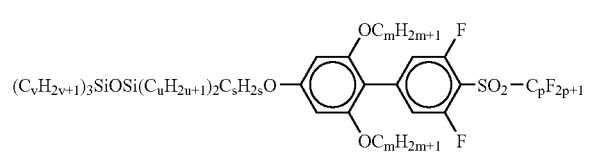
IAa-9
-continued
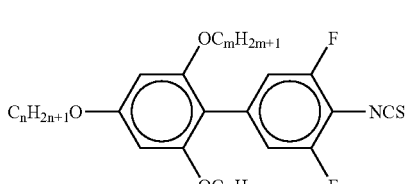
IAa-10
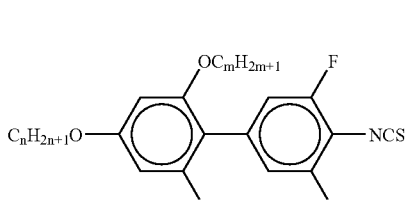
IAa-11
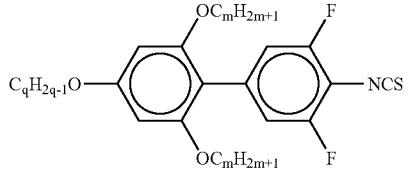
IAa-12
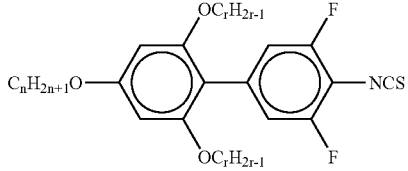
IAa-13
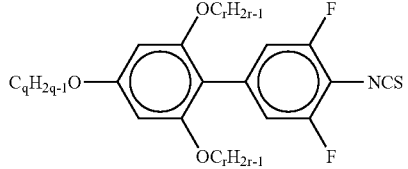
IAa-14
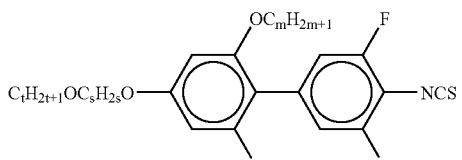
IAa-15
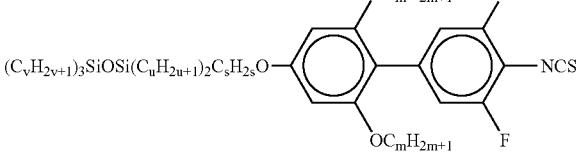
IAa-16

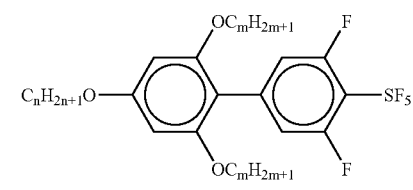
IAa-17
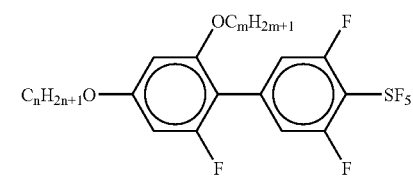
IAa-18
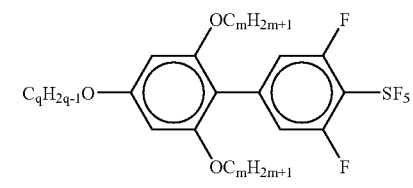
IAa-19
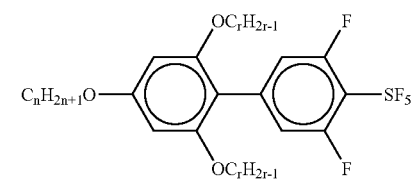
IAa-20
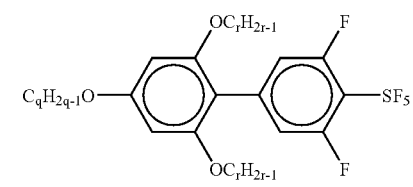
IAa-21
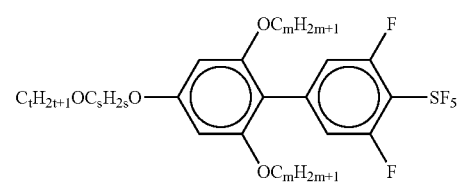
IAa-22
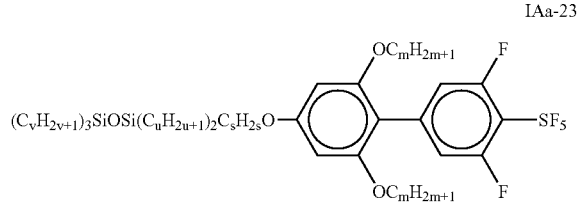
IAa-23
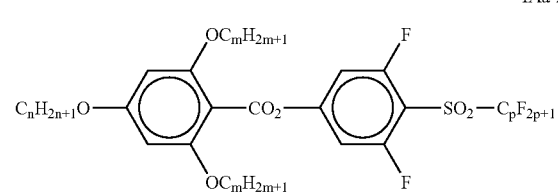
IAa-24
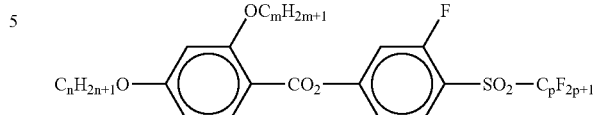
IAa-25
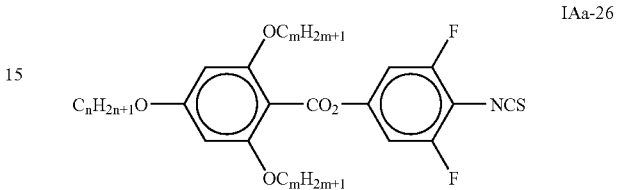
IAa-26
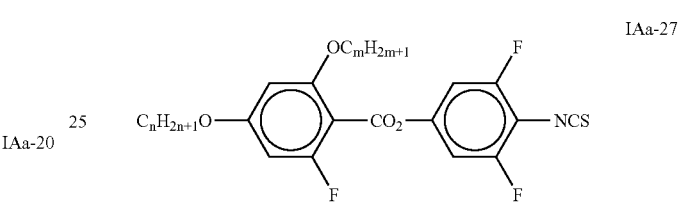
IAa-27
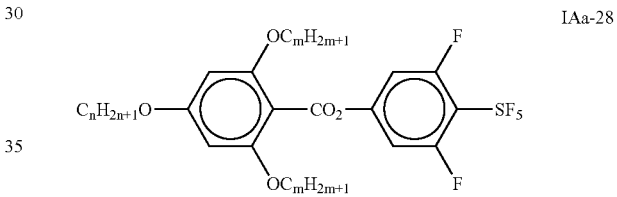
IAa-28
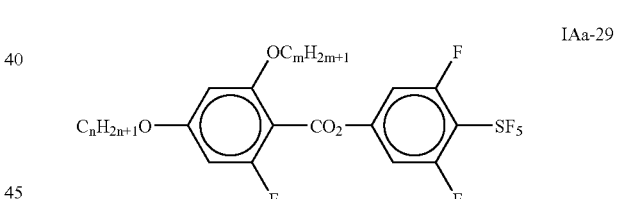
IAa-29
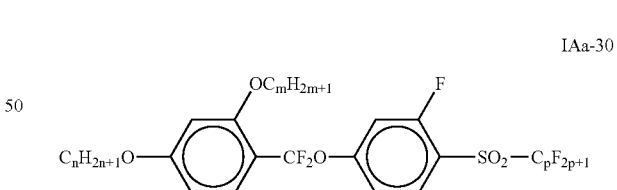
IAa-30
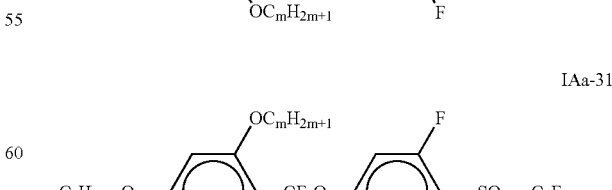
IAa-31

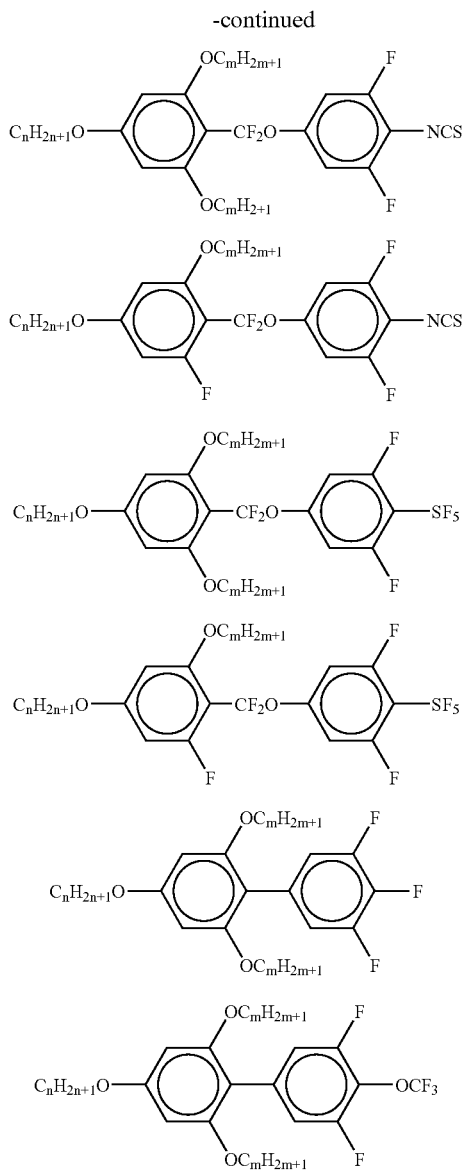
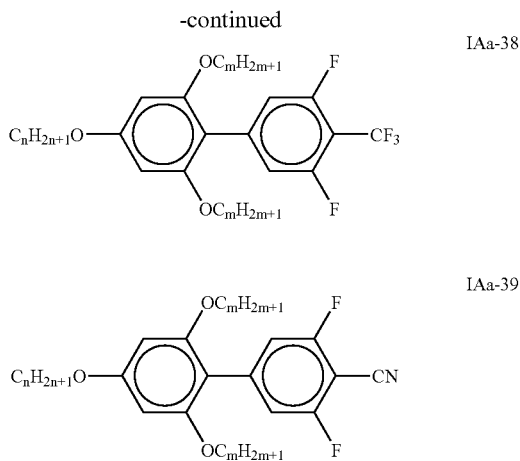

wherein n and m are independently of each other integers from 1 to 8, preferably 1, 2, 3, 4, 5 or 6; p is an integer from 1 to 5, preferably 1, 2 or 4; q and r are independently of each other integers from 2 to 8, preferably 3, 4, 5, 6; s and t are independently of each other 1, 2, 3, 4, preferably 2 or 3; and u and v are independently of each other 1, 2, 3, 4, preferably 1 or 4. Preferably, $C_nH_{2n+1}O$ and $C_mH_{2m+1}O$ represent independently of each other methoxy, ethoxy, propoxy, n-butoxy, n-pentoxy and n-hexoxy. If present twice in the same compound, both $C_mH_{2m+1}O$ substituents may have the same value for m or different ones; preferably m in two $C_mH_{2m+1}O$ substituents have the same meaning. Preferably, $-SO_2-C_pH_{2p+1}$ represents $-SO_2-CF_3$, $-SO_2-C_2F_5$, $-SO_2-C_4F_9$. Preferably, $C_qH_{2q-1}O$ and $C_rH_{2r-1}O$ represent $-O-CH_2CH=CH_2$, $-O-(CH_2)_2CH=CH_2$, $-O-(CH_2)_3CH=CH_2$, $-O-(CH_2)_2CH=CH-CH_3$. Preferably, $-OC_sH_{2s}OC_tH_{2t+1}$ represents $CH_3OCH_2CH_2O-$ and $CH_3CH_2OCH_2CH_2O-$. Preferably, $(C_vH_{2v+1})_3SiOSi(C_uH_{2u+1})_2C_sH_{2s}O$ represents $(CH_3)_3SiOSi(CH_3)_2CH_2CH_2O-$ and $(CH_3)_3SiOSi(CH_3)_2CH_2CH_2CH_2O-$.

Another preferred subgroup of compounds according to formula IA are compounds in which c is 1. Examples of compounds of said subgroup are the following ones:

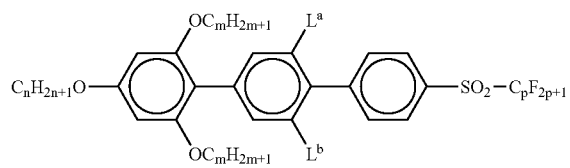
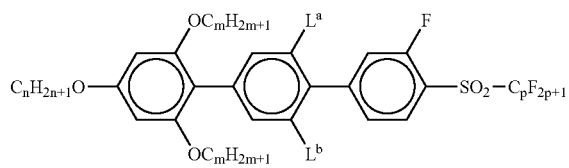
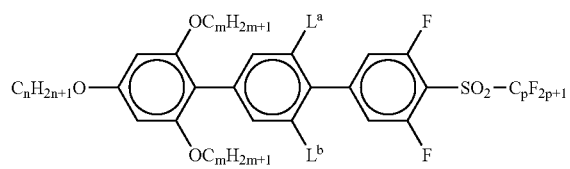
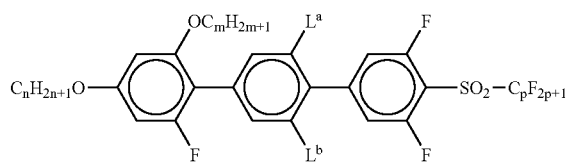

-continued
IAb-5
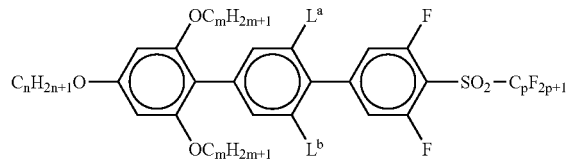
IAb-6
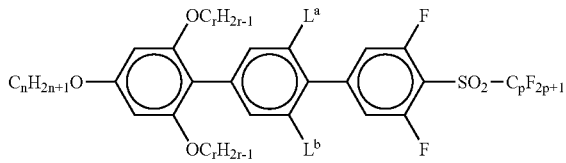
IAb-7
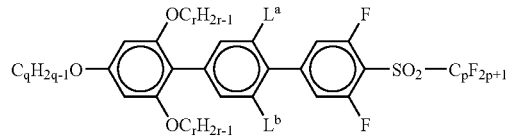
IAb-8
IAb-9
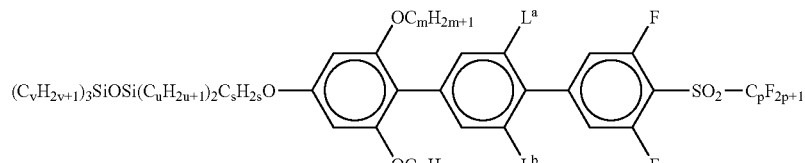
IAb-10
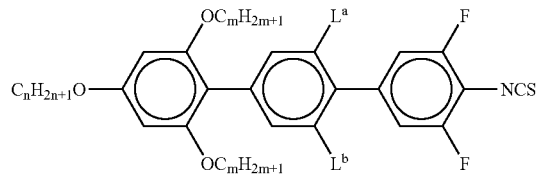
IAb-11
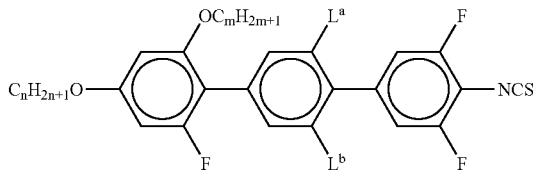
IAb-12
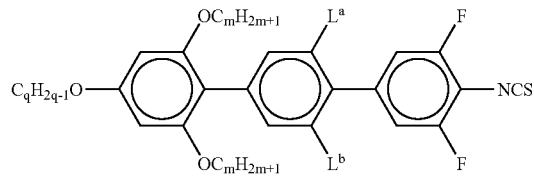
IAb-13
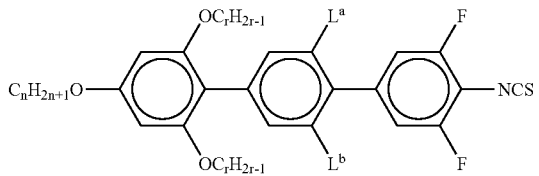
IAb-14
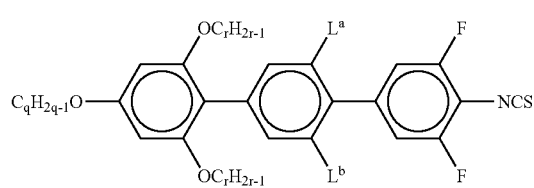
IAb-15
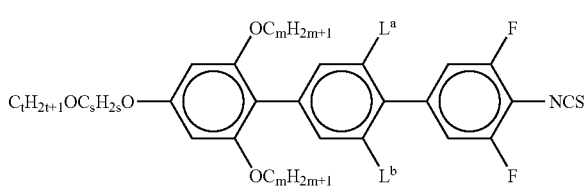
IAb-16
IAb-17
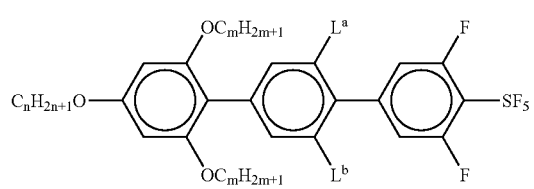
IAb-18
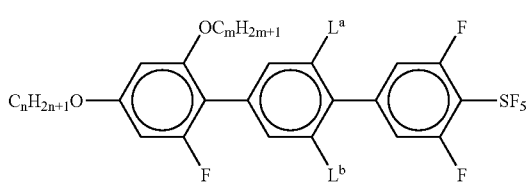

-continued
IAb-19
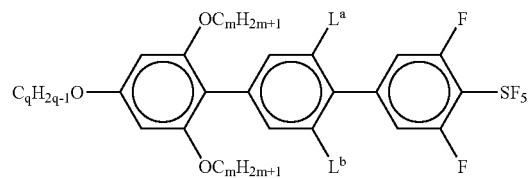
IAb-20
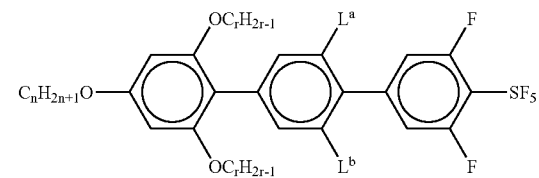
IAb-21
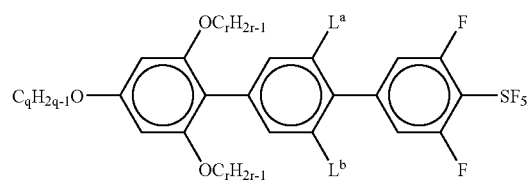
IAb-22
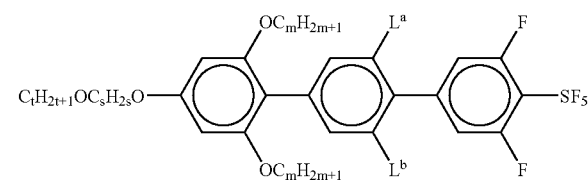
IAb-23
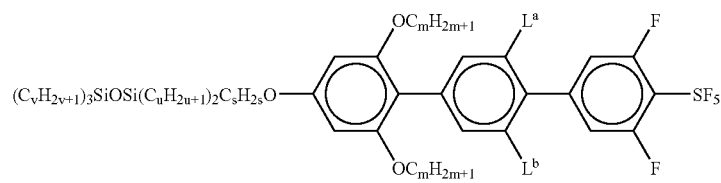
IAb-24
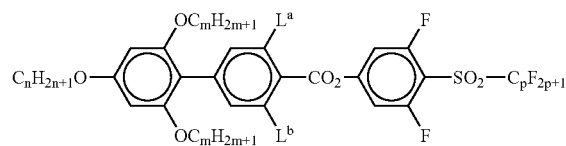
IAb-25
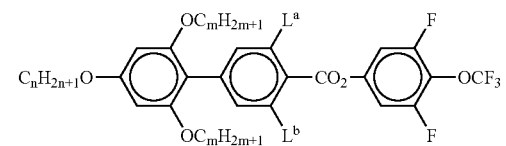
IAb-26
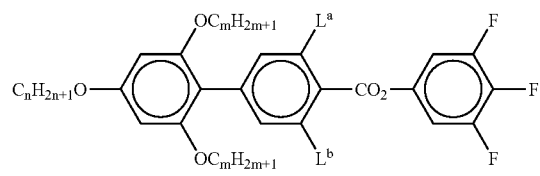
IAb-27
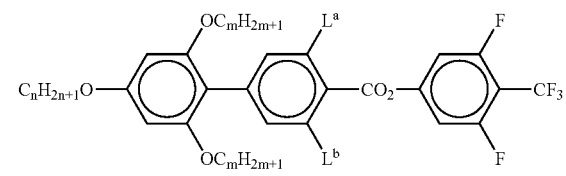
IAb-28
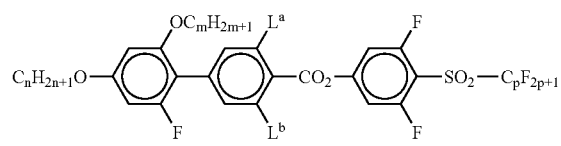
IAb-29
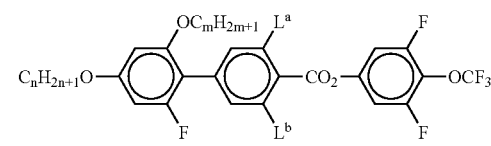
IAb-30
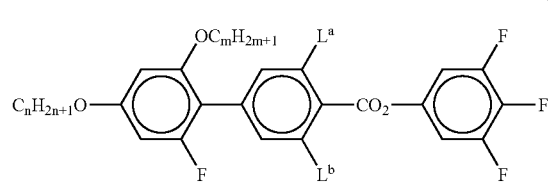
IAb-31
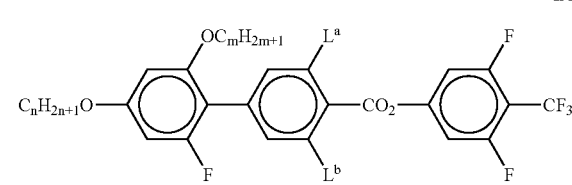
IAb-32
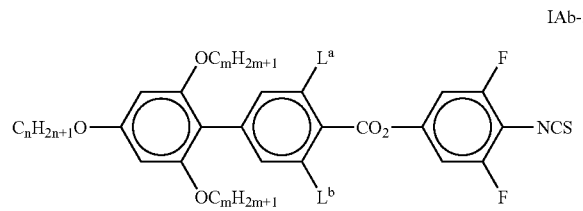
IAb-33
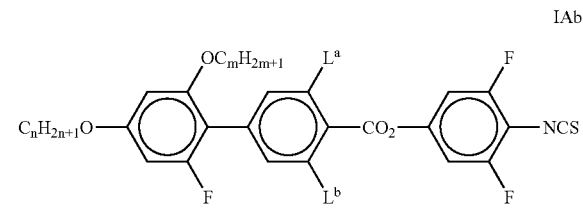

-continued

IAb-34
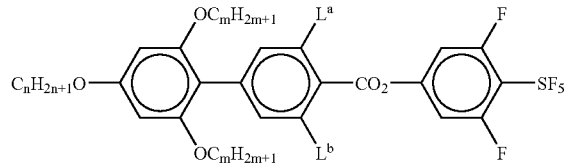

IAb-35
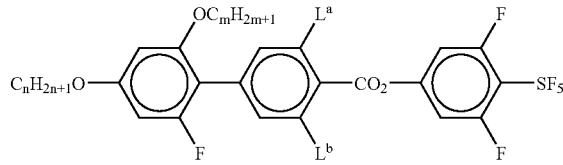

IAb-36
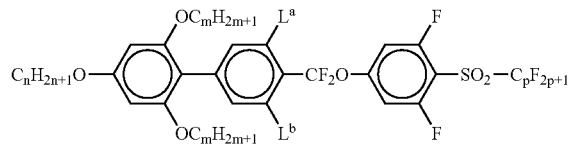

IAb-37
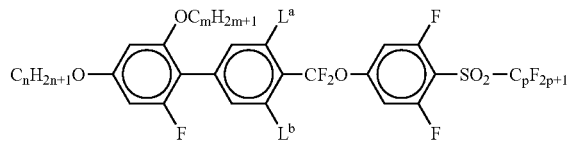

IAb-38
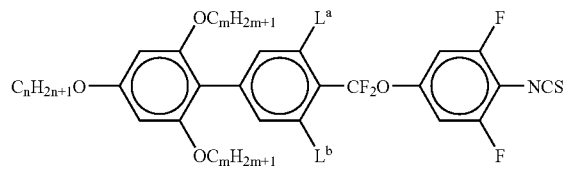

IAb-39
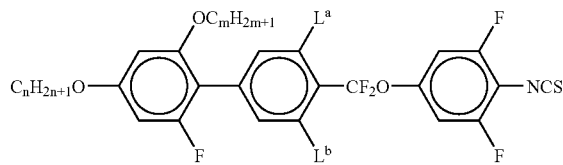

IAb-40
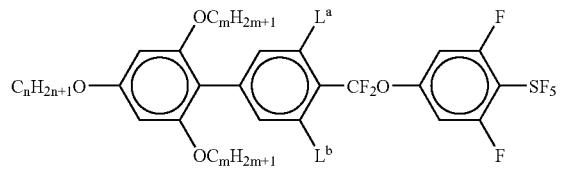

IAb-41
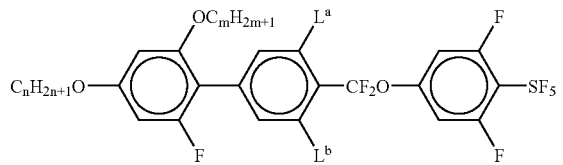

IAb-42
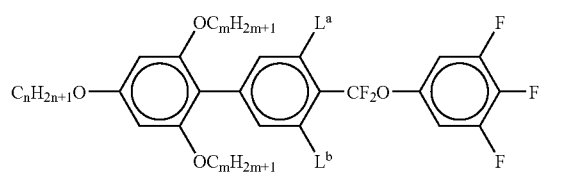

IAb-43
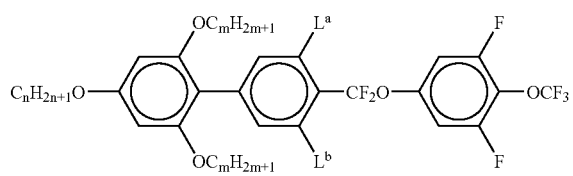

IAb-44
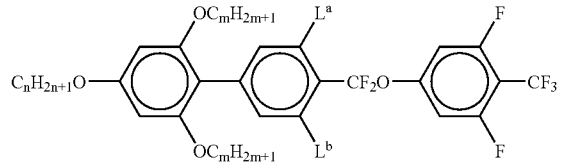

IAb-45
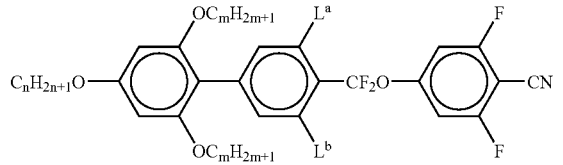

wherein $L^a$ and $L^b$ are independently of each other H or F; n and m are independently of each other integers from 1 to 8, preferably 1, 2, 3, 4, 5 or 6; p is an integer from 1 to 5, preferably 1, 2 or 4; q and r are independently of each other Integers from 2 to 8, preferably 3, 4, 5, 6; s and t are independently of each other 1, 2, 3, 4, preferably 2 or 3; and u and v are independently of each other 1, 2, 3, 4, preferably 1 or 4. Preferably, at least one of $L^a$ and $L^b$ is F, and especially preferably, both $L^a$ and $L^b$ are F. If present twice in the same compound, both $C_mH_{2m+1}O$ substituents may have the same value for m or different ones; preferably m in two $C_mH_{2m+1}O$ substituents have the same meaning. Preferably, $C_nH_{2n+1}O$ and $C_mH_{2m+1}O$ represent independently of each other methoxy, ethoxy, propoxy, n-butoxy, n-pentoxy and n-hexoxy. Preferably, $-SO_2-C_pH_{2p+1}$ represents $-SO_2-CF_3$, $-SO_2-C_2F_5$, $-SO_2-C_4F_9$. Preferably, $C_qH_{2q-1}O$ and $C_rH_{2r-1}O$ represent $-O-CH_2CH=CH_2$, $-O-(CH_2)_2CH=CH_2$, $-O-(CH_2)_3CH=CH_2$, $-O-(CH_2)_2CH=CH-CH_3$. Preferably, $-OC_sH_{2s}OC_tH_{2t+1}$ represents $CH_3OCH_2CH_2O-$ and $CH_3CH_2OCH_2CH_2O-$. Preferably, $(C_vH_{2v+1})_3SiOSi(C_uH_{2u+1})_2C_sH_{2s}O$ represents $(CH_3)_3SiOSi(CH_3)_2CH_2CH_2O-$ and $(CH_3)_3SiOSi(CH_3)_2CH_2CH_2CH_2O-$.

Still another preferred subgroup of compounds according to formula IA are compounds of formula IAc.

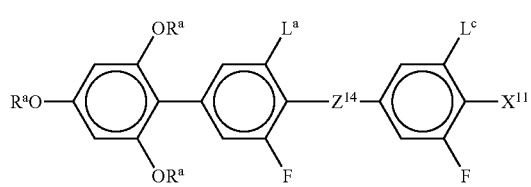

IAc

Preferred meanings of the moieties $L^a$, $L^c$, $X^{11}$ and $Z^{14}$ are given in Table 1 below while $R^aO$ represents methoxy, ethoxy, propoxy, n-butoxy, n-pentoxy or n-hexoxy.

TABLE 1

| Compound IAc-No. | $L^a$ | $L^c$ | $Z^{14}$ | $X^{11}$ |
|---|---|---|---|---|
| -1 | H | H | CF$_2$CF$_2$ | F |
| -2 | H | H | CF$_2$CF$_2$ | Cl |
| -3 | H | H | CF$_2$CF$_2$ | CF$_3$ |
| -4 | H | H | CF$_2$CF$_2$ | CHF$_2$ |
| -5 | H | H | CF$_2$CF$_2$ | OCF$_3$ |
| -6 | H | H | CF$_2$CF$_2$ | OCHF$_2$ |
| -7 | H | H | CF$_2$CF$_2$ | CN |
| -8 | H | H | CF$_2$CF$_2$ | SF$_5$ |
| -9 | H | H | CF$_2$CF$_2$ | NCS |
| -10 | H | H | CF$_2$CF$_2$ | SO$_2$CF$_3$ |
| -11 | H | F | CF$_2$CF$_2$ | F |
| -12 | H | F | CF$_2$CF$_2$ | Cl |
| -13 | H | F | CF$_2$CF$_2$ | CF$_3$ |
| -14 | H | F | CF$_2$CF$_2$ | CHF$_2$ |
| -15 | H | F | CF$_2$CF$_2$ | OCF$_3$ |
| -16 | H | F | CF$_2$CF$_2$ | OCHF$_2$ |
| -17 | H | F | CF$_2$CF$_2$ | CN |
| -18 | H | F | CF$_2$CF$_2$ | SF$_5$ |
| -19 | H | F | CF$_2$CF$_2$ | NCS |
| -20 | H | F | CF$_2$CF$_2$ | SO$_2$CF$_3$ |
| -21 | F | F | CF$_2$CF$_2$ | F |
| -22 | F | F | CF$_2$CF$_2$ | Cl |
| -23 | F | F | CF$_2$CF$_2$ | CF$_3$ |
| -24 | F | F | CF$_2$CF$_2$ | CHF$_2$ |
| -25 | F | F | CF$_2$CF$_2$ | OCF$_3$ |
| -26 | F | F | CF$_2$CF$_2$ | OCHF$_2$ |
| -27 | F | F | CF$_2$CF$_2$ | CN |
| -28 | F | F | CF$_2$CF$_2$ | SF$_5$ |
| -29 | F | F | CF$_2$CF$_2$ | NCS |
| -30 | F | F | CF$_2$CF$_2$ | SO$_2$CF$_3$ |
| -31 | H | H | CF$_2$CH$_2$ | F |
| -32 | H | H | CF$_2$CH$_2$ | Cl |
| -33 | H | H | CF$_2$CH$_2$ | CF$_3$ |
| -34 | H | H | CF$_2$CH$_2$ | CHF$_2$ |
| -35 | H | H | CF$_2$CH$_2$ | OCF$_3$ |
| -36 | H | H | CF$_2$CH$_2$ | OCHF$_2$ |
| -37 | H | H | CF$_2$CH$_2$ | CN |
| -38 | H | H | CF$_2$CH$_2$ | SF$_5$ |
| -39 | H | H | CF$_2$CH$_2$ | NCS |
| -40 | H | H | CF$_2$CH$_2$ | SO$_2$CF$_3$ |
| -41 | H | F | CF$_2$CH$_2$ | F |
| -42 | H | F | CF$_2$CH$_2$ | Cl |
| -43 | H | F | CF$_2$CH$_2$ | CF$_3$ |
| -44 | H | F | CF$_2$CH$_2$ | CHF$_2$ |
| -45 | H | F | CF$_2$CH$_2$ | OCF$_3$ |
| -46 | H | F | CF$_2$CH$_2$ | OCHF$_2$ |
| -47 | H | F | CF$_2$CH$_2$ | CN |
| -48 | H | F | CF$_2$CH$_2$ | SF$_5$ |
| -49 | H | F | CF$_2$CH$_2$ | NCS |
| -50 | H | F | CF$_2$CH$_2$ | SO$_2$CF$_3$ |
| -51 | F | F | CF$_2$CH$_2$ | F |
| -52 | F | F | CF$_2$CH$_2$ | Cl |
| -53 | F | F | CF$_2$CH$_2$ | CF$_3$ |
| -54 | F | F | CF$_2$CH$_2$ | CHF$_2$ |
| -55 | F | F | CF$_2$CH$_2$ | OCF$_3$ |
| -56 | F | F | CF$_2$CH$_2$ | OCHF$_2$ |
| -57 | F | F | CF$_2$CH$_2$ | CN |
| -58 | F | F | CF$_2$CH$_2$ | SF$_5$ |
| -59 | F | F | CF$_2$CH$_2$ | NCS |
| -60 | F | F | CF$_2$CH$_2$ | SO$_2$CF$_3$ |
| -61 | H | H | CH$_2$CF$_2$ | F |
| -62 | H | H | CH$_2$CF$_2$ | Cl |
| -63 | H | H | CH$_2$CF$_2$ | CF$_3$ |
| -64 | H | H | CH$_2$CF$_2$ | CHF$_2$ |
| -65 | H | H | CH$_2$CF$_2$ | OCF$_3$ |
| -66 | H | H | CH$_2$CF$_2$ | OCHF$_2$ |
| -67 | H | H | CH$_2$CF$_2$ | CN |
| -68 | H | H | CH$_2$CF$_2$ | SF$_5$ |
| -69 | H | H | CH$_2$CF$_2$ | NCS |
| -70 | H | H | CH$_2$CF$_2$ | SO$_2$CF$_3$ |
| -71 | H | F | CH$_2$CF$_2$ | F |
| -72 | H | F | CH$_2$CF$_2$ | Cl |
| -73 | H | F | CH$_2$CF$_2$ | CF$_3$ |
| -74 | H | F | CH$_2$CF$_2$ | CHF$_2$ |
| -75 | H | F | CH$_2$CF$_2$ | OCF$_3$ |
| -76 | H | F | CH$_2$CF$_2$ | OCHF$_2$ |
| -77 | H | F | CH$_2$CF$_2$ | CN |
| -78 | H | F | CH$_2$CF$_2$ | SF$_5$ |
| -79 | H | F | CH$_2$CF$_2$ | NCS |
| -80 | H | F | CH$_2$CF$_2$ | SO$_2$CF$_3$ |
| -81 | F | F | CH$_2$CF$_2$ | F |
| -82 | F | F | CH$_2$CF$_2$ | Cl |
| -83 | F | F | CH$_2$CF$_2$ | CF$_3$ |
| -84 | F | F | CH$_2$CF$_2$ | CHF$_2$ |
| -85 | F | F | CH$_2$CF$_2$ | OCF$_3$ |
| -86 | F | F | CH$_2$CF$_2$ | OCHF$_2$ |
| -87 | F | F | CH$_2$CF$_2$ | CN |
| -88 | F | F | CH$_2$CF$_2$ | SF$_5$ |
| -89 | F | F | CH$_2$CF$_2$ | NCS |
| -90 | F | F | CH$_2$CF$_2$ | SO$_2$CF$_3$ |
| -91 | H | H | —CF=CF— | F |
| -92 | H | H | —CF=CF— | Cl |
| -93 | H | H | —CF=CF— | CF$_3$ |
| -94 | H | H | —CF=CF— | CHF$_2$ |
| -95 | H | H | —CF=CF— | OCF$_3$ |
| -96 | H | H | —CF=CF— | OCHF$_2$ |
| -97 | H | H | —CF=CF— | CN |
| -98 | H | H | —CF=CF— | SF$_5$ |
| -99 | H | H | —CF=CF— | NCS |
| -100 | H | H | —CF=CF— | SO$_2$CF$_3$ |
| -101 | H | F | —CF=CF— | F |
| -102 | H | F | —CF=CF— | Cl |
| -103 | H | F | —CF=CF— | CF$_3$ |
| -104 | H | F | —CF=CF— | CHF$_2$ |
| -105 | H | F | —CF=CF— | OCF$_3$ |
| -106 | H | F | —CF=CF— | OCHF$_2$ |
| -107 | H | F | —CF=CF— | CN |
| -108 | H | F | —CF=CF— | SF$_5$ |
| -109 | H | F | —CF=CF— | NCS |
| -110 | H | F | —CF=CF— | SO$_2$CF$_3$ |
| -111 | F | F | —CF=CF— | F |
| -112 | F | F | —CF=CF— | Cl |
| -113 | F | F | —CF=CF— | CF$_3$ |
| -114 | F | F | —CF=CF— | CHF$_2$ |
| -115 | F | F | —CF=CF— | OCF$_3$ |
| -116 | F | F | —CF=CF— | OCHF$_2$ |
| -117 | F | F | —CF=CF— | CN |
| -118 | F | F | —CF=CF— | SF$_5$ |
| -119 | F | F | —CF=CF— | NCS |
| -120 | F | F | —CF=CF— | SO$_2$CF$_3$ |
| | | | —CF$_2$O— | |
| -121 | H | H | CF$_2$CF$_2$ | F |
| -122 | H | H | CF$_2$CF$_2$ | Cl |
| -123 | H | H | CF$_2$CF$_2$ | CF$_3$ |
| -124 | H | H | CF$_2$CF$_2$ | CHF$_2$ |
| -125 | H | H | CF$_2$CF$_2$ | OCF$_3$ |
| -126 | H | H | CF$_2$CF$_2$ | OCHF$_2$ |
| -127 | H | H | CF$_2$CF$_2$ | CN |

TABLE 1-continued

| Compound IAc-No. | $L^a$ | $L^c$ | | $X^{11}$ |
|---|---|---|---|---|
| -128 | H | H | $CF_2CF_2$ | $SF_5$ |
| -129 | H | H | $CF_2CF_2$ | NCS |
| -130 | H | H | $CF_2CF_2$ | $SO_2CF_3$ |
| -131 | H | F | $CF_2CF_2$ | F |
| -132 | H | F | $CF_2CF_2$ | Cl |
| -133 | H | F | $CF_2CF_2$ | $CF_3$ |
| -134 | H | F | $CF_2CF_2$ | $CHF_2$ |
| -135 | H | F | $CF_2CF_2$ | $OCF_3$ |
| -136 | H | F | $CF_2CF_2$ | $OCHF_2$ |
| -137 | H | F | $CF_2CF_2$ | CN |
| -138 | H | F | $CF_2CF_2$ | $SF_5$ |
| -139 | H | F | $CF_2CF_2$ | NCS |
| -140 | H | F | $CF_2CF_2$ | $SO_2CF_3$ |
| -141 | F | F | $CF_2CF_2$ | F |
| -142 | F | F | $CF_2CF_2$ | Cl |
| -143 | F | F | $CF_2CF_2$ | $CF_3$ |
| -144 | F | F | $CF_2CF_2$ | $CHF_2$ |
| -145 | F | F | $CF_2CF_2$ | $OCF_3$ |
| -146 | F | F | $CF_2CF_2$ | $OCHF_2$ |
| -147 | F | F | $CF_2CF_2$ | CN |
| -148 | F | F | $CF_2CF_2$ | $SF_5$ |
| -149 | F | F | $CF_2CF_2$ | NCS |
| -150 | F | F | $CF_2CF_2$ | $SO_2CF_3$ |
| | | | single | |
| -151 | H | H | $CF_2CF_2$ | F |
| -152 | H | H | $CF_2CF_2$ | Cl |
| -153 | H | H | $CF_2CF_2$ | $CF_3$ |
| -154 | H | H | $CF_2CF_2$ | $CHF_2$ |
| -155 | H | H | $CF_2CF_2$ | $OCF_3$ |
| -156 | H | H | $CF_2CF_2$ | $OCHF_2$ |
| -157 | H | H | $CF_2CF_2$ | CN |
| -158 | H | H | $CF_2CF_2$ | $SF_5$ |
| -159 | H | H | $CF_2CF_2$ | NCS |
| -160 | H | H | $CF_2CF_2$ | $SO_2CF_3$ |
| -161 | H | F | $CF_2CF_2$ | F |
| -162 | H | F | $CF_2CF_2$ | Cl |
| -163 | H | F | $CF_2CF_2$ | $CF_3$ |
| -164 | H | F | $CF_2CF_2$ | $CHF_2$ |
| -165 | H | F | $CF_2CF_2$ | $OCF_3$ |
| -166 | H | F | $CF_2CF_2$ | $OCHF_2$ |
| -167 | H | F | $CF_2CF_2$ | CN |
| -168 | H | F | $CF_2CF_2$ | $SF_5$ |
| -169 | H | F | $CF_2CF_2$ | NCS |
| -170 | H | F | $CF_2CF_2$ | $SO_2CF_3$ |
| -171 | F | F | $CF_2CF_2$ | F |
| -172 | F | F | $CF_2CF_2$ | Cl |
| -173 | F | F | $CF_2CF_2$ | $CF_3$ |
| -174 | F | F | $CF_2CF_2$ | $CHF_2$ |
| -175 | F | F | $CF_2CF_2$ | $OCF_3$ |
| -176 | F | F | $CF_2CF_2$ | $OCHF_2$ |
| -177 | F | F | $CF_2CF_2$ | CN |
| -178 | F | F | $CF_2CF_2$ | $SF_5$ |
| -179 | F | F | $CF_2CF_2$ | NCS |
| -180 | F | F | $CF_2CF_2$ | $SO_2CF_3$ |
| | | | —COO— | |
| -181 | H | H | $CF_2CF_2$ | F |
| -182 | H | H | $CF_2CF_2$ | Cl |
| -183 | H | H | $CF_2CF_2$ | $CF_3$ |
| -184 | H | H | $CF_2CF_2$ | $CHF_2$ |
| -185 | H | H | $CF_2CF_2$ | $OCF_3$ |
| -186 | H | H | $CF_2CF_2$ | $OCHF_2$ |
| -187 | H | H | $CF_2CF_2$ | CN |
| -188 | H | H | $CF_2CF_2$ | $SF_5$ |
| -189 | H | H | $CF_2CF_2$ | NCS |
| -190 | H | H | $CF_2CF_2$ | $SO_2CF_3$ |
| -191 | H | F | $CF_2CF_2$ | F |
| -192 | H | F | $CF_2CF_2$ | Cl |
| -193 | H | F | $CF_2CF_2$ | $CF_3$ |
| -194 | H | F | $CF_2CF_2$ | $CHF_2$ |
| -195 | H | F | $CF_2CF_2$ | $OCF_3$ |
| -196 | H | F | $CF_2CF_2$ | $OCHF_2$ |
| -197 | H | F | $CF_2CF_2$ | CN |
| -198 | H | F | $CF_2CF_2$ | $SF_5$ |
| -199 | H | F | $CF_2CF_2$ | NCS |
| -200 | H | F | $CF_2CF_2$ | $SO_2CF_3$ |
| -201 | F | F | $CF_2CF_2$ | F |
| -202 | F | F | $CF_2CF_2$ | Cl |
| -203 | F | F | $CF_2CF_2$ | $CF_3$ |
| -204 | F | F | $CF_2CF_2$ | $CHF_2$ |
| -205 | F | F | $CF_2CF_2$ | $OCF_3$ |
| -206 | F | F | $CF_2CF_2$ | $OCHF_2$ |
| -207 | F | F | $CF_2CF_2$ | CN |
| -208 | F | F | $CF_2CF_2$ | $SF_5$ |
| -209 | F | F | $CF_2CF_2$ | NCS |
| -210 | F | F | $CF_2CF_2$ | $SO_2CF_3$ |

Still another preferred embodiment of the invention comprises compounds of formula IB:

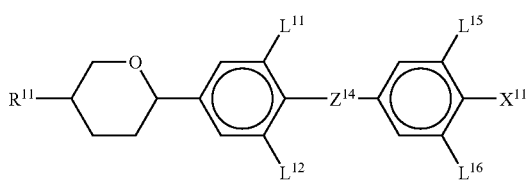

IB wherein $R^{11}$ is an alkyl or alkoxy radical having from 1 to 15 carbon atoms or an alkenyl or alkenyloxy radical having from 2 to 15 carbon atoms or an —O-alkylene-O-alkyl radical having from 2 to 15 carbon atoms, wherein one or more methylene groups of each of said radicals may be replaced independently of each other by —S—, —SiR$^x$R$^y$—, —C≡C—, —CO—O— and/or —O—CO— such that oxygen and/or sulfur atoms are not linked directly to each other, said radicals being unsubstituted or mono-substituted with a —CN group or mono- or poly-substituted with halogen; preferably $R^{11}$ is a straight-chain alkyl, alkoxy, alkenyl, alkenyloxy or —O-alkylene-O-alkyl radical with up to 10 carbon atoms, said radicals being unsubstituted or mono- or poly-substituted with halogen;

$L^{11}$ is an alkyl or alkoxy radical having from 1 to 15 carbon atoms or an alkenyl or alkenyloxy radical having from 2 to 15 carbon atoms or an —O-alkylene-O-alkyl radical having from 2 to 15 carbon atoms, wherein one or more methylene groups of each of said radicals may be replaced independently of each other by —S—, —SiR$^x$R$^y$—, —C≡C—, —CO—O— and/or —O—CO— such that oxygen and/or sulfur atoms are not linked directly to each other, said radicals being unsubstituted or mono-substituted with a —CN group or mono- or poly-substituted with halogen; preferably $L^{11}$ is a straight-chain alkyl, alkoxy, alkenyl, alkenyloxy or —O-alkylene-O-alkyl radical with up to 10 carbon atoms, said radicals being unsubstituted or mono- or poly-substituted with halogen;

$L^{12}$ is hydrogen, halogen, an alkyl or alkoxy radical having from 1 to 15 carbon atoms or an alkenyl or alkenyloxy radical having from 2 to 15 carbon atoms or an —O-alkylene-O-alkyl radical having from 2 to 15 carbon atoms, wherein one or more methylene groups of each of said radicals may be replaced independently of each other by —S—, —SiR$^x$R$^y$—, —C≡C—, —CO—O— and/or —O—CO— such that oxygen and/or sulfur atoms are not linked directly to each other, said radicals being unsubstituted or mono-substituted with a —CN group or mono- or poly-substituted with halogen; preferably $L^{12}$ is H, F, a straight-chain alkyl, alkoxy, alkenyl, alkenyloxy or —O-alkylene-O-alkyl radical with up to 10 carbon atoms, said radicals being unsubstituted or mono- or poly-substituted with halogen;

whereby it is further preferred that at least one of $R^{11}$, $L^{11}$ and $L^{12}$ is one of said straight-chain alkyl, alkoxy, alkenyl, alkenyloxy or —O-alkylene-O-alkyl radicals;

$L^{15}$ and $L^{16}$ are independently of each other H or F; preferably at least $L^{15}$ is F;

$Z^{14}$ is a single bond, —CH$_2$CH$_2$—,(—CH$_2$CH$_2$—)$_2$, —CF$_2$—CF$_2$—, —CF$_2$—CH$_2$—, —CH$_2$—CF$_2$—, —CH=CH—, —CF=CF—, —CF=CH—, —CH=CF—, —C≡C—, —CH$_2$O—, —OCH$_2$—, —CF$_2$O—, —OCF$_2$—, —CO—O— or —O—CO—; preferably $Z^{14}$ is a single bond, —CF$_2$O— or —CO$_2$—;

$X^{11}$ is F, Cl, —CN, —NCS, —SF$_5$, —SO$_2$—$R^z$, an alkyl or alkoxy radical having from 1 to 15 carbon atoms, wherein one or more methylene groups of said alkyl or alkoxy radical may be replaced independently of each other by —O—, —S—, —SiR$^x$R$^y$—, —CH=CH—, —C≡C—, —CO—O— and/or —O—CO— such that oxygen and/or sulfur atoms are not linked directly to each other, said alkyl or alkoxy radical being unsubstituted or mono-substituted with a —CN group or mono- or poly-substituted with halogen; preferably $X^{11}$ is F, Cl, CF$_3$, OCF$_3$, OCHF$_2$, NCS, SF$_5$ or —SO$_2$—$R^z$;

$R^x$ and $R^y$ are independently of each other hydrogen or an alkyl radical having from 1 to 7 carbon atoms; preferably both $R^x$ and $R^y$ are methyl, ethyl, propyl or butyl;

$R^z$ is an alkyl radical having from 1 to 7 carbon atoms, said alkyl radical being unsubstituted or mono- or poly-substituted with halogen; preferably $R^z$ is CF$_3$, C$_2$F$_5$ or n-C$_4$F$_9$.

Examples of compounds of said preferred embodiment are the following compounds:

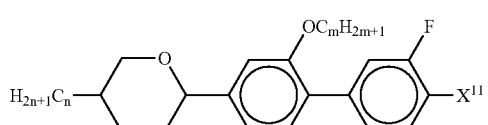

IB-1

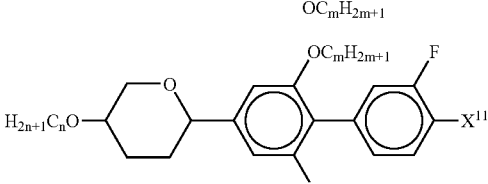

IB-2

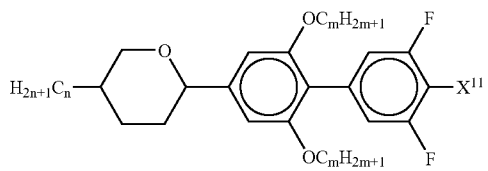

IB-3

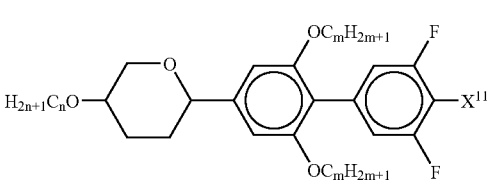

IB-4

-continued

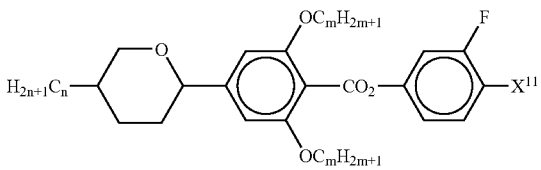

IB-5

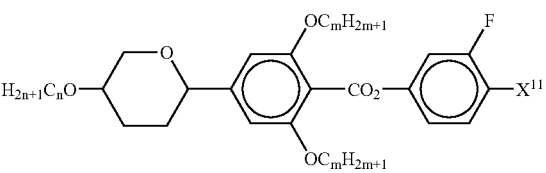

IB-6

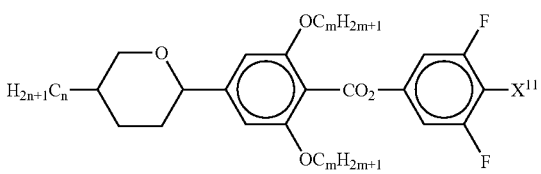

IB-7

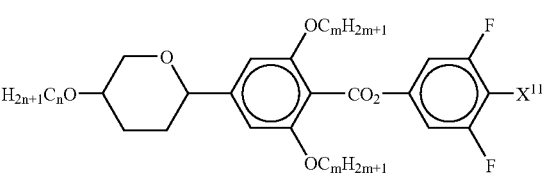

IB-8

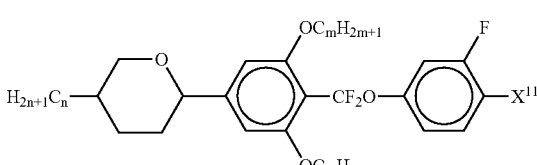

IB-9

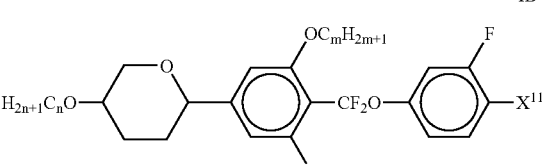

IB-10

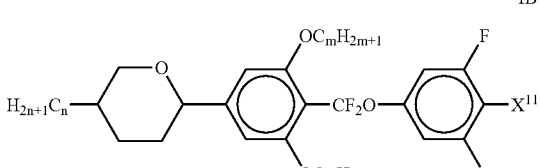

IB-11

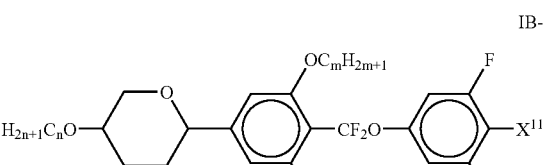

IB-12 wherein n and m are independently of each other 1, 2, 3, 4, 5, 6, 7 or 8 and $X^{11}$ is CN, NCS, $SF_5$, $SO_2CF_3$, $SO_2C_2F_5$, $SO_2C_4F_9$, F, $CF_3$, $CHF_2$, $C_2F_5$, —CH=$CF_2$, —CF=$CF_2$, —O—$CH_3$, —O—$C_2H_5$, —O—$C_3H_7$, —O-n-$C_4H_9$, —O-n-$C_5H_{11}$, —O-n-$C_6H_{13}$, —O—$CF_3$, —O—$CHF_2$, —O—$C_2F_5$, —O—$C_3F_7$, —O-n-$C_4F_9$ with CN, $SO_2CF_3$, F, $CF_3$, —O—$CF_3$ being preferred. Preferably, n and m are the same number and equal to 1, 2, 3, 4, 5 or 6. If present twice in the same compound, both $C_mH_{2m+1}O$ substituents may have the same value for m or different ones; preferably m in two $C_mH_{2m+1}O$ substituents have the same meaning. Furthermore, one or more of the hydrogen atoms of the $C_nH_{2n+1}$, the $OC_nH_{2n+1}$ and the $OC_mH_{2m+1}$ moiety, respectively, may be replaced by a halogen atom, preferably a fluorine atom. Particularly preferred are compounds of formulas IB-1 to IB-12 with $X^{11}$ being F, $CF_3$ or $OCF_3$, especially F.

Further preferred embodiments of the invention comprise compounds of formulas IC or ID:

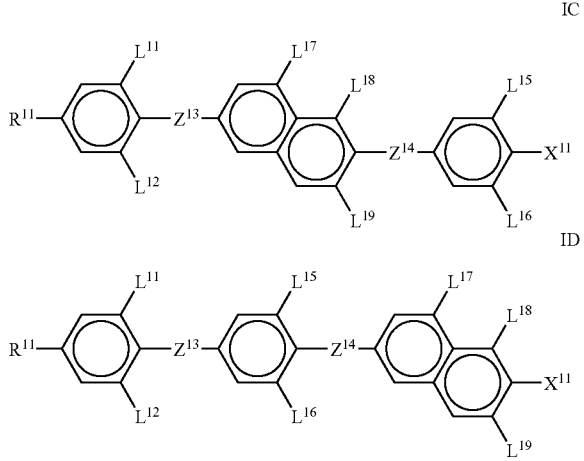

IC

ID wherein $R^{11}$ is an alkyl or alkoxy radical having from 1 to 15 carbon atoms or an alkenyl or alkenyloxy or —O-alkylene-O-alkyl radical having from 2 to 15 carbon atoms, wherein one or more methylene groups of each of said radicals may be replaced independently of each other by —S—, —$SiR^xR^y$—, —C≡C—, —CO—O— and/or —O—CO— such that oxygen and/or sulfur atoms are not linked directly to each other, said radicals being unsubstituted or mono-substituted with a —CN group or mono- or poly-substituted with halogen; preferably $R^{11}$ is a straight-chain alkyl, alkoxy, alkenyl, alkenyloxy or —O-alkylene-O-alkyl radical with up to 10 carbon atoms, said radicals being unsubstituted or mono- or poly-substituted with halogen;

$L^{11}$ is an alkyl or alkoxy radical having from 1 to 15 carbon atoms or an alkenyl or alkenyloxy or —O-alkylene-O-alkyl radical having from 2 to 15 carbon atoms, wherein one or more methylene groups of each of said radicals may be replaced independently of each other by —S—, —$SiR^xR^y$—, —C≡C—, —CO—O— and/or —O—CO— such that oxygen- and/or sulfur atoms are not linked directly to each other, said radicals being unsubstituted or mono-substituted with a —CN group or mono- or poly-substituted with halogen; preferably, $L^{11}$ is a straight-chain alkyl, alkoxy, alkenyl, alkenyloxy or —O-alkylene- O-alkyl radical with up to 10 carbon atoms, said radicals being unsubstituted or mono- or poly-substituted with halogen;

$L^{12}$ is hydrogen, halogen, an alkyl or alkoxy radical having from 1 to 15 carbon atoms or an alkenyl or alkenyloxy or —O-alkylene-O-alkyl radical having from 2 to 15 carbon atoms, wherein one or more methylene groups of each of said radicals may be replaced independently of each other by —S—, —$SiR^xR^y$—, —C≡C—, —CO—O— and/or —O—CO— such that oxygen and/or sulfur atoms are not linked directly to each other, said radicals being unsubstituted or mono-substituted with a —CN group or mono- or poly-substituted with halogen;

preferably, $L^{12}$ is H, F, a straight-chain alkyl, alkoxy, alkenyl, alkenyloxy or —O-alkylene-O-alkyl radical with up to 10 carbon atoms, said radicals being unsubstituted or mono- or poly-substituted with halogen;

whereby it is preferred that at least one of $R^{11}$, $L^{11}$ and $L^{12}$ is one of said preferred straight-chain alkyl, alkoxy, alkenyl, alkenyloxy or —O-alkylene-O-alkyl radicals;

$L^{15}$, $L^{16}$, $L^{17}$, $L^{18}$ and $L^{19}$ are independently of each other H or F; preferably at least $L^{15}$ and $L^{18}$ are both F;

$Z^{13}$ and $Z^{14}$ are independently of each other a single bond, —$CH_2CH_2$—, (—$CH_2CH_2$—)$_2$, —$CF_2$—$CF_2$—, —$CF_2$—$CH_2$—, —$CH_2$—$CF_2$—, —CH=CH—, —CF=CF—, —CF=CH—, —CH=CF—, —C≡C—, —$CH_2$O—, —$OCH_2$—, —$CF_2$O—, —$OCF_2$—, —CO—O— or —O—CO— whereby at least one of $Z^{13}$ and $Z^{14}$ is a single bond; preferably $Z^{13}$ and $Z^{14}$ are both a single bond or one of $Z^{13}$ and $Z^{14}$ is —$CF_2$O— or —$CO_2$—;

$X^{11}$ is F, Cl, —CN, —NCS, —$SF_5$, —$SO_2$—$R^z$, an alkyl or alkoxy radical having from 1 to 15 carbon atoms, wherein one or more methylene groups of said alkyl or alkoxy radical may be replaced independently of each other by —O—, —S—, —$SiR^xR^y$—, —CH=CH—, —C≡C—, —CO—O— and/or —O—CO— such that oxygen and/or sulfur atoms are not linked directly to each other, said alkyl or alkoxy radical being unsubstituted or mono-substituted with a —CN group or mono- or poly-substituted with halogen; preferably $X^{11}$ is F, Cl, $CF_3$, $OCF_3$, $OCHF_2$, NCS, $SF_5$ or —$SO_2$—$R^z$;

$R^x$ and $R^y$ are independently of each other hydrogen or an alkyl radical having from 1 to 7 carbon atoms; preferably both $R^x$ and $R^y$ are methyl, ethyl, propyl or butyl; and $R^z$ is an alkyl radical having from 1 to 7 carbon atoms, said alkyl radical being unsubstituted or mono- or poly-substituted with halogen; preferably $R^z$ is $CF_3$, $C_2F_5$ or n-$C_4F_9$.

Examples of said preferred compounds of formula IC are the following ones:

IC-1

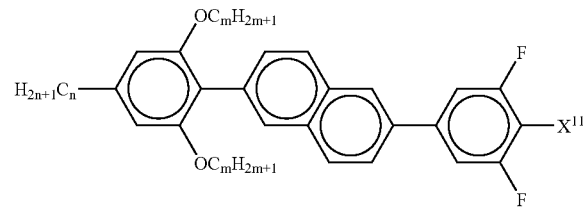

-continued
IC-2
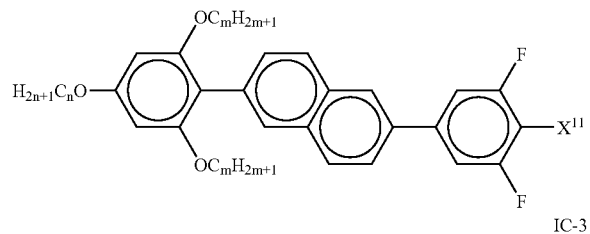
IC-3
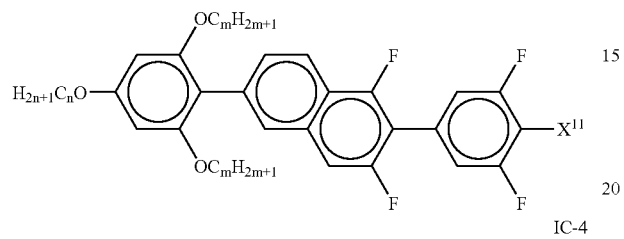
IC-4
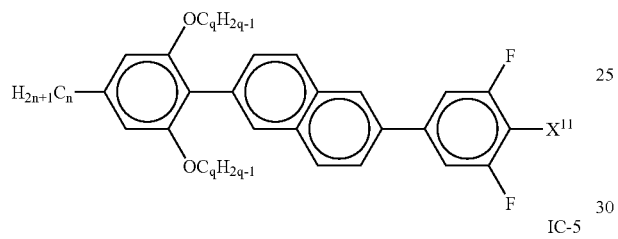
IC-5
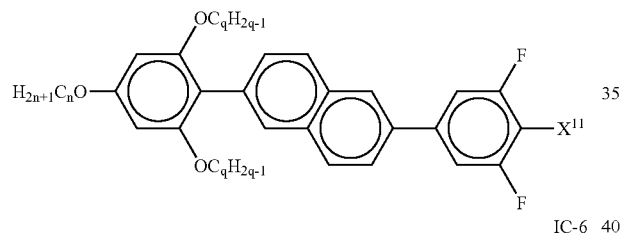
IC-6
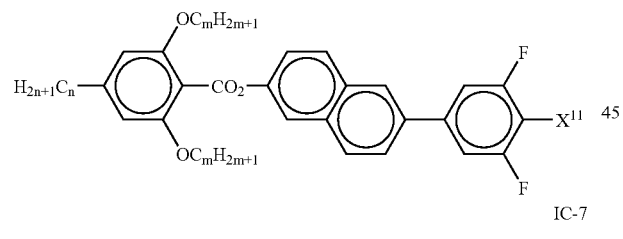
IC-7
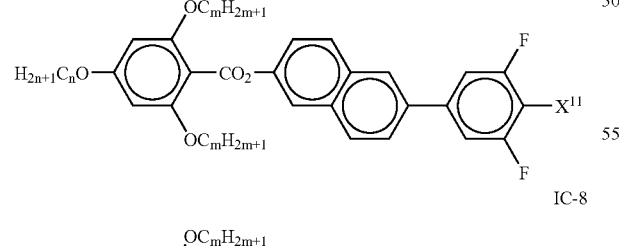
IC-8
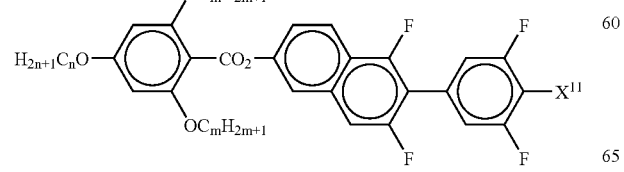
-continued
IC-9
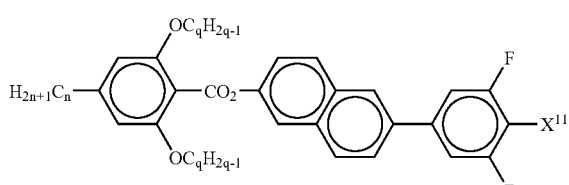
IC-10
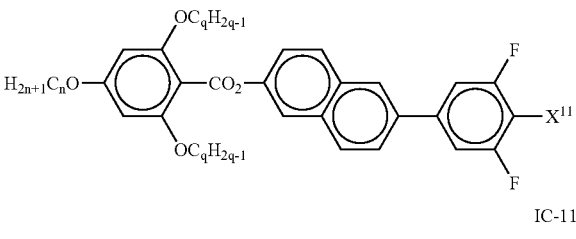
IC-11
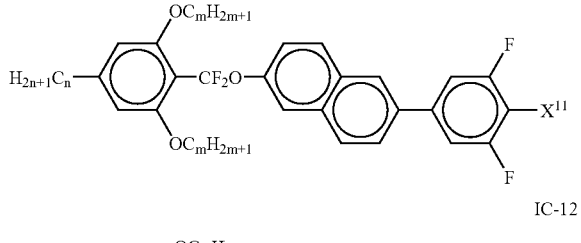
IC-12
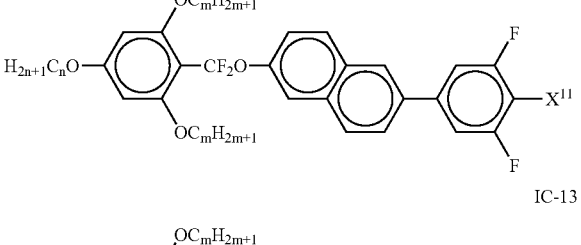
IC-13
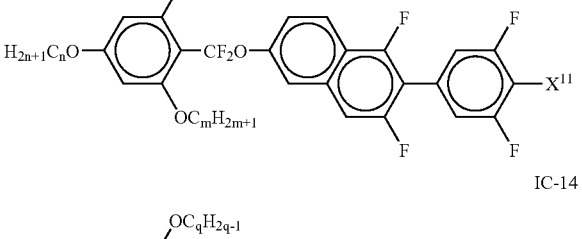
IC-14
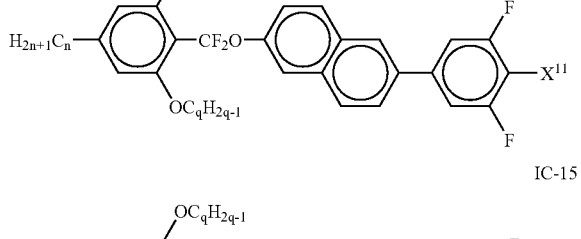
IC-15

-continued

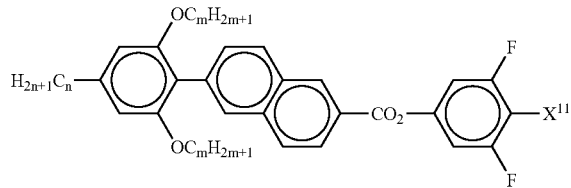
IC-16

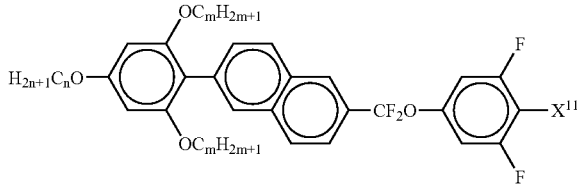
IC-22

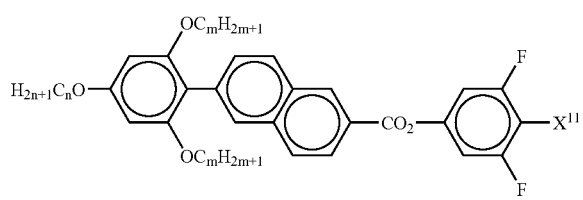
IC-17

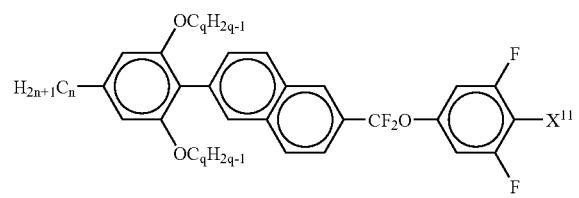
IC-23

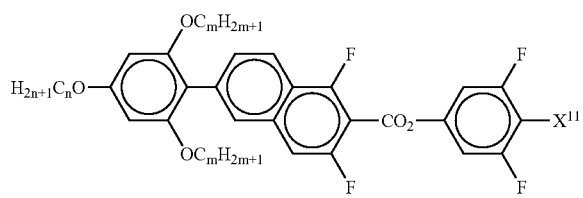
IC-18

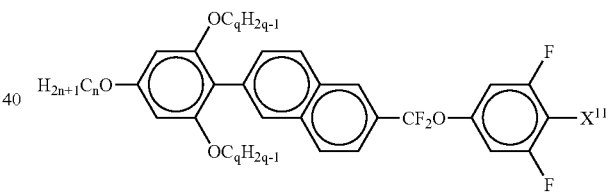
IC-24

IC-19

IC-25

IC-20

IC-21

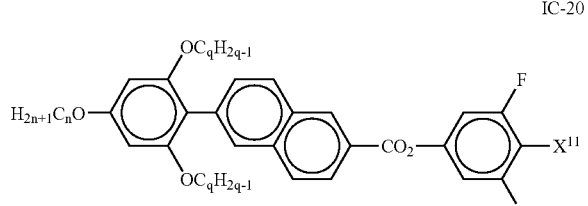

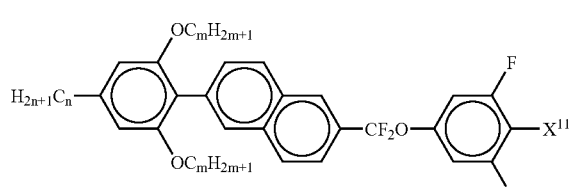

wherein n and m are independently of each other 1, 2, 3, 4, 5, 6, 7 or 8; q is 2, 3, 4, 5, 6, 7 or 8; and $X^{11}$ is CN, NCS, $SF_5$, $SO_2CF_3$, $SO_2C_2F_5$, $SO_2C_4F_9$, F, $CF_3$, $CHF_2$, $C_2F_5$, —CH=$CF_2$, —CF=$CF_2$, —O—$CH_3$, —O—$C_2H_5$, —O—$C_3H_7$, —O-n-$C_4H_9$, —O-n-$C_5H_{11}$, O-n-$C_6H_{13}$, —O—$CF_3$, —O—$CHF_2$, —O—$C_2F_5$, —O—$C_3F_7$, —O-n-$C_4F_9$ with CN, $SO_2CF_3$, F, $CF_3$, —O—$CF_3$ being preferred. If present twice in the same compound, both $C_mH_{2m+1}O$ substituents may have the same value for m or different ones; preferably in two $C_mH_{2m+1}O$ substituents m is the same integer. Similarly, if present twice in the same compound, both $C_qH_{2q-1}O$ substituents may have the same value for q or different ones; preferably in two $C_qH_{2q-1}O$ substituents q is the same integer. Preferably, n and m are the same number and equal to 1, 2, 3, 4, 5 or 6. Furthermore, one or more of the hydrogen atoms of the $C_nH_{2n+1}$, the $OC_nH_{2n+1}$, the $OC_mH_{2m+1}$ and the $OC_qH_{2q-1}$ moiety, respectively, may be replaced by a halogen atom, preferably a fluorine atom. Particularly preferred are compounds of formulas IC-1 to IC-25 with $X^{11}$ being F, $CF_3$ or $OCF_3$, especially F.

Examples of said preferred compounds of formula ID are the following ones:

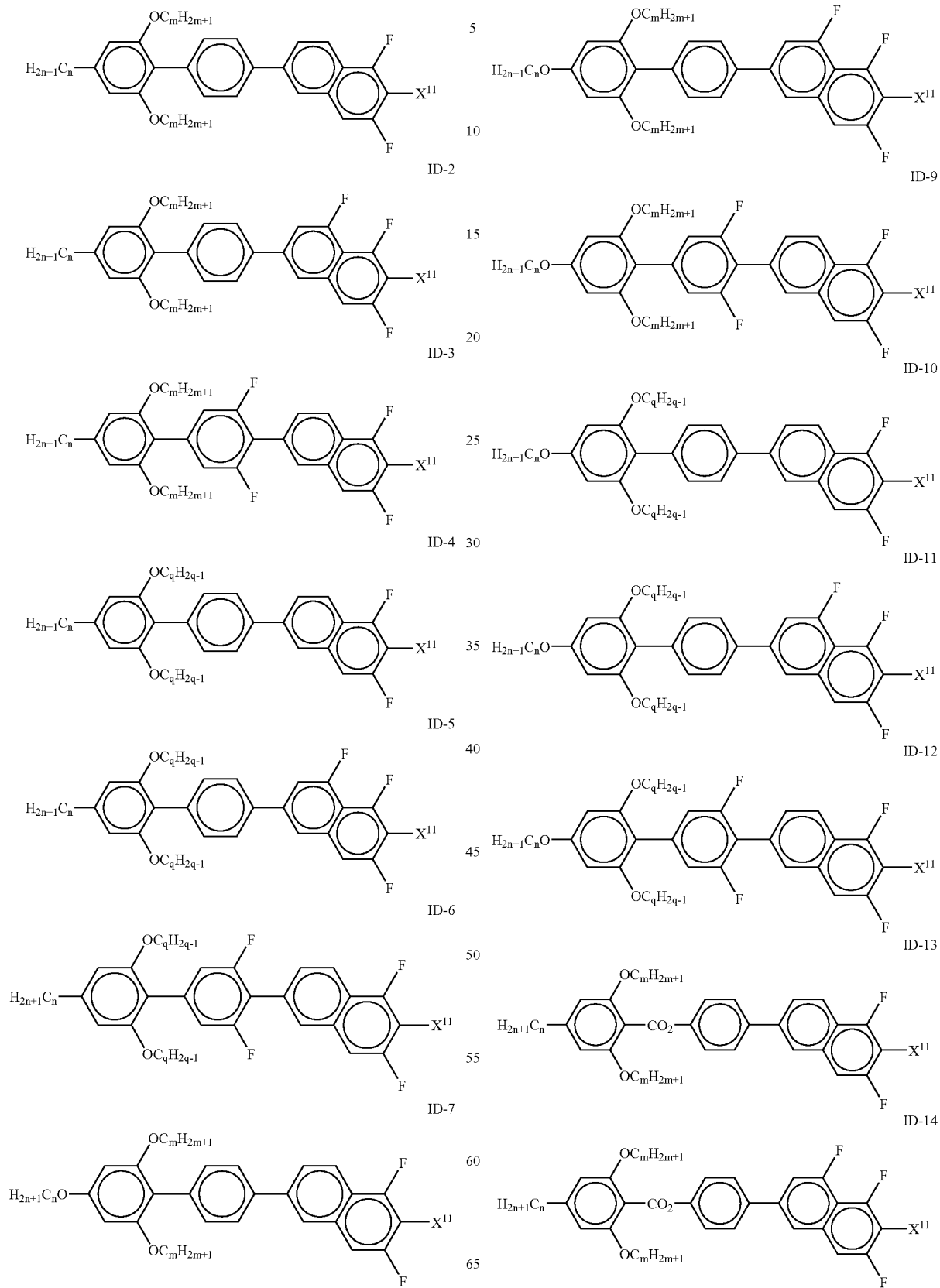

-continued
ID-15
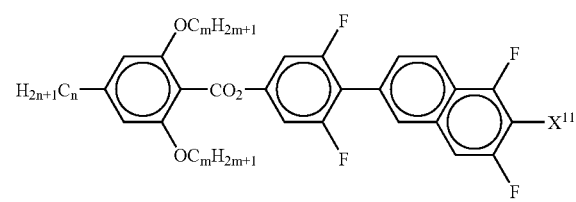
ID-16
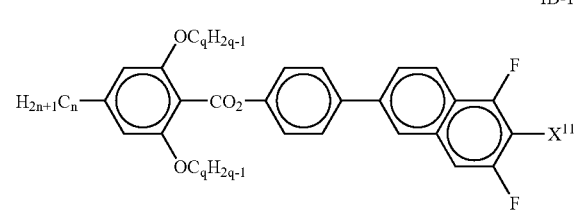
ID-17
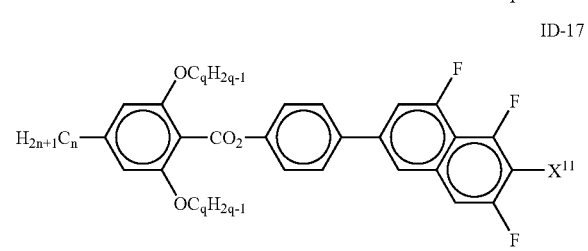
ID-18
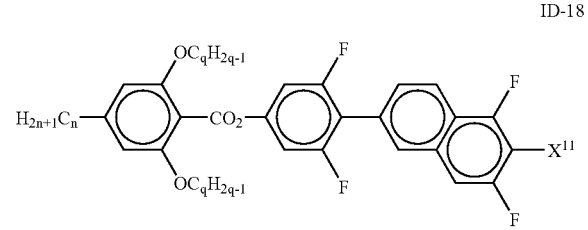
ID-19
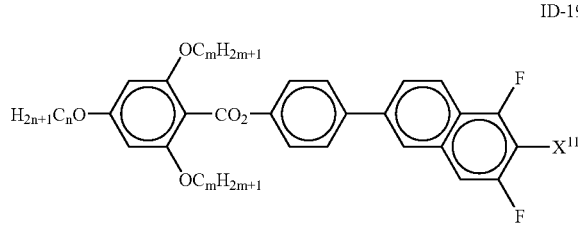
ID-20
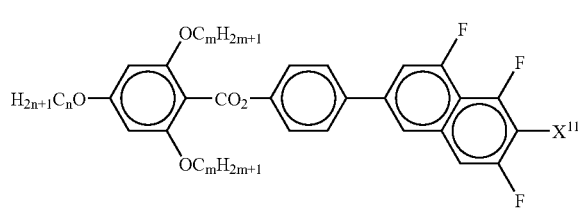
ID-21
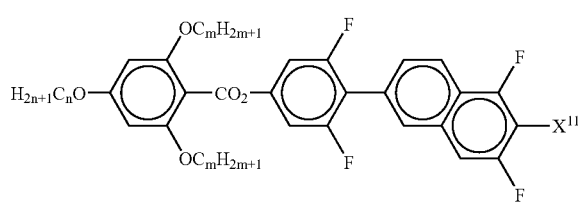
-continued
ID-22
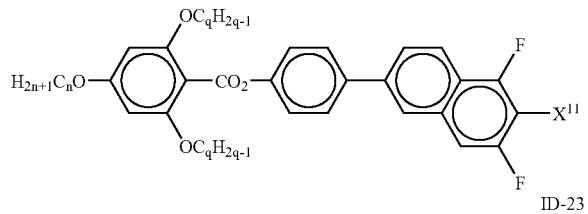
ID-23
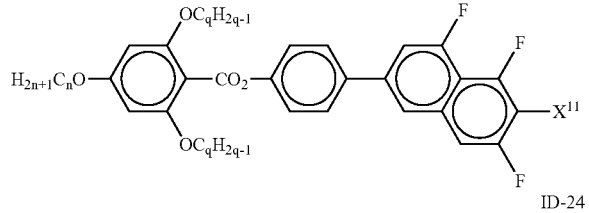
ID-24
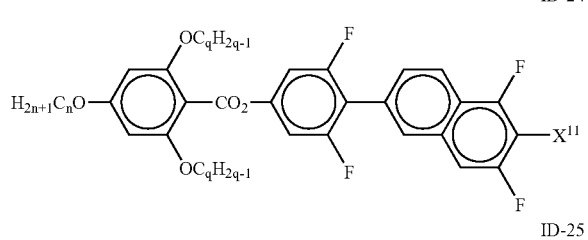
ID-25
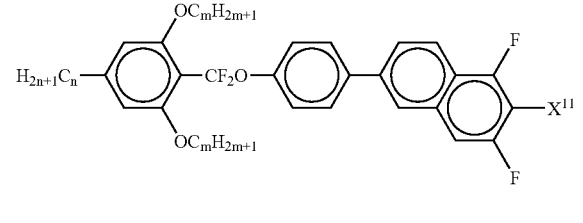
ID-26
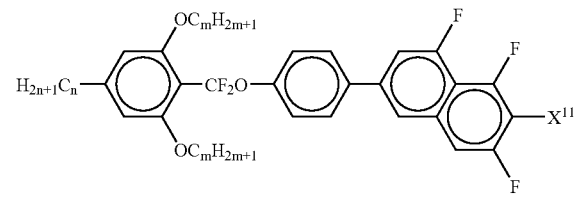
ID-27
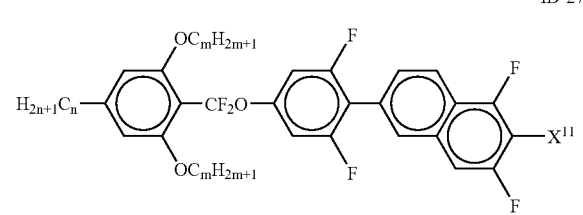
ID-28
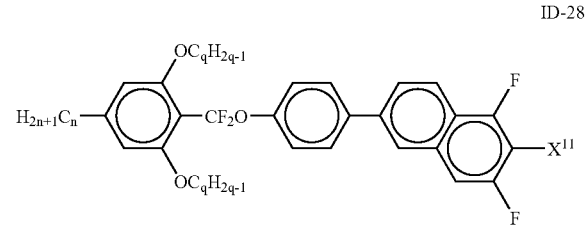

-continued
ID-29
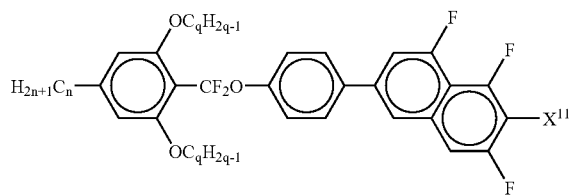
ID-30
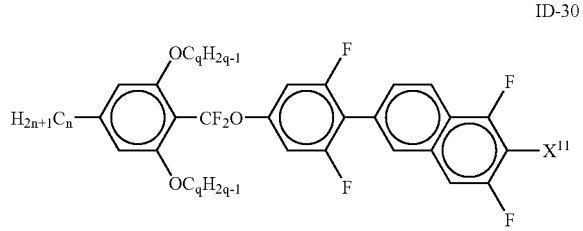
ID-31
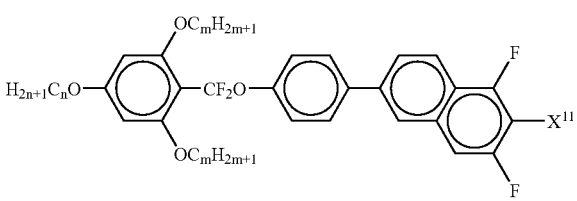
ID-32
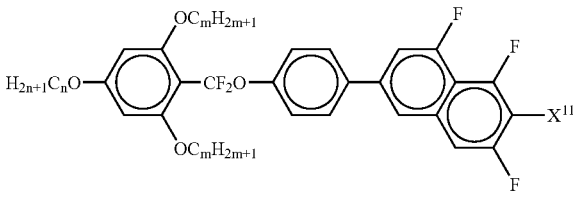
ID-33
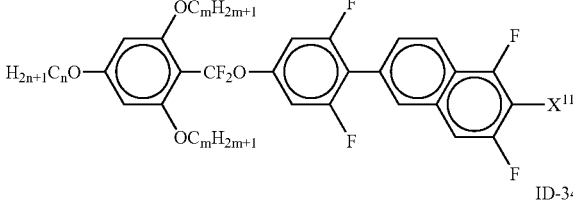
ID-34
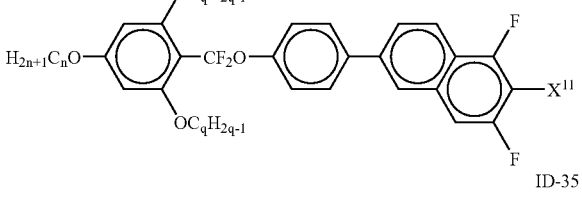
ID-35
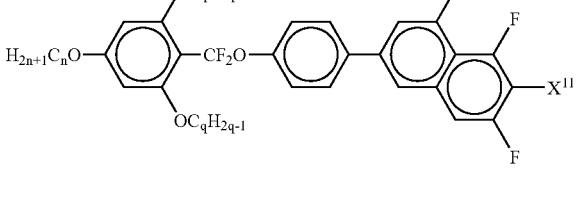
-continued
ID-36
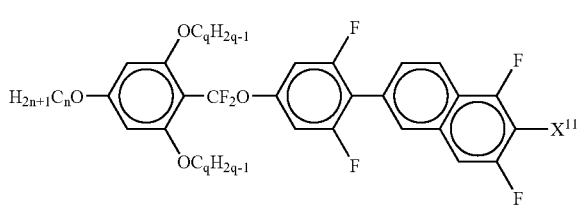
ID-37
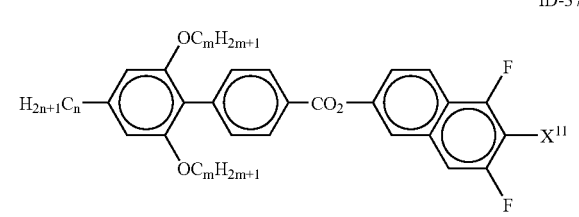
ID-38
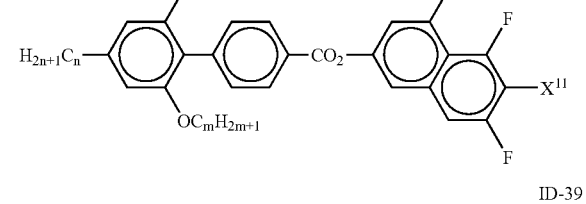
ID-39
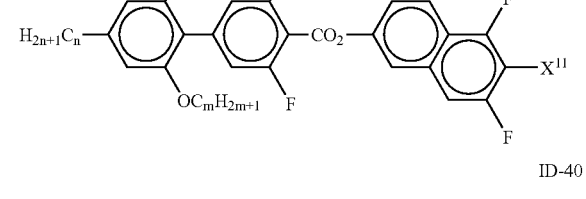
ID-40
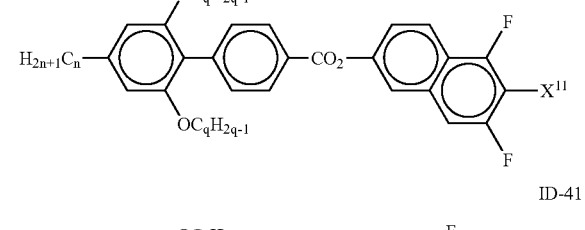
ID-41
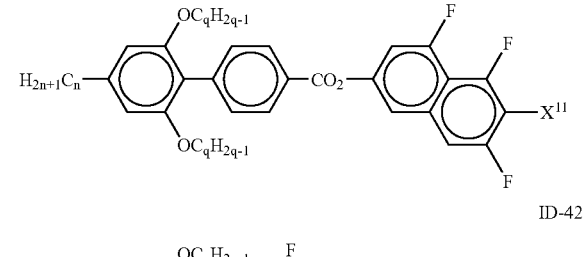
ID-42
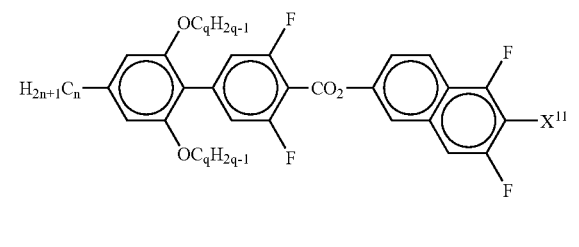

-continued

-continued

ID-57
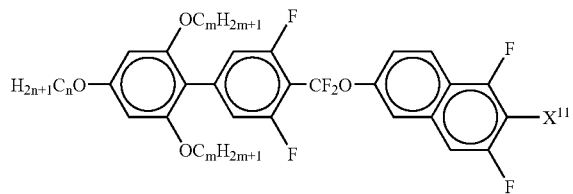

ID-58
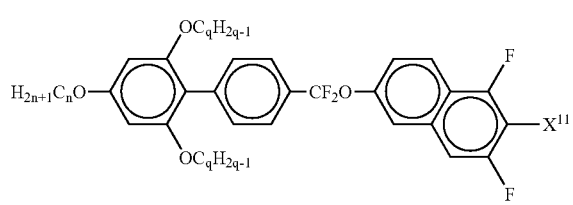

ID-59
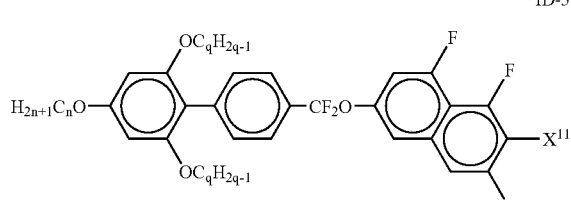

ID-60
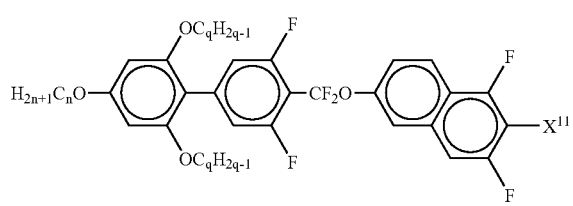

wherein n and m are independently of each other 1, 2, 3, 4, 5, 6, 7 or 8; q is 2, 3, 4, 5, 6, 7 or 8; and $X^{11}$ is CN, NCS, SF$_5$, SO$_2$CF$_3$; SO$_2$C$_2$F$_5$, SO$_2$C$_4$F$_9$, F, CF$_3$, CHF$_2$, C$_2$F$_5$, —CH=CF$_2$, —CF=CF$_2$, —O—CH$_3$, —O—C$_2$H$_5$, —O—C$_3$H$_7$, —O-n-C$_4$H$_9$, —O-n-C$_5$H$_{11}$, O-n-C$_6$H$_{13}$, —O—CF$_3$, —O—CHF$_2$, —O—C$_2$F$_5$, —O—C$_3$F$_7$, —O-n-C$_4$F$_9$ with CN, SO$_2$CF$_3$, F, CF$_3$, —O—CF$_3$ being preferred. If present twice in the same compound, both C$_m$H$_{2m+1}$O substituents may have the same value for m or different ones; preferably in two C$_m$H$_{2m+1}$O substituents m is the same integer. Similarly, if present twice in the same compound, both C$_q$H$_{2q-1}$O substituents may have the same value for q or different ones; preferably in two C$_q$H$_{2q-1}$O substituents q is the same integer. Preferably, n and m are the same number and equal to 1, 2, 3, 4, 5 or 6. Furthermore, one or more of the hydrogen atoms of the C$_n$H$_{2n+1}$, the OC$_n$H$_{2n+1}$, the OC$_m$H$_{2m+1}$ an the C$_q$H$_{2q-1}$ moiety, respectively, may be replaced by a halogen atom, preferably a fluorine atom. Particularly preferred are compounds of formulas ID-1 to ID-60 with $X^{11}$ being F, CF$_3$ or OCF$_3$, especially F.

Further preferred embodiments of the invention comprise compounds of formulas IE or IF:

IE
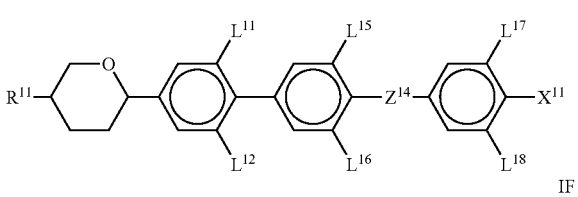

IF wherein $R^{11}$ is an alkyl or alkoxy radical having from 1 to 15 carbon atoms or an alkenyl or alkenyloxy or —O-alkylene-O-alkyl radical having from 2 to 15 carbon atoms, wherein one or more methylene groups of each of said radicals may be replaced independently of each other by —S—, —SiR$^x$R$^y$—, —C≡C—, —CO—O— and/or —O—CO— such that oxygen and/or sulfur atoms are not linked directly to each other, said radicals being unsubstituted or mono-substituted with a —CN group or mono- or poly-substituted with halogen; preferably $R^{11}$ is a straight-chain alkyl, alkoxy, alkenyl, alkenyloxy or —O-alkylene-O-alkyl radical with up to 10 carbon atoms, said radicals being unsubstituted or mono- or poly-substituted with halogen;

$L^{11}$ is an alkyl or alkoxy radical having from 1 to 15 carbon atoms or an alkenyl or alkenyloxy or —O-alkylene-O-alkyl radical having from 2 to 15 carbon atoms, wherein one or more methylene groups of each of said radicals may be replaced independently of each other by —S—, —SiR$^x$R$^y$—, —C≡C—, —CO—O— and/or —O—CO— such that oxygen and/or sulfur atoms are not linked directly to each other, said radicals being unsubstituted or mono-substituted with a —CN group or mono- or poly-substituted with halogen; preferably $L^{11}$ is a straight-chain alkyl, alkoxy, alkenyl, alkenyloxy or —O-alkylene-O-alkyl radical with up to 10 carbon atoms, said radicals being unsubstituted or mono- or poly-substituted with halogen;

$L^{12}$ is hydrogen, halogen, an alkyl or alkoxy radical having from 1 to 15 carbon atoms or an alkenyl or alkenyloxy or —O-alkylene-O-alkyl radical having from 2 to 15 carbon atoms, wherein one or more methylene groups of each of said radicals may be replaced independently of each other by —S—, —SiR$^x$R$^y$—, —C≡C—, —CO—O— and/or —O—CO— such that oxygen and/or sulfur atoms are not linked directly to each other, said radicals being unsubstituted or mono-substituted with a —CN group or mono- or poly-substituted with halogen; preferably $L^{12}$ is H, F, a straight-chain alkyl, alkoxy, alkenyl, alkenyloxy or —O-alkylene-O-alkyl radical with up to 10 carbon atoms, said radicals being unsubstituted or mono- or poly-substituted with halogen;

whereby at least one of $R^{11}$, $L^{11}$ and $L^{12}$ is one of said straight-chain alkyl, alkoxy, alkenyl, alkenyloxy or —O-alkylene-O-alkyl radicals;

$L^{15}$, $L^{16}$, $L^{17}$, $L^{18}$, $L^{19a}$, $L^{19b}$ and $L^{19c}$ are independently of each other H or F; preferably both $L^{17}$ and $L^{19b}$ are F;

$Z^{14}$ is a single bond, —CH$_2$CH$_2$—, (—CH$_2$CH$_2$—)$_2$, —CF$_2$—CF$_2$—, —CF$_2$—CH$_2$—, —CH$_2$—CF$_2$—, —CH=CH—, —CF=CF—, —CF=CH—, —CH=CF—, —C≡C—, —CH$_2$O—, —OCH$_2$—, —CF$_2$O—, —OCF$_2$—, —CO—O— or —O—CO—; preferably $Z^{14}$ is a single bond, —CF$_2$O— or —CO$_2$—;

$X^{11}$ is F, Cl, —CN, —NCS, —SF$_5$, —SO$_2$—$_{R^z}$, an alkyl or alkoxy radical having from 1 to 15 carbon atoms, wherein one or more methylene groups of said alkyl or alkoxy radical may be replaced independently of each other by —O—, —S—, —SiR$^x$R$^y$—, —CH=CH—, —C≡C—, —CO—O— and/or —O—CO— such that oxygen and/or sulfur atoms are not linked directly to each other, said alkyl or alkoxy radical being unsubstituted or mono-substituted with a —CN group or mono- or poly-substituted with halogen; preferably $X^1$ is F, Cl, CF$_3$, OCF$_3$, OCHF$_2$, NCS, SF$_5$ or —SO$_2$—R$^z$;

R$^x$ and R$^y$ are independently of each other hydrogen or an alkyl radical having from 1 to 7 carbon atoms; preferably both R$^x$ and R$^y$ are methyl, ethyl, propyl or butyl; and;

R$^z$ is an alkyl radical having from 1 to 7 carbon atoms, said alkyl radical being unsubstituted or mono- or poly-substituted with halogen; preferably R$^z$ is CF$_3$, C$_2$F$_5$ or n-C$_4$F$_9$.

Examples of said preferred compounds of formula IE are the following ones:

IE-1

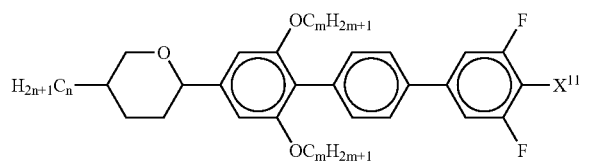

IE-2

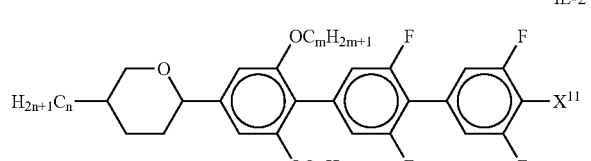

IE-3

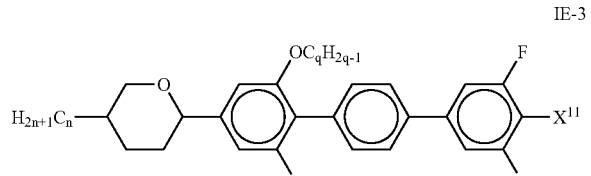

IE-4

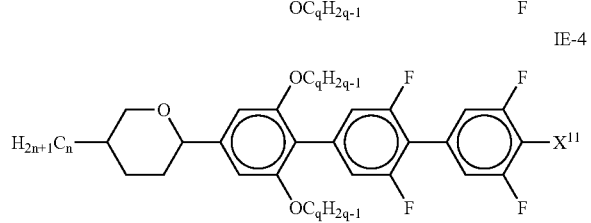

-continued

IE-5

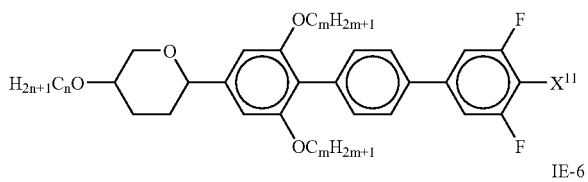

IE-6

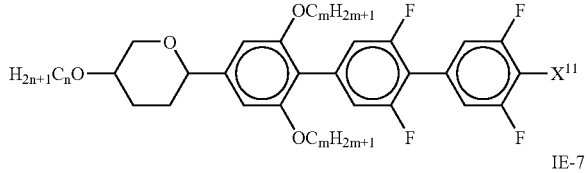

IE-7

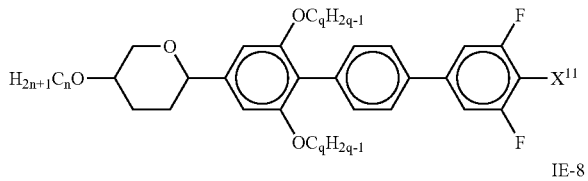

IE-8

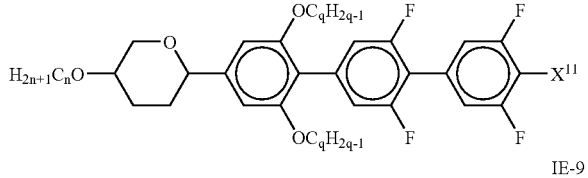

IE-9

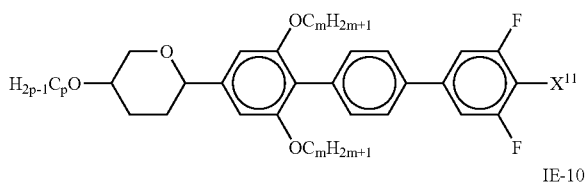

IE-10

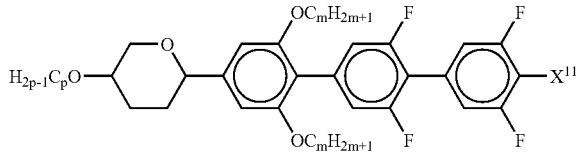

IE-11

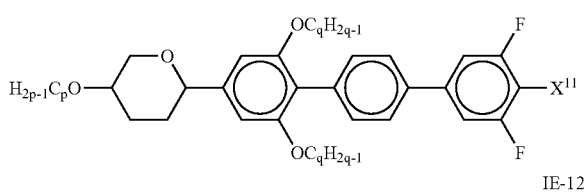

IE-12

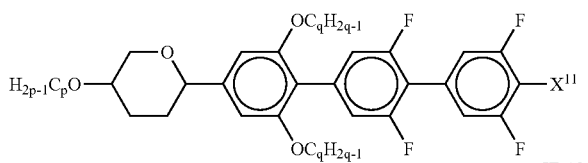

IE-13

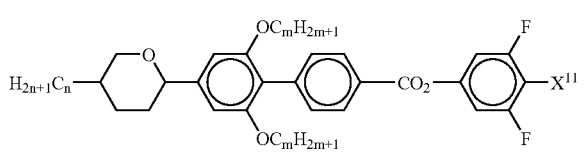

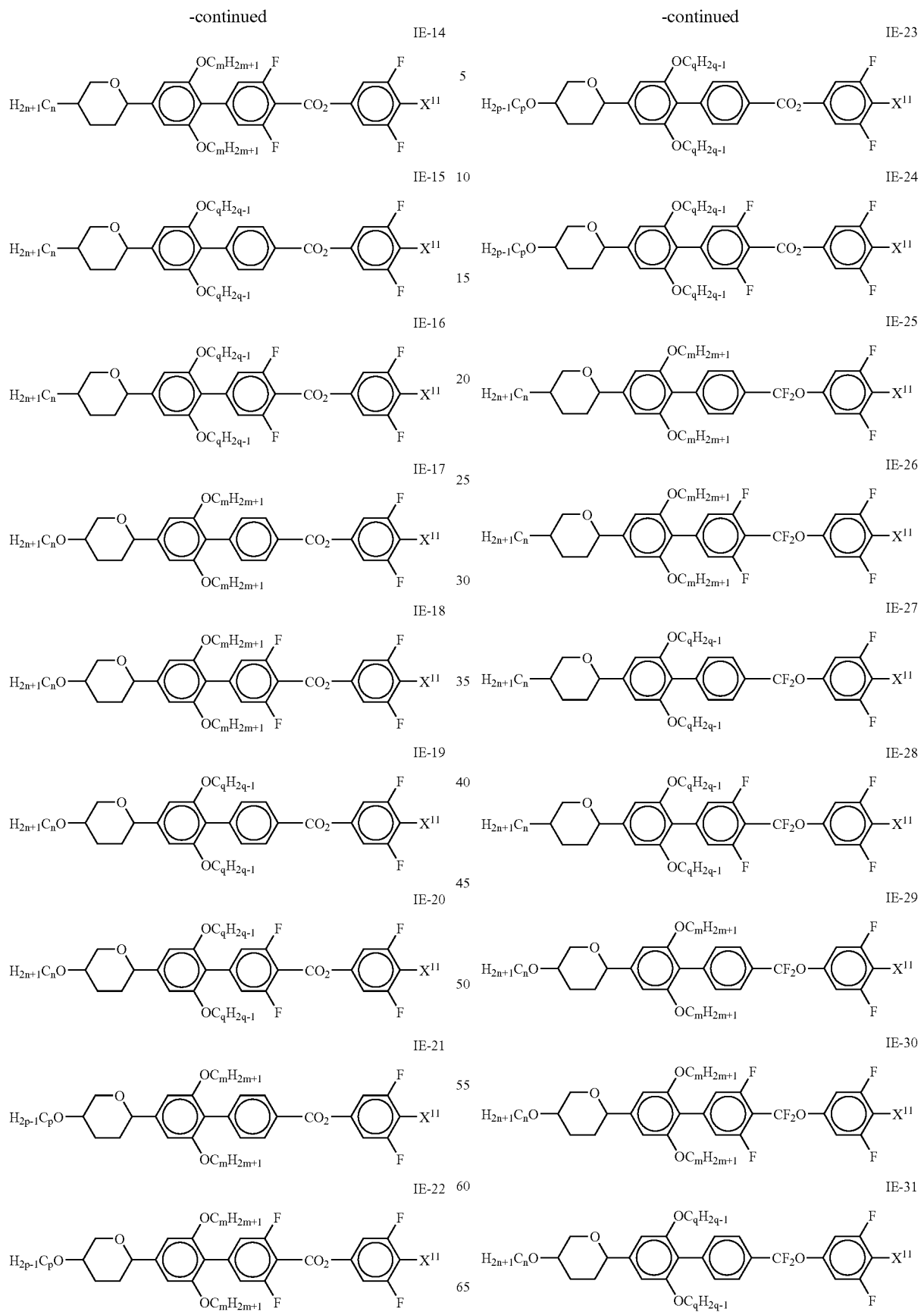

wherein n and m are independently of each other 1, 2, 3, 4, 5, 6, 7 or 8; q and p are independently of each other 2, 3, 4, 5, 6, 7 or 8; and $X^{11}$ is CN, NCS, $SF_5$, $SO_2CF_3$, $SO_2C_2F_5$, $SO_2C_4F_9$, F, $CF_3$, $CHF_2$, $C_2F_5$, —CH=$CF_2$, —CF=$CF_2$, —O—$CH_3$, —O—$C_2H_5$, —O—$C_3H_7$, —O-n-$C_4H_9$, —O-n-$C_5H_{11}$, O-n-$C_6H_{13}$, —O—$CF_3$, —O—$CHF_2$, —O—$C_2F_5$, —O—$C_3F_7$, —O-n-$C_4F_9$ with NCS, $SF_5$, $SO_2CF_3$, $SO_2C_2F_5$, $SO_2C_4F_9$, F, $CF_3$, $OCF_3$ being preferred. If present twice in the same compound, both $C_mH_{2m+1}O$ substituents may have the same value for m or different ones; preferably in two $C_mH_{2m+1}O$ substituents m is the same integer. Similarly, if present twice in the same compound, both. $C_qH_{2q-1}O$ substituents may have the same value for q or different ones; preferably in two $C_qH_{2q-1}O$ substituents q is the same integer. Preferably, n and m are the same number and equal to 1, 2, 3, 4, 5 or 6. Likewise it is preferred that both q and p are the same number and equal to 3, 4, 5, 6. Furthermore, one or more of the hydrogen atoms of the $C_nH_{2n+1}$, the $OC_nH_{2n+1}$, the $OC_mH_{2m+1}$, the $OC_pH_{2p-1}$ and the $OC_qH_{2q-1}$ moiety, respectively, may be replaced by a halogen atom, preferably a fluorine atom. Particularly preferred are compounds of formulas IE-1 to IE-36 with $X^{11}$ being NCS, $SF_5$, $SO_2CF_3$, $SO_2C_2F_5$, $SO_2C_4F_9$.

Examples of said preferred compounds of formula IF are the following ones:

-continued

-continued
IF-23
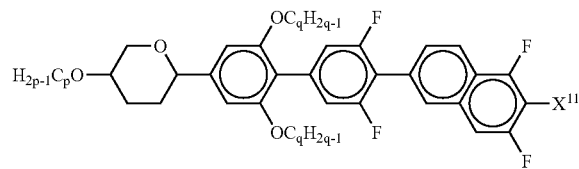
IF-24
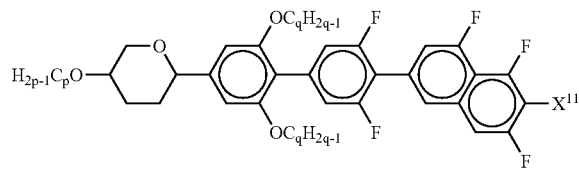
IF-25
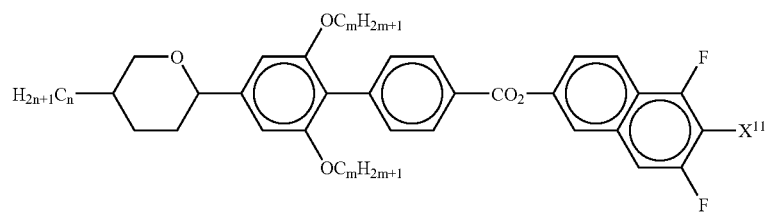
IF-26
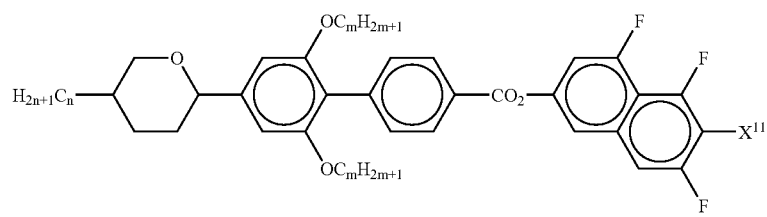
IF-27
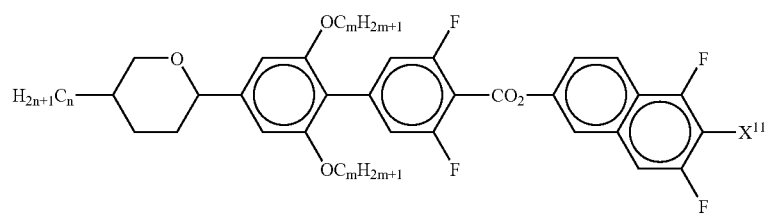
IF-28
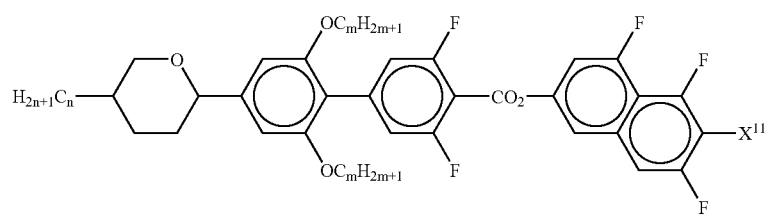
IF-29
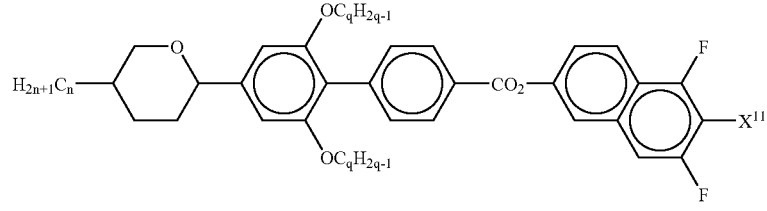
IF-30
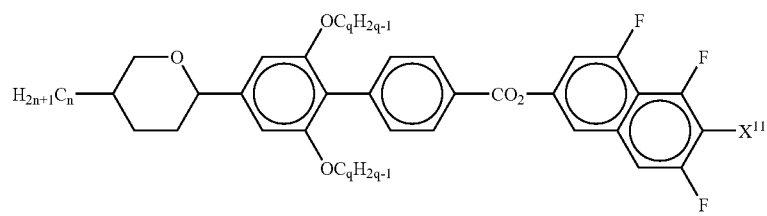

-continued
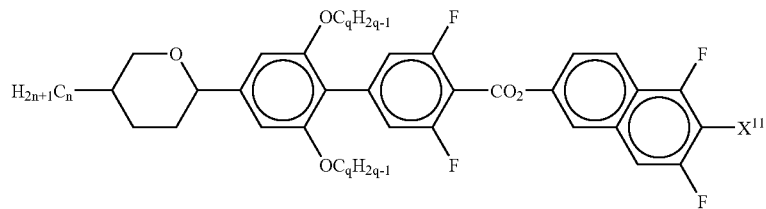
IF-31
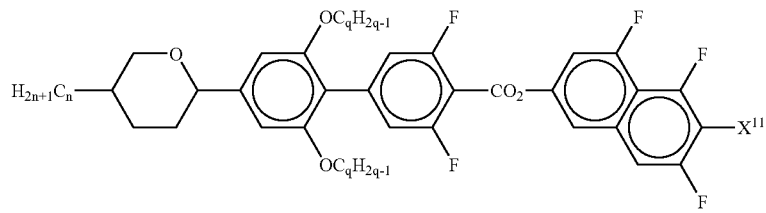
IF-32
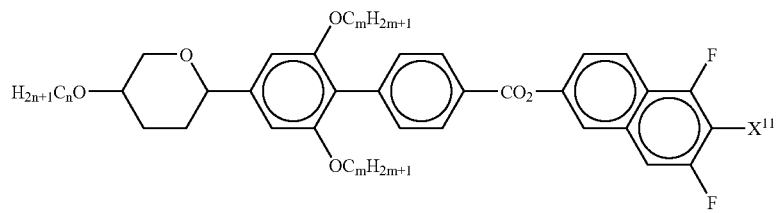
IF-33
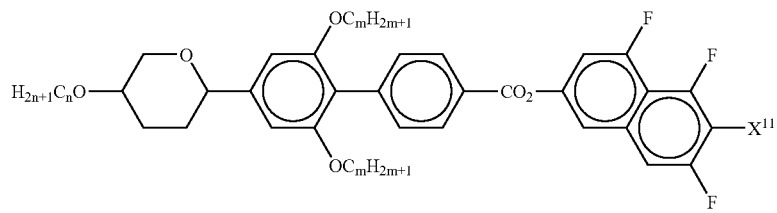
IF-34
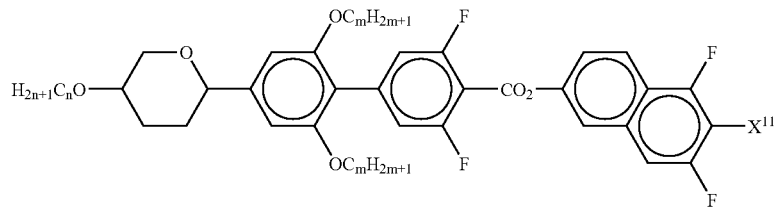
IF-35
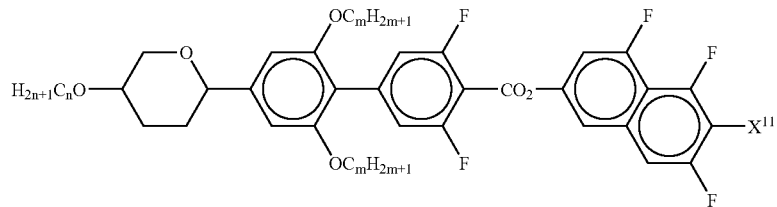
IF-36
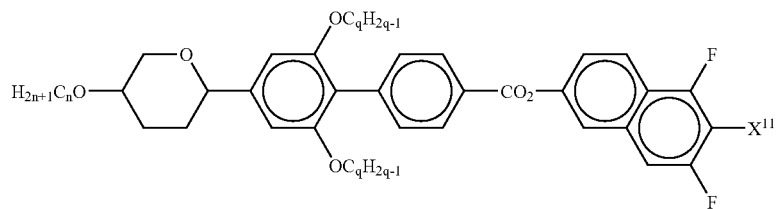
IF-37

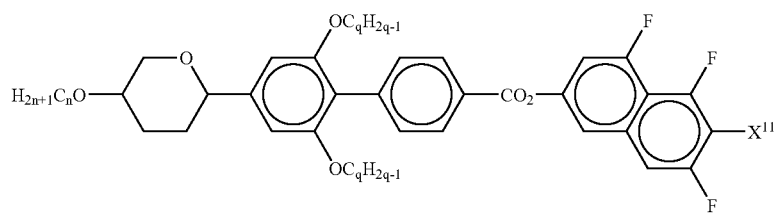
IF-38
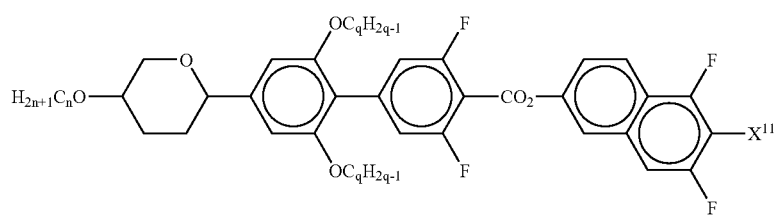
IF-39
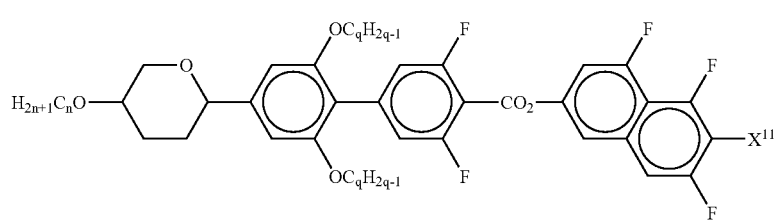
IF-40
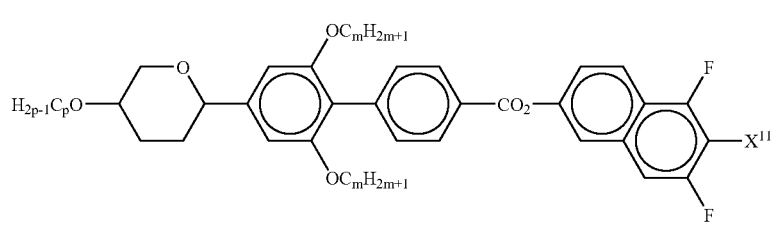
IF-41
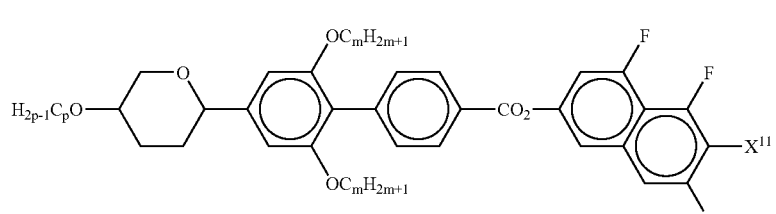
IF-42
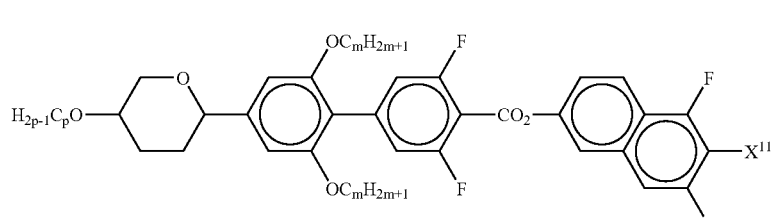
IF-43
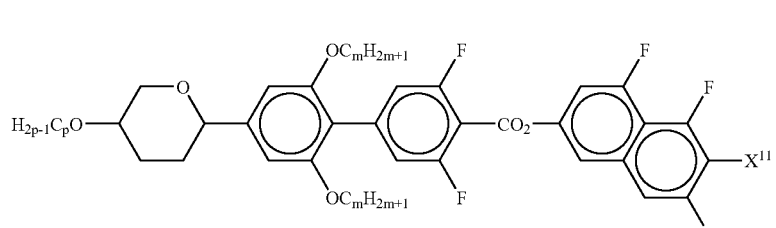
IF-44

-continued
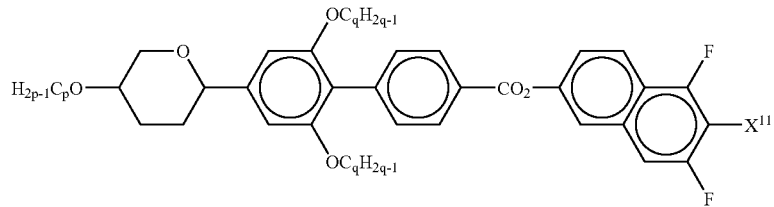 IF-45
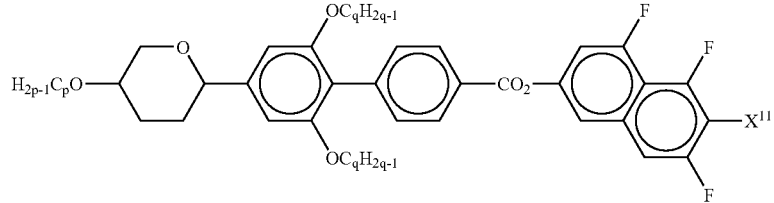 IF-46
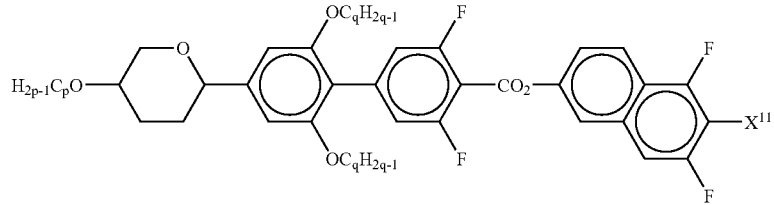 IF-47
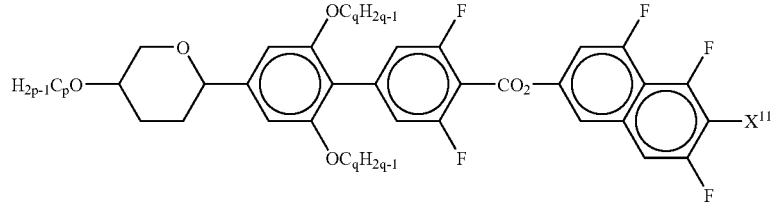 IF-48
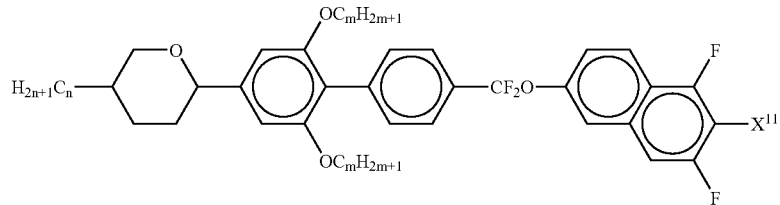 IF-49
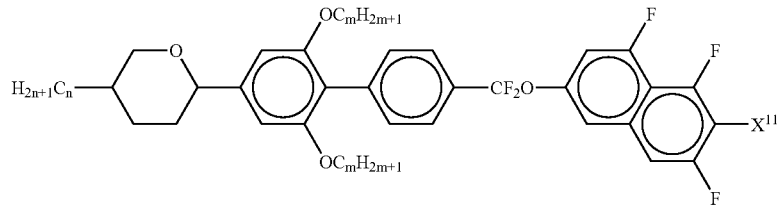 IF-50
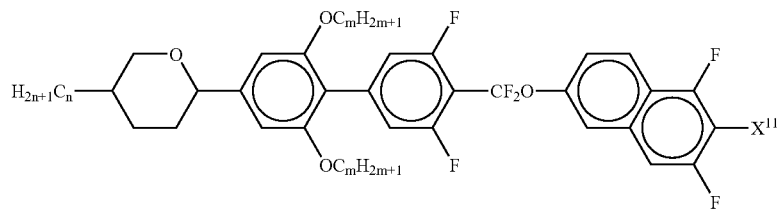 IF-51

-continued
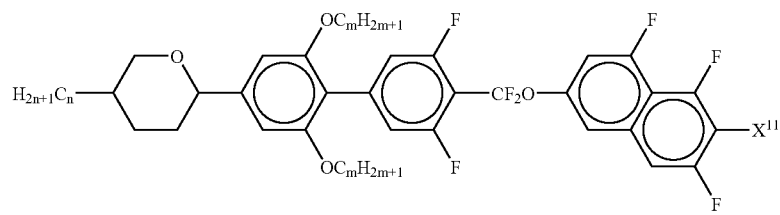
IF-52
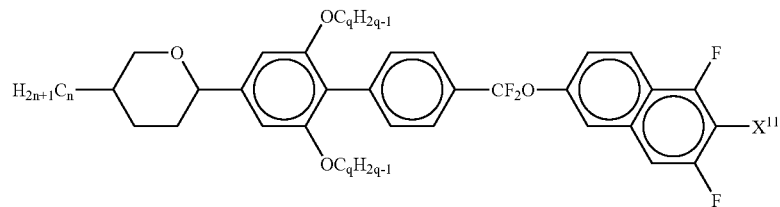
IF-53
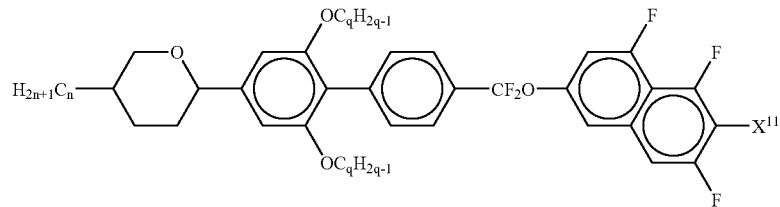
IF-54
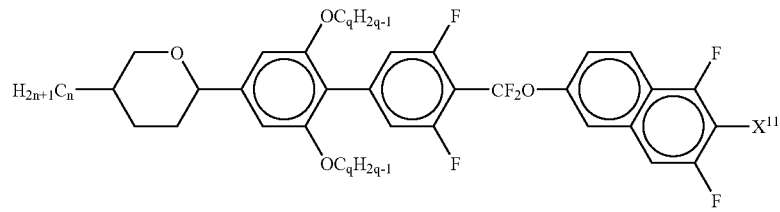
IF-55
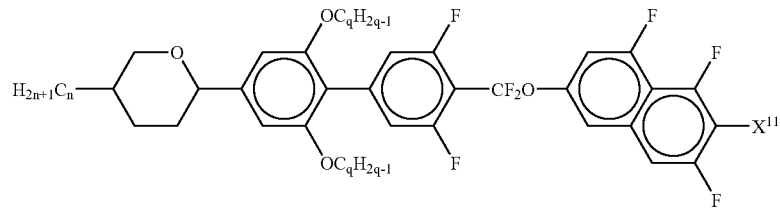
IF-56
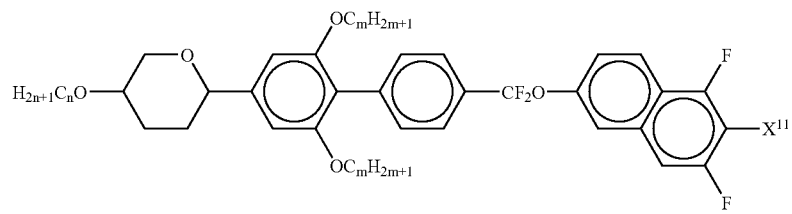
IF-57
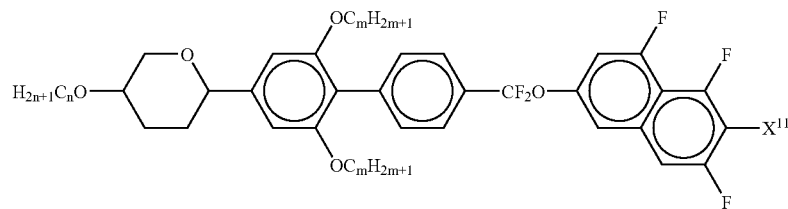
IF-58

-continued
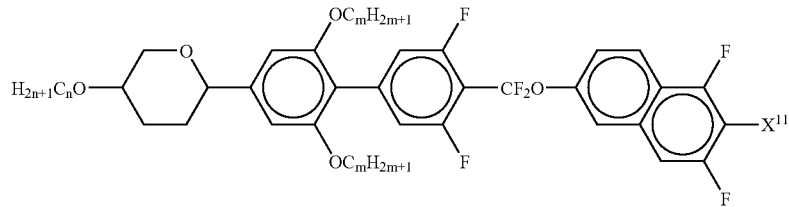
IF-59
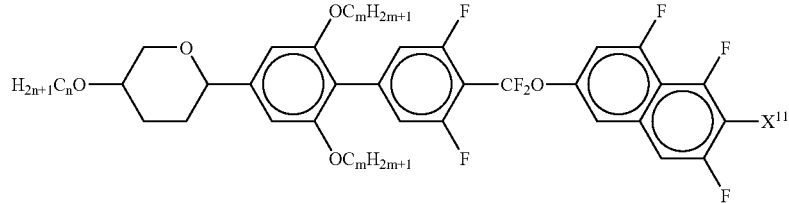
IF-60
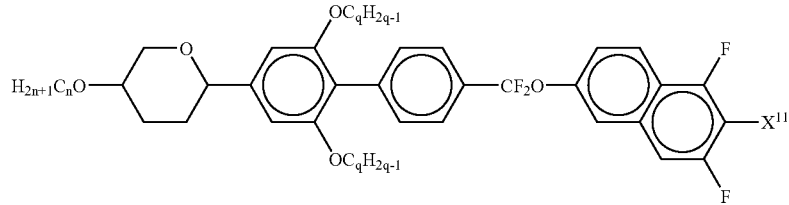
IF-61
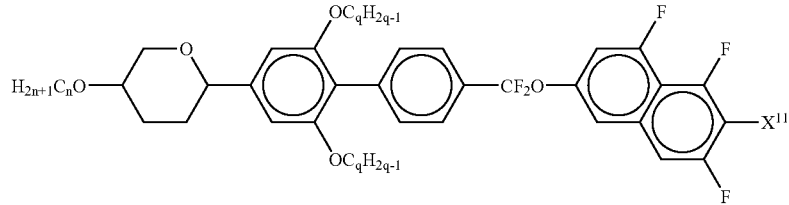
IF-62
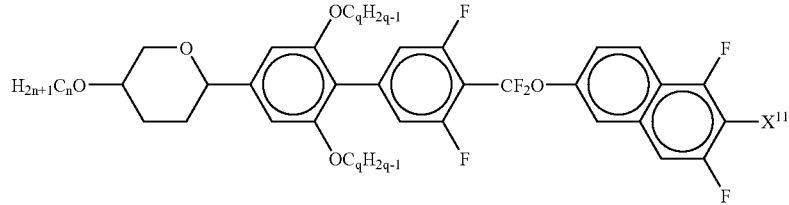
IF-63
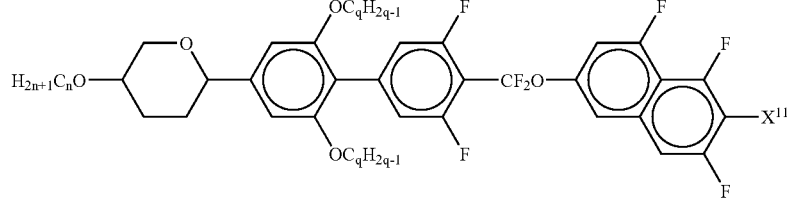
IF-64
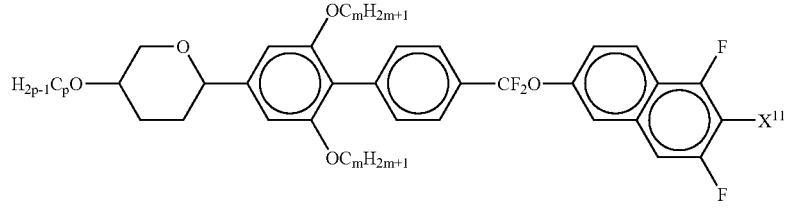
IF-65

-continued
IF-66
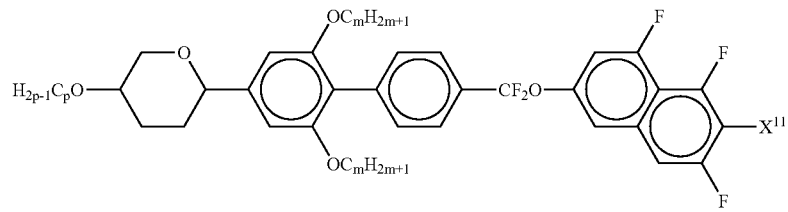
IF-67
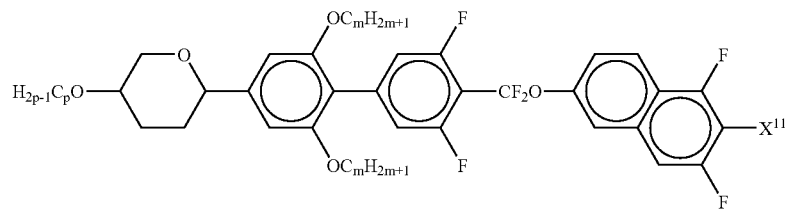
IF-68
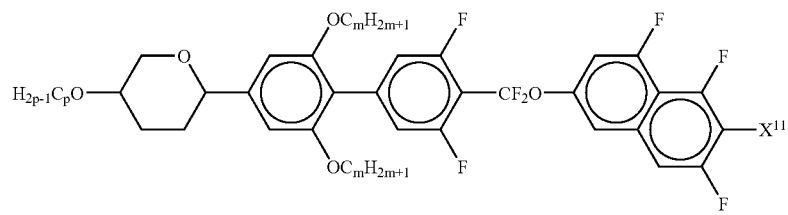
IF-69
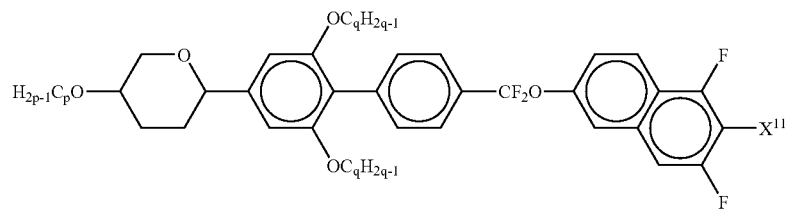
IF-70
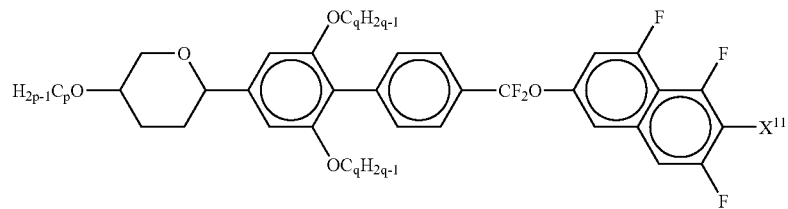
IF-71
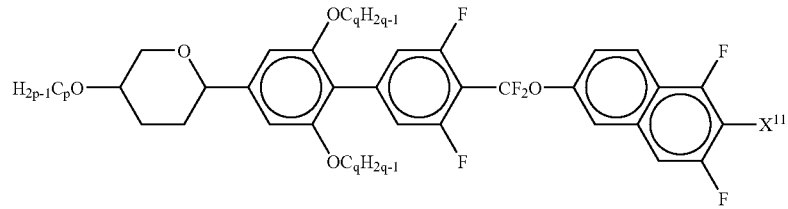
IF-72
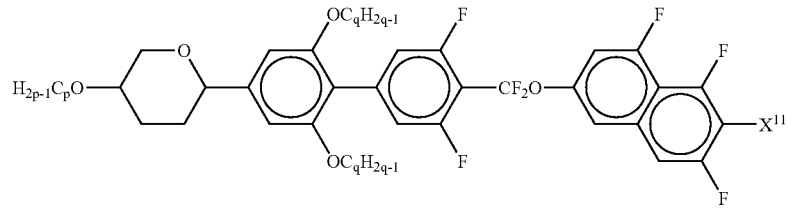

wherein n and m are independently of each other 1, 2, 3, 4, 5, 6, 7 or 8; q and p are independently of each other 2, 3, 4, 5, 6, 7 or 8; and $X^{11}$ is CN, NCS, SF$_5$, SO$_2$CF$_3$, SO$_2$C$_2$F$_5$, SO$_2$C$_4$F$_9$, F, CF$_3$, CHF$_2$, C$_2$F$_5$, —CH=CF$_2$, —CF—CF$_2$, —O—CH$_3$, —O—C$_2$H$_5$, —O—C$_3$H$_7$, —O-n-C$_4$H$_9$, —O-n-C$_5$H$_{11}$, O-n-C$_6$H$_{13}$, —O—CF$_3$, —O—CHF$_2$, —O—C$_2$F$_5$, —O—C$_3$F$_7$, —O-n-C$_4$F$_9$ with NCS, SF$_5$, SO$_2$CF$_3$, SO$_2$C$_2$F$_5$, SO$_2$C$_4$F$_9$, F, CF$_3$, OCF$_3$ being preferred. If present twice in the same compound, both $C_mH_{2m+1}O$ substituents may have the same value for m or different ones; preferably in two $C_mH_{2m+1}O$ substituents m is the same integer. Similarly, if present twice in the same compound, both $C_qH_{2q-1}O$ substituents may have the same value for q or different ones; preferably in two $C_qH_{2q-1}O$ substituents q is the same integer. Preferably, n and m are the same number and equal to 1, 2, 3, 4, 5 or 6. Likewise it is preferred that both q and p are the same number and equal to 3, 4, 5, 6. Furthermore, one or more of the hydrogen atoms of the $C_nH_{2n+1}$, the $OC_nH_{2n+1}$, the $OC_mH_{2m+1}$, the $OC_pH_{2p-1}$ and the $OC_qH_{2q-1}$ moiety, respectively, may be replaced by a halogen atom, preferably a fluorine atom. Particularly preferred are compounds of formulas IF-1 to IF-72 with $X^{11}$ being NCS, SF$_5$, SO$_2$CF$_3$, SO$_2$C$_2$F$_5$, SO$_2$C$_4$F$_9$, F, CF$_3$, OCF$_3$, especially F.

A further preferred embodiment of the invention comprises compounds of formula IG:

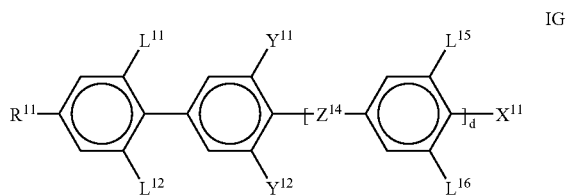

IG wherein $R^{11}$ is an alkyl or alkoxy radical having from 1 to 15 carbon atoms or an alkenyl or alkenyloxy or —O-alkylene-O-alkyl radical having from 2 to 15 carbon atoms, wherein one or more methylene groups of each of said radicals may be replaced independently of each other by —S—, —SiR$^x$R$^y$—, —C≡C—, —CO—O— and/or —O—CO— such that oxygen and/or sulfur atoms are not linked directly to each other, said radicals being unsubstituted or mono-substituted with a —CN group or mono- or poly-substituted with halogen; preferably $R^{11}$ is a straight-chain alkyl, alkoxy, alkenyl, alkenyloxy or —O-alkylene-O-alkyl radical with up to 10 carbon atoms, said radicals being unsubstituted or mono- or poly-substituted with halogen;

$L^{11}$ is an alkyl or alkoxy radical having from 1 to 15 carbon atoms or an alkenyl or alkenyloxy or —O-alkylene-O-alkyl radical having from 2 to 15 carbon atoms, wherein one or more methylene groups of each of said radicals may be replaced independently of each other by —S—, —SiR$^x$R$^y$—, —C≡C—, —CO—O— and/or —O—CO— such that oxygen and/or sulfur atoms are not linked directly to each other, said radicals being unsubstituted or mono-substituted with a —CN group or mono- or poly-substituted with halogen; preferably $L^{11}$ is an alkoxy, alkenyloxy or —O-alkylene-O-alkyl radical with up to 10 carbon atoms, said radicals being unsubstituted or mono- or poly-substituted with halogen;

$L^{12}$ is hydrogen, halogen, an alkyl or alkoxy radical having from 1 to 15 carbon atoms or an alkenyl or alkenyloxy or —O-alkylene-O-alkyl radical having from 2 to 15 carbon atoms, wherein one or more methylene groups of each of said radicals may be replaced. independently of each other by —S—, —SiR$^x$R$^y$—, —C≡C—, —CO—O— and/or —O—CO— such that oxygen and/or sulfur atoms are not linked directly to each other, said radicals being unsubstituted or mono-substituted with a —CN group or mono- or poly-substituted with halogen; preferably $L^{12}$ is H;

$Y^{11}$ is an alkyl or alkoxy radical having from 1 to 15 carbon atoms or an alkenyl or alkenyloxy or —O-alkylene-O-alkyl radical having from 2 to 15 carbon atoms, wherein one or more methylene groups of each of said radicals may be replaced independently of each other by —S—, —SiR$^x$R$^y$—, —C≡C—, —CO—O— and/or —O—CO— such that oxygen and/or sulfur atoms are not linked directly to each other, said radicals being unsubstituted or mono-substituted with a —CN group or mono- or poly-substituted with halogen; preferably $Y^{11}$ is an alkoxy, alkenyloxy or —O-alkylene-O-alkyl radical with up to 10 carbon atoms, said radicals being unsubstituted or mono- or poly-substituted with halogen; in particular $Y^{11}$ has the same meaning as $L^{11}$;

$Y^{12}$ is hydrogen, halogen, an alkyl or alkoxy radical having from 1 to 15 carbon atoms or an alkenyl or alkenyloxy or —O-alkylene-O-alkyl radical having from 2 to 15 carbon atoms, wherein one or more methylene groups of each of said radicals may be replaced independently of each other by —S—, —SiR$^x$R$^y$—, —C≡C—, —CO—O— and/or —O—CO— such that oxygen and/or sulfur atoms are not linked directly to each other, said radicals being unsubstituted or mono-substituted with a —CN group or mono- or poly-substituted with halogen; preferably $L^{12}$ is H;

d is 0, 1 or 2; preferably d is 0 or 1, especially 1;

$L^{15}$ and $L^{16}$ are independently of each other H or F; preferably both $L^{15}$ and $L^{16}$ are F;

$Z^{14}$ is a single bond, —CH$_2$CH$_2$—, (—CH$_2$CH$_2$—)$_2$, —CF$_2$—CF$_2$—, —CF$_2$—CH$_2$—, —CH$_2$—CF$_2$—, —CH=CH—, —CF=CF—, —CF=CH—, —CH=CF—, —C≡C—, —CH$_2$O—, —OCH$_2$—, —CF$_2$O—, —OCF$_2$—, —CO—O— or —O—CO—; preferably $Z^{14}$ is a single bond, —CF$_2$O— or —CO$_2$—;

$X^{11}$ is F, Cl, —CN, —NCS, —SF$_5$, —SO$_2$—R$^z$, an alkyl or alkoxy radical having from 1 to 15 carbon atoms, wherein one or more methylene groups of said alkyl or alkoxy radical may be replaced independently of each other by —O—, —S—, —SiR$^x$R$^y$—, —CH=CH—, —C≡C—, —CO—O— and/or —O—CO— such that oxygen and/or sulfur atoms are not linked directly to each other, said alkyl or alkoxy radical being unsubstituted or mono-substituted with a —CN group or mono- or poly-substituted with halogen; preferably $X^{11}$ is F, Cl, CF$_3$, OCF$_3$, OCHF$_2$, NCS, SF$_5$ or —SO$_2$—R$^z$;

R$^x$ and R$^y$ are independently of each other hydrogen or an alkyl radical having from 1 to 7 carbon atoms; preferably both R$^x$ and R$^y$ are methyl, ethyl, propyl or butyl; and;

R$^z$ is an alkyl radical having from 1 to 7 carbon atoms, said alkyl radical being unsubstituted or mono- or poly-substituted with halogen; preferably R$^z$ is CF$_3$, C$_2$F$_5$ or n-C$_4$F$_9$.

One preferred subgroup of compounds according to formula IG are compounds of formula I in which d is zero. Examples of compounds of said subgroup are the following ones:

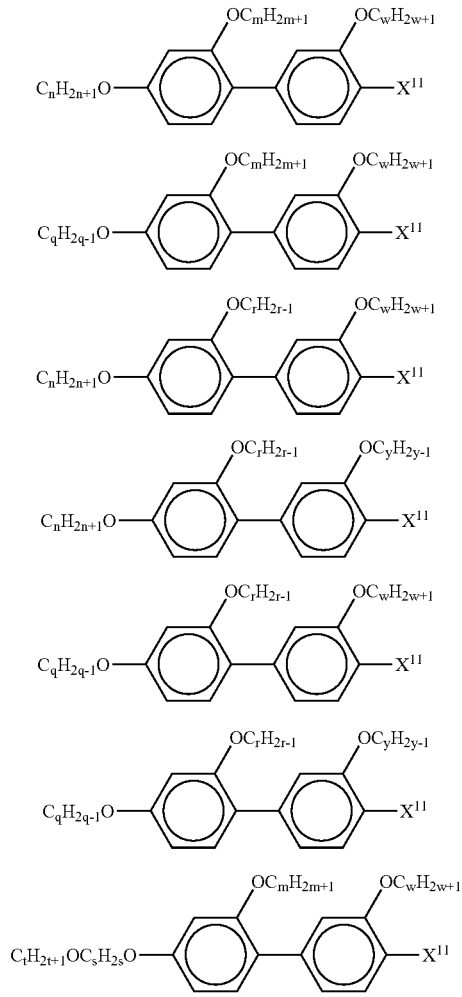

IGa-1
IGa-2
IGa-3
IGa-4
IGa-5
IGa-6
IGa-7

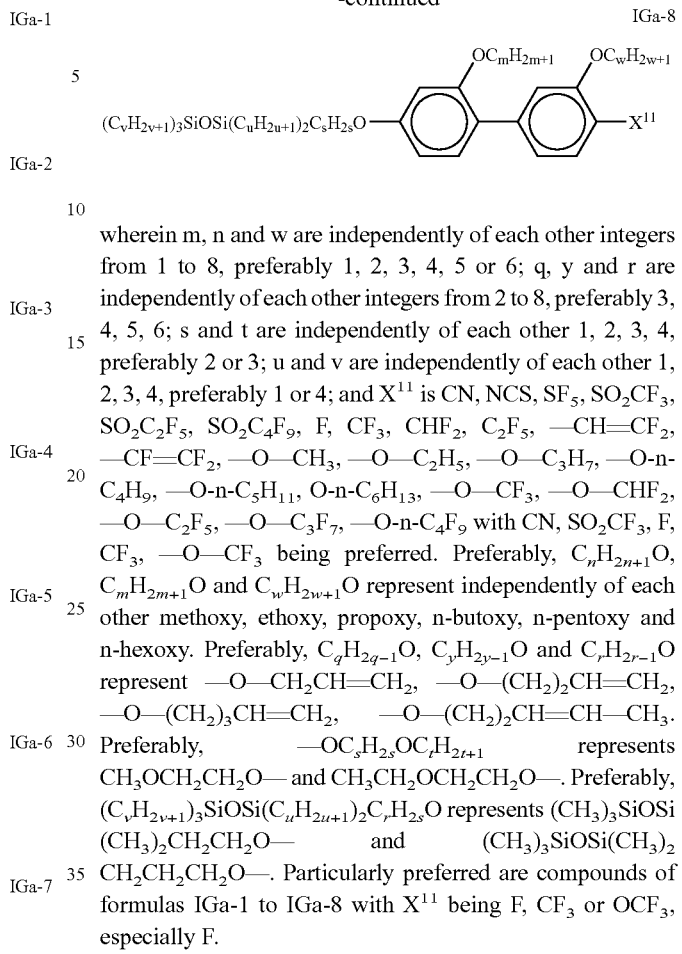

IGa-8 wherein m, n and w are independently of each other integers from 1 to 8, preferably 1, 2, 3, 4, 5 or 6; q, y and r are independently of each other integers from 2 to 8, preferably 3, 4, 5, 6; s and t are independently of each other 1, 2, 3, 4, preferably 2 or 3; u and v are independently of each other 1, 2, 3, 4, preferably 1 or 4; and $X^{11}$ is CN, NCS, $SF_5$, $SO_2CF_3$, $SO_2C_2F_5$, $SO_2C_4F_9$, F, $CF_3$, $CHF_2$, $C_2F_5$, —CH=$CF_2$, —CF=$CF_2$, —O—$CH_3$, —O—$C_2H_5$, —O—$C_3H_7$, —O-n-$C_4H_9$, —O-n-$C_5H_{11}$, O-n-$C_6H_{13}$, —O—$CF_3$, —O—$CHF_2$, —O—$C_2F_5$, —O—$C_3F_7$, —O-n-$C_4F_9$ with CN, $SO_2CF_3$, F, $CF_3$, —O—$CF_3$ being preferred. Preferably, $C_nH_{2n+1}O$, $C_mH_{2m+1}O$ and $C_wH_{2w+1}O$ represent independently of each other methoxy, ethoxy, propoxy, n-butoxy, n-pentoxy and n-hexoxy. Preferably, $C_qH_{2q-1}O$, $C_yH_{2y-1}O$ and $C_rH_{2r-1}O$ represent —O—$CH_2CH$=$CH_2$, —O—$(CH_2)_2CH$=$CH_2$, —O—$(CH_2)_3CH$=$CH_2$, —O—$(CH_2)_2CH$=CH—$CH_3$. Preferably, —$OC_sH_{2s}OC_tH_{2t+1}$ represents $CH_3OCH_2CH_2O$— and $CH_3CH_2OCH_2CH_2O$—. Preferably, $(C_vH_{2v+1})_3SiOSi(C_uH_{2u+1})_2C_sH_{2s}O$ represents $(CH_3)_3SiOSi(CH_3)_2CH_2CH_2O$— and $(CH_3)_3SiOSi(CH_3)_2CH_2CH_2CH_2O$—. Particularly preferred are compounds of formulas IGa-1 to IGa-8 with $X^{11}$ being F, $CF_3$ or $OCF_3$, especially F.

Another preferred subgroup of compounds according to formula IG are compounds in which d is 1. Examples of compounds of said subgroup are the following ones:

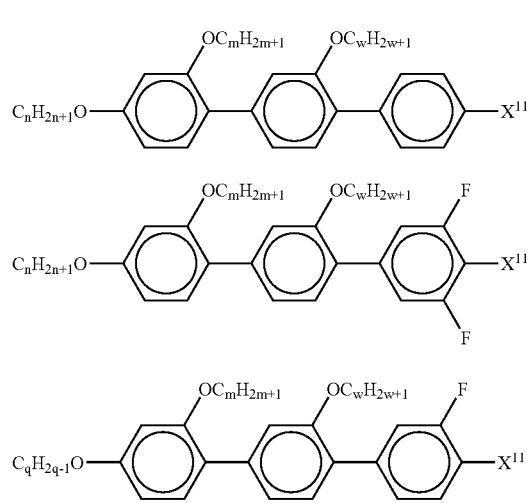

IGb-1
IGb-3
IGb-5

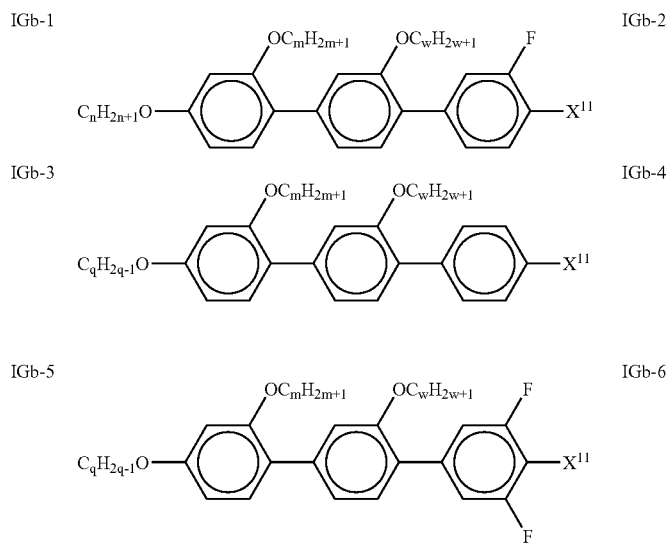

IGb-2
IGb-4
IGb-6

-continued
IGb-7
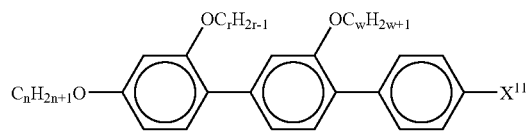
IGb-8
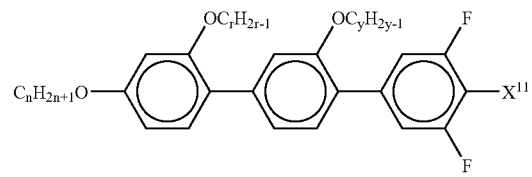
IGb-9
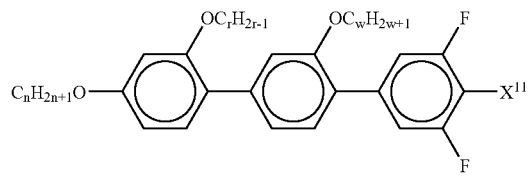
IGb-10
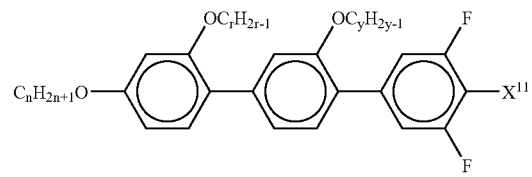
IGb-11
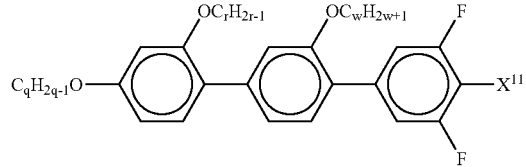
IGb-12
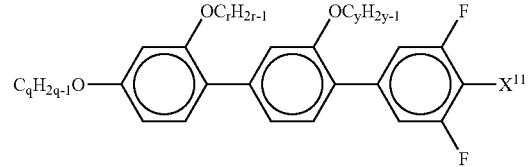
IGb-13
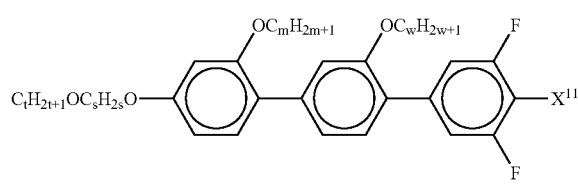
IGb-14
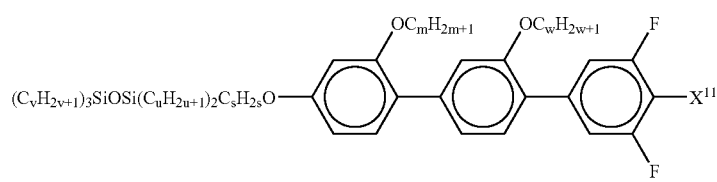
IGb-15
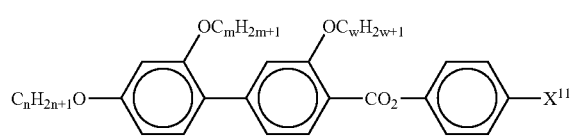
IGb-16
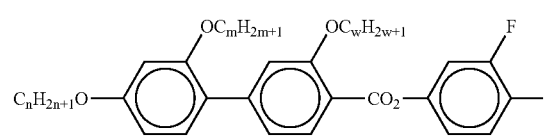
IGb-17
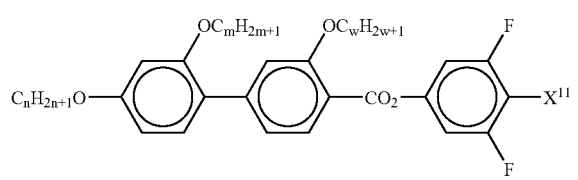
IGb-18
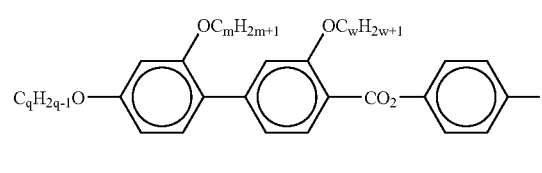
IGb-19
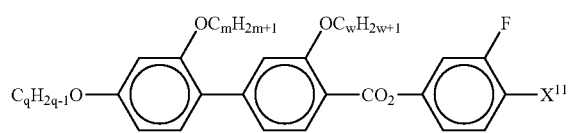
IGb-20
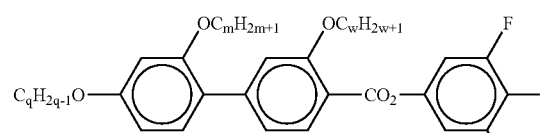
IGb-21
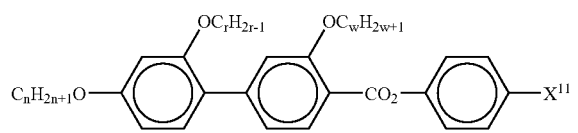
IGb-22
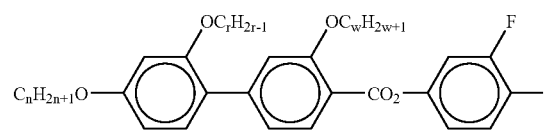

IGb-23
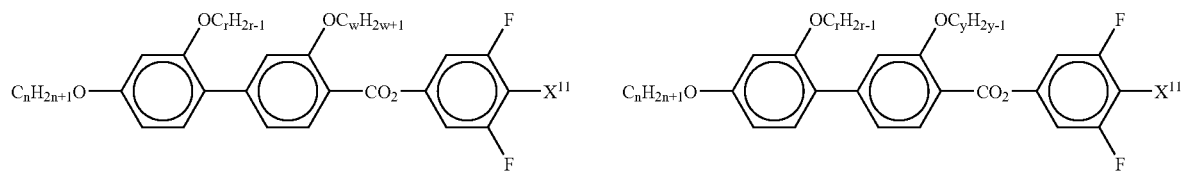
IGb-24
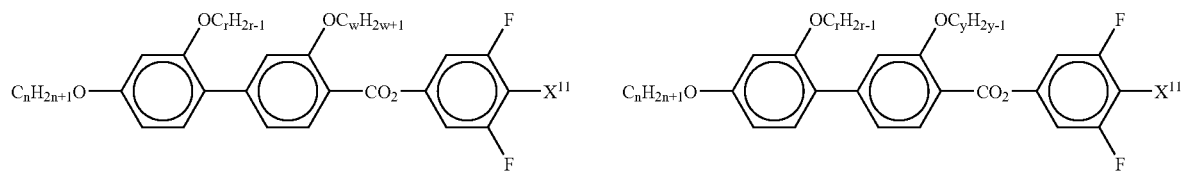
IGb-25
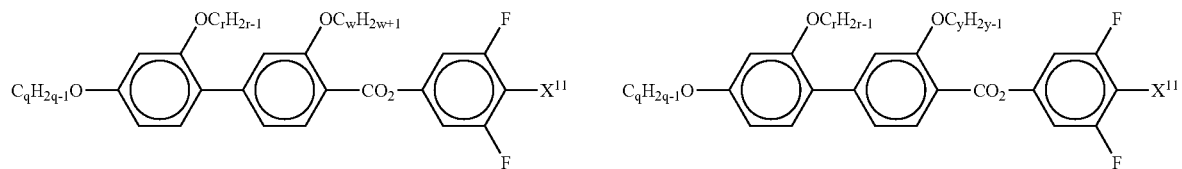
IGb-26
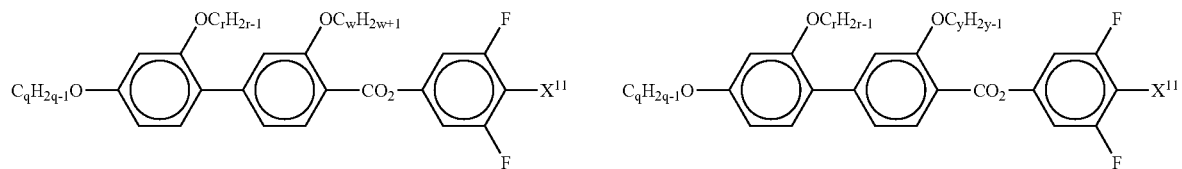
IGb-27
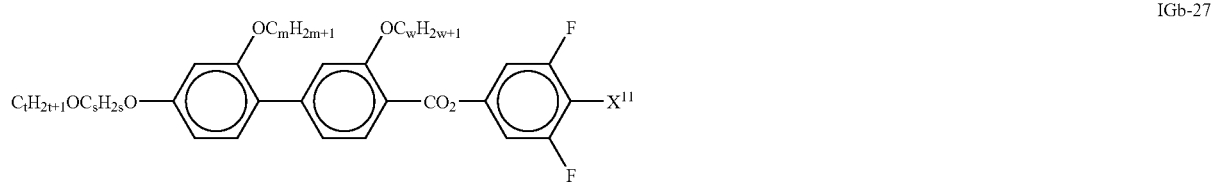
IGb-28
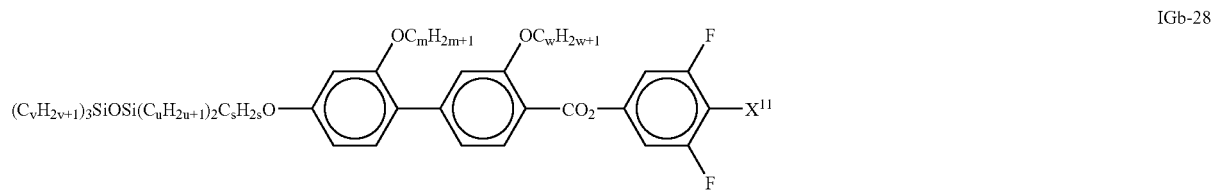
IGb-29
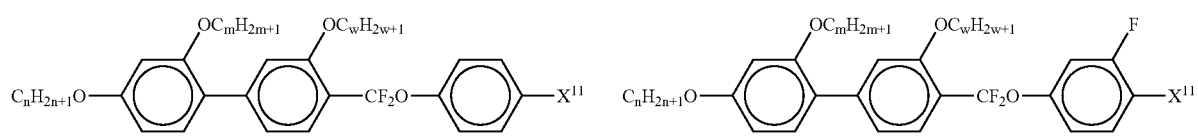
IGb-30
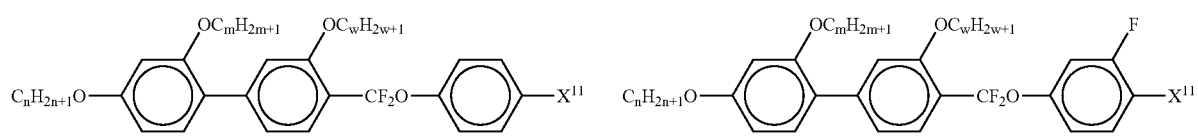
IGb-31
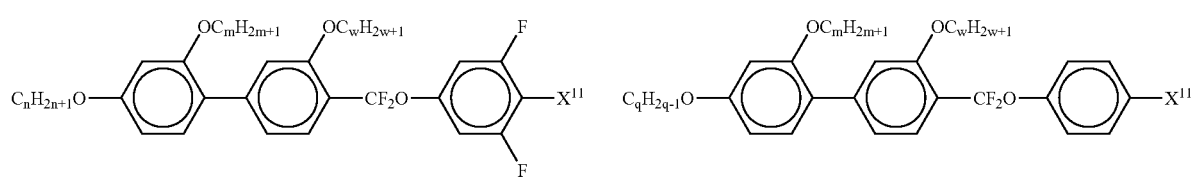
IGb-32
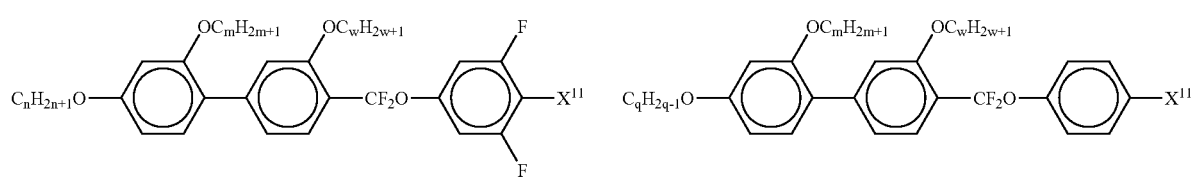
IGb-33
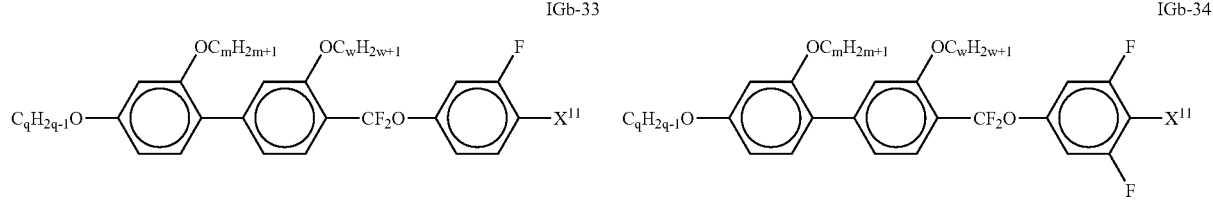
IGb-34
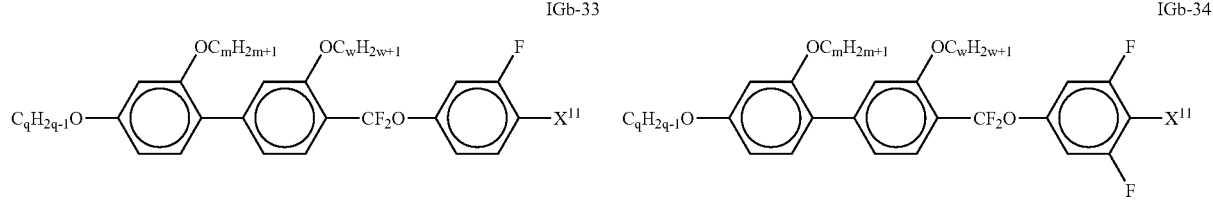
IGb-35
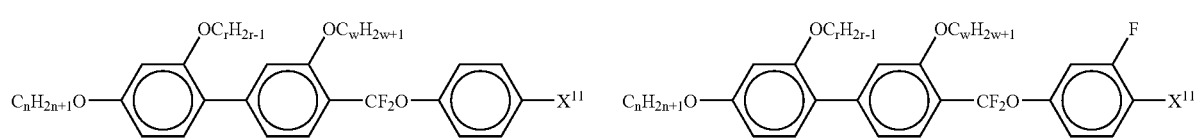
IGb-36
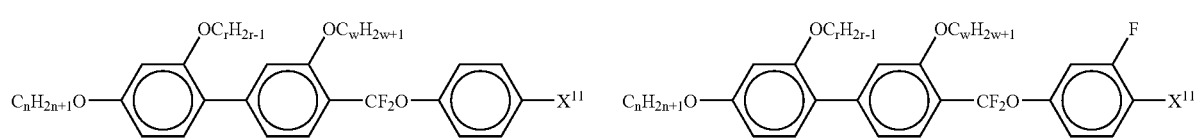

-continued

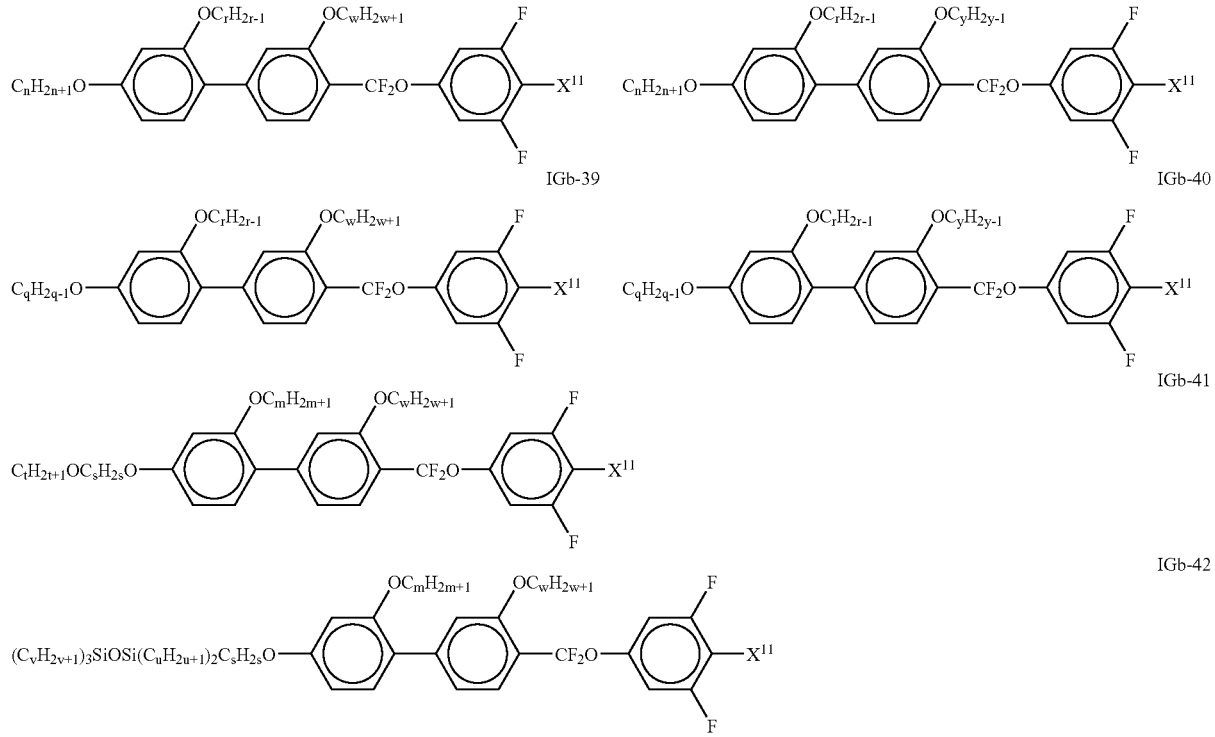

wherein m, n and w are independently of each other integers from 1 to 8, preferably 1, 2, 3, 4, 5 or 6; q, y and r are independently of each other integers from 2 to 8, preferably 3, 4, 5, 6; s and t are independently of each other 1, 2, 3, 4, preferably 2 or 3; u and v are independently of each other 1, 2, 3, 4, preferably 1 or 4; and $X^{11}$ is CN, NCS, $SF_5$, $SO_2CF_3$, $SO_2C_2F_5$, $SO_2C_4F_9$, F, $CF_3$, $CHF_2$, $C_2F_5$, —CH=$CF_2$, —CF=$CF_2$, —O—$CH_3$, —O—$C_2H_5$, —O—$C_3H_7$, —O-n-$C_4H_9$, —O-n-$C_5H_{11}$, O-n-$C_6H_{13}$, —O—$CF_3$, —O—$CHF_2$, —O—$C_2F_5$, —O—$C_3F_7$, —O—n-$C_4F_9$ with CN, $SO_2CF_3$, F, $CF_3$, —O—$CF_3$ being preferred. Preferably, $C_nH_{2n+1}O$, $C_mH_{2m+1}O$ and $C_wH_{2w+1}O$ represent independently of each other methoxy, ethoxy, propoxy, n-butoxy, n-pentoxy and n-hexoxy. Preferably, $C_yH_{2y-1}O$ and $C_rH_{2r-1}O$ represent —O—$CH_2CH$=$CH_2$, —O—$(CH_2)_2CH$=$CH_2$, —O—$(CH_2)_3CH$=$CH_2$, —O—$(CH_2)_2CH$=CH—$CH_3$. Preferably, —$OC_sH_{2s}OC_tH_{2t+1}$ represents $CH_3OCH_2CH_2O$— and $CH_3CH_2OCH_2CH_2O$—. Preferably, $(C_vH_{2v+1})_3SiOSi(C_uH_{2u+1})_2C_sH_{2s}O$ represents $(CH_3)_3SiOSi(CH_3)_2CH_2CH_2O$— and $(CH_3)_3SiOSi(CH_3)_2CH_2CH_2CH_2O$—. Particularly preferred are compounds of formulas IGb-1 to IGb-42 with $X^{11}$ being F, $CF_3$ or $OCF_3$, especially F.

The compounds of formula I are partly known from U.S. Pat. No. 6,177,154 or are prepared by methods known per se, as described in the literature (for example in the standard works, such as Houben-Weyl, Methoden der organischen Chemie [Methods of Organic Chemistry], Georg-Thieme-Verlag, Stuttgart), to be precise under reaction conditions which are known and suitable for the said reactions. Use can also be made here of variants which are known per se, but are not mentioned here in greater detail.

The inventive mixtures contain 1-25 wt. %, preferably 2-20 wt. % and most preferably 3-15 wt. % of component A.

Preferred compounds of component B are compounds of the formulae II-1 to II-8:

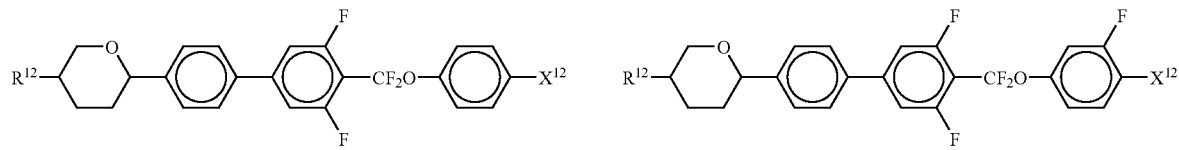

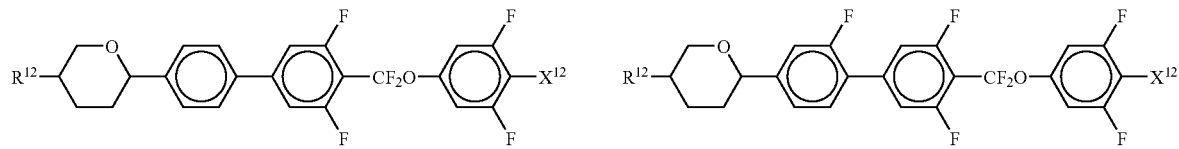

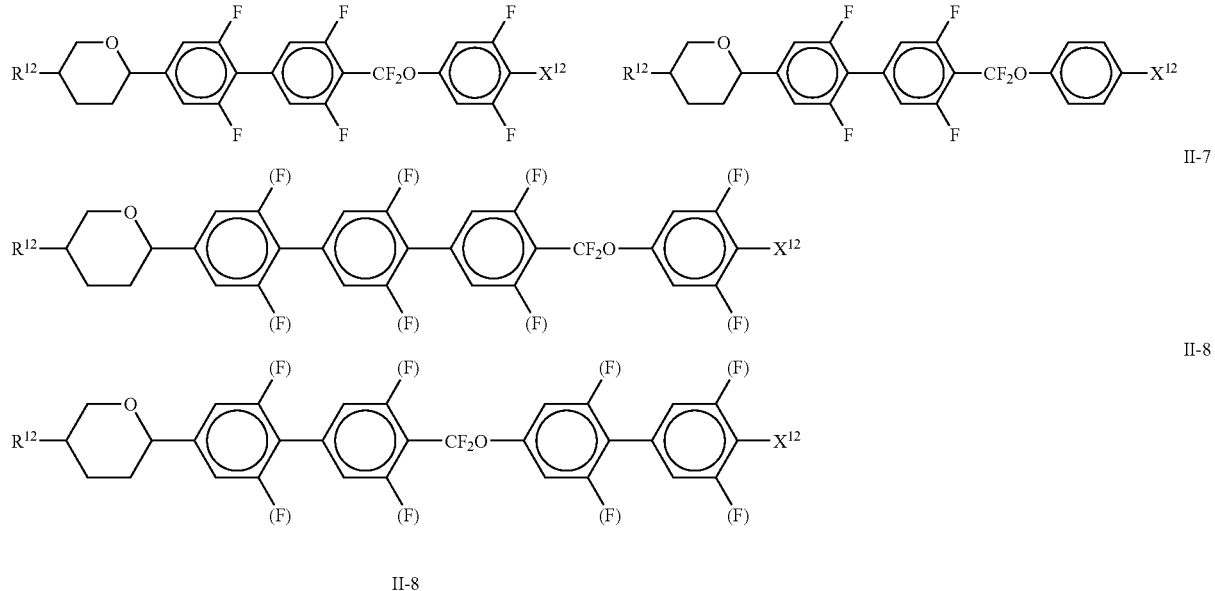

In the compounds of the formulae II-1 to II-8 X is preferably F, CN, NCS, $CF_3$, $SF_5$ or $OCF_3$.

$R^{12}$ is preferably straight chain alkyl or alkoxy with up to six carbon atoms. Especially preferred are compounds of the formulae II-5 and II-8.

The inventive mixtures contain 20-80 wt. % of the pyrane compounds of the formulae II, preferably 25-70 wt. % and especially preferred 30-60 wt. %.

Suitable chiral compounds of component C are those which have a helical twisting power of >20 µm, preferably >40 µm, most preferably >60 µm. The HTP is measured in MLC 6260.

The chiral component C comprises one or more chiral compounds which have a mesogenic structure und exhibit preferably one or more mesophases themselves, particularly at least one cholesteric phase. Preferred chiral compounds being comprised in the chiral component C are, inter alia, well known chiral dopants like cholesteryl nonanoate (CN), R/S-811, R/S-1011, R/S-2011, R/S-3011, R/S-4011, R/S-5011, CB-15 (Merck KGaA, Darmstadt, Germany). Preferred are chiral dopants having one or more chiral moieties and one or more mesogenic groups or having one or more aromatic or alicyclic moieties forming, together with the chiral moiety, a mesogenic group. More preferred are chiral moieties and mesogenic chiral compounds disclosed in DE 34 25 503, DE 35 34 777, DE 35 34 778, DE 35 34 779, DE 35 34 780, DE 43 42 280, EP 01 038 941 and DE 195 41 820 that disclosure is incorporated herewithin by way of reference. Particular preference is given to chiral binaphthyl derivatives as disclosed in EP 01 111 954.2, chiral binaphtnol derivatives as disclosed in WO 02/34739, chiral TADDOL derivatives as disclosed in WO 02/06265 as well as chiral dopants having at least one fluorinated linker and one end chiral moiety or one central chiral moiety as disclosed in WO 02/06196 and WO 02/06195.

The controlling medium of the present invention has a characteristic temperature, preferably a clearing point, in the range from about −30° C. to about 80° C., especially up to about 55° C.

Preferred chiral compounds of the component C are selected from the group of the compounds C-I to C-III.

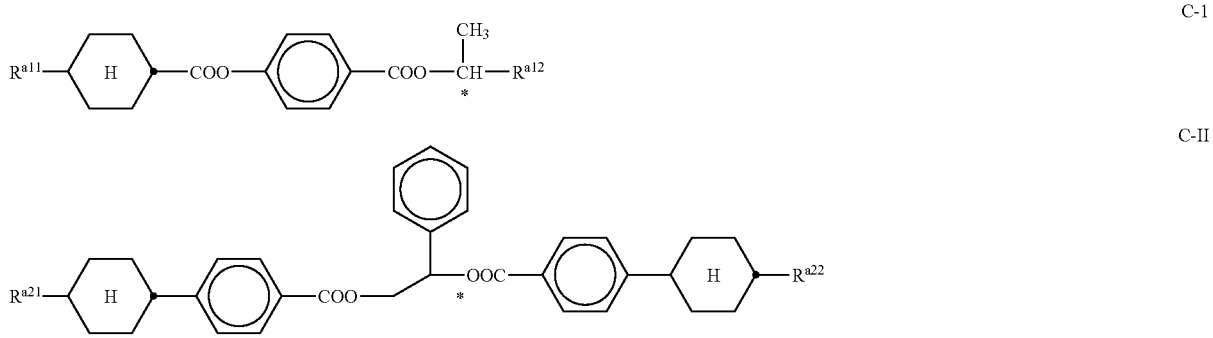

-continued

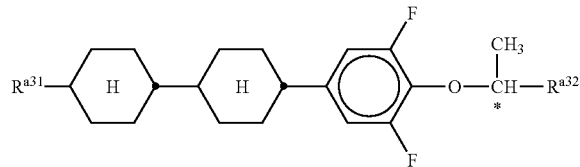
C-III wherein

R$^{a11}$, R$^{a12}$, are each independently from each other alkyl, oxalkyl,

R$^{a21}$, R$^{a22}$ alkoxy or alkenyl with up 9 carbon atoms with the R$^{a31}$ and R$^{a32}$ provisos that a) R$^{a11}$+R$^{a12}$ b) R$^{a21}$+R$^{a22}$ Preferably R$^{a11}$, R$^{a12}$, R$^{a21}$, R$^{a22}$, R$^{a31}$ and R$^{a32}$ are an alkyl group, especially a straight chain alkyl group.

Especially preferred are chiral binaphthyl derivates of the formulae C-IV,

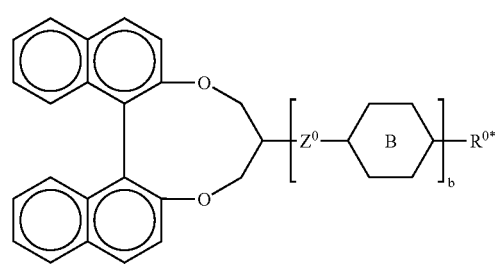
C-IV

Especially preferred are binaphthyl derivatives of the formulae C-IV-1a to IC-IV-1c,

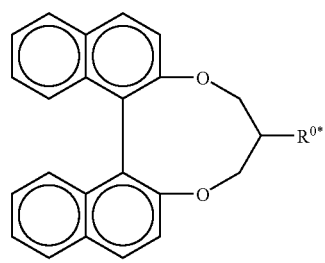
C-IV-1a

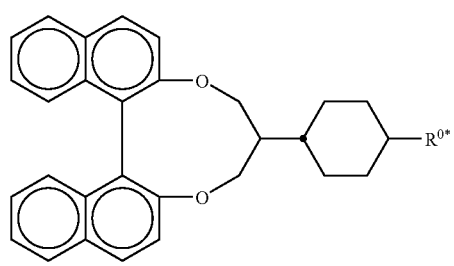
C-IV-1b

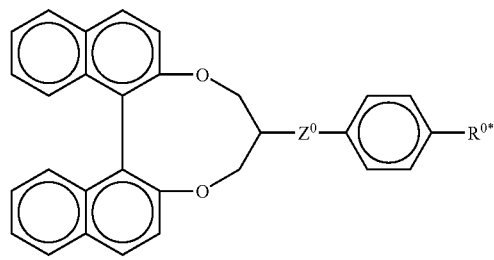
C-IV-1c

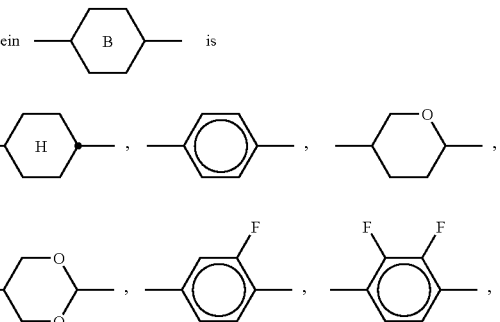

wherein 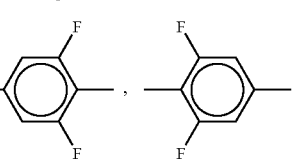 is $Z^0$ is single bond, —CH$_2$CH$_2$—, —COO—, —OCO—, —CF$_2$O—, —OCF$_2$—, —CH$_2$O—, —OCH$_2$—, —CF$_2$CF$_2$—, —CH=CH—, —C≡C— or —CF=CF—, b is 0, 1 or 2

R$^{0*}$ is hydrogen, an alkyl or alkoxy radical having from 1 to 15 carbon atoms wherein one or more methylene groups of said alkyl or alkoxy radical may be replaced independently of each other by —O—, —S—, —SiR$^x$R$^Y$—, —CH=CH—, —C≡C—, —CO—O— and/or —O—Cl— such that oxygen and/or sulfur atoms are not linked directly to each other, said alkyl or alkoxy radical being unsubstituted or mon- or poly-substituted with halogen, Furthermore chiral binaphthyl derivates of the formulae C-V and C-VI are preferred

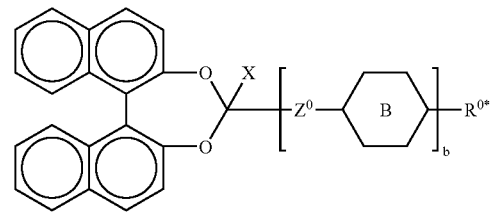
C-V

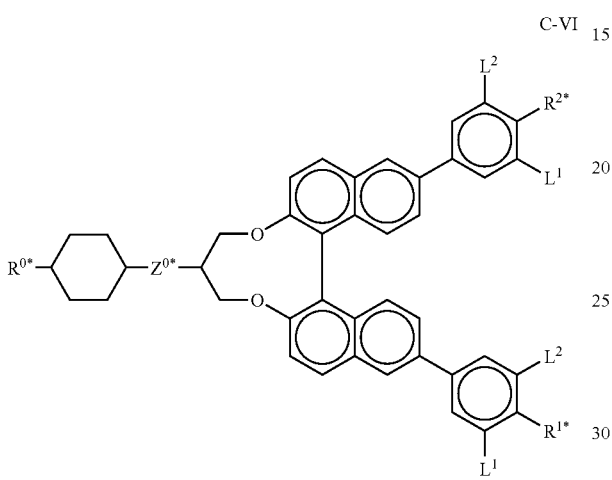
C-VI wherein

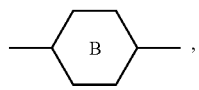

$Z^0$ and b have the above given meanings and X is H, F, Cl, CN or has the meaning of $R^{0*}$, $R^{2*}$ and $R^{1*}$ are each independently is F, Cl, $OCF_3$, $CF_3$, CN and $L^1$, $L^2$, $L^3$ and $L^4$ are each H or F. $Z^{0*}$ denotes single bond, $-C_2H_4-$, $-COO-$, $-OCO-$, $CH_2O-$, $-OCH_2-$, $-C_2F_4$, $-CH=CH-$, $-C\equiv C-$ or $-CF=CF$ Especially preferred are chiral binaphthyl derivatives of the formulae C-V-2a to C-V-2f:

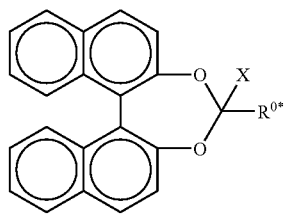
C-V-2a

-continued

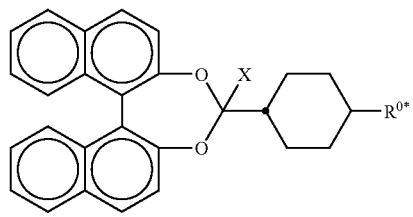
C-V-2b

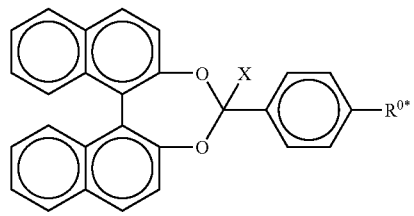
C-V-2c

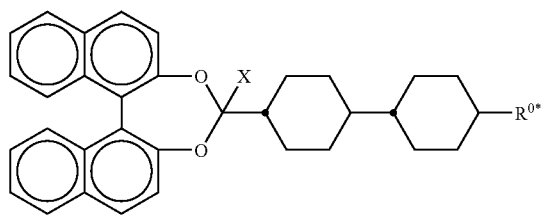
C-V-2d

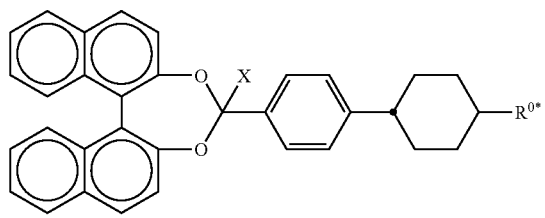
C-V-2e

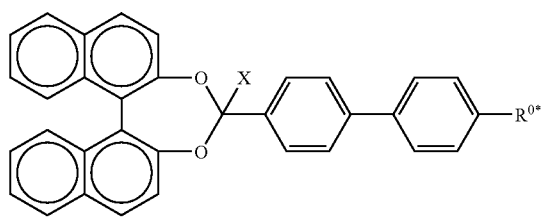
C-V-2f

The inventive mixtures contain one ore more (two, three, four or more) chiral compounds in the range of 1-25 wt. %, preferably 2-20 wt. %. Especially preferred are mixtures containing 3-15 wt. % of a chiral compound.

Preferred embodiments are indicated below:

The medium comprises one, two or more compounds of the formulae I;

Component B preferably contains beside at compounds of the formula II at least one or more ester compounds of the formula Z Z
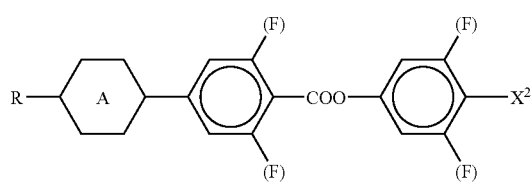
where in R has the given meaning for $R^{11}$
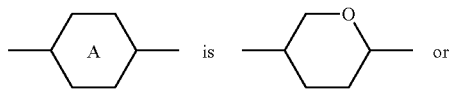
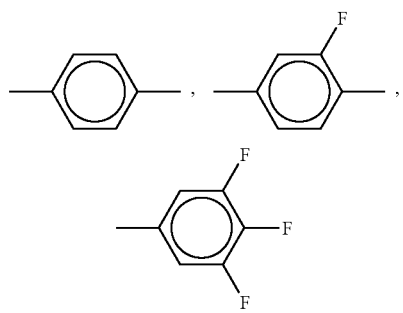
$X^2$ is F, Cl, CN, NCS, $OCF_3$, $CF_3$ or $SF_5$.
Preferred compounds of the formula Z are
Z-1
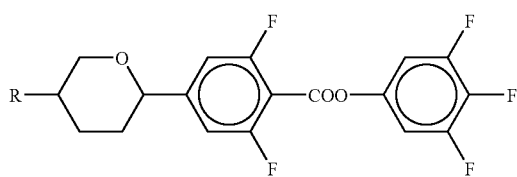
Z-2
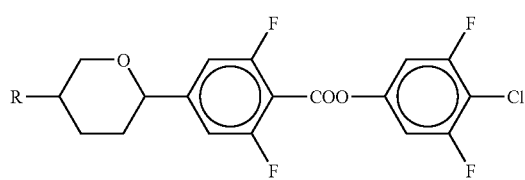
Z-3
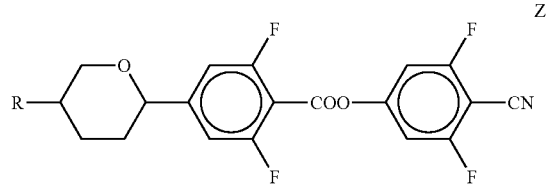
Z-4
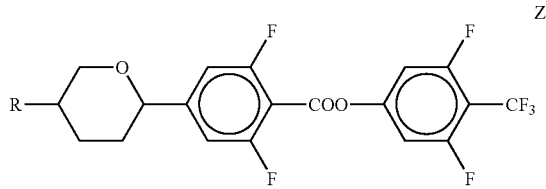
-continued
Z-5
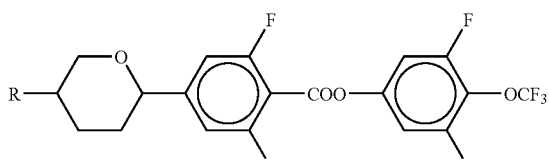
Z-6
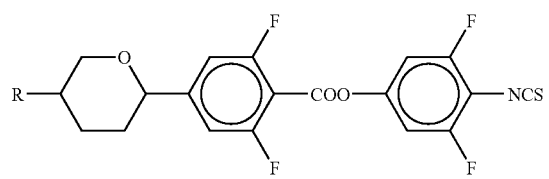
Z-7
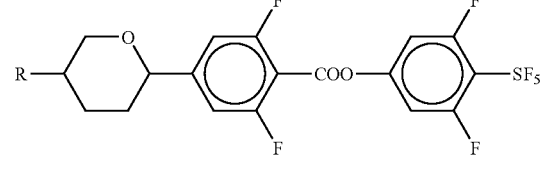
Z-8
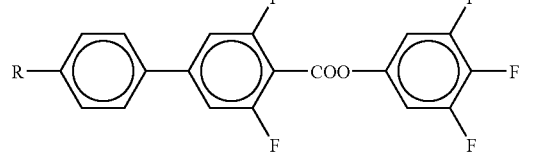
Z-9
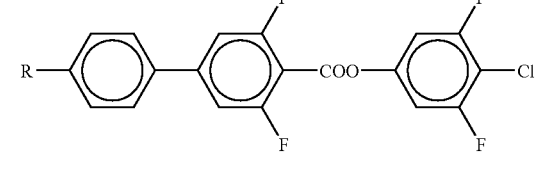
Z-10
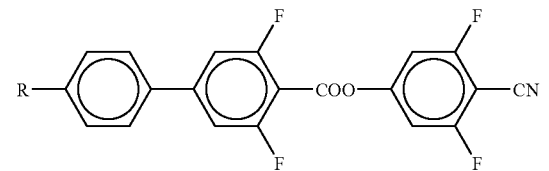
Z-11
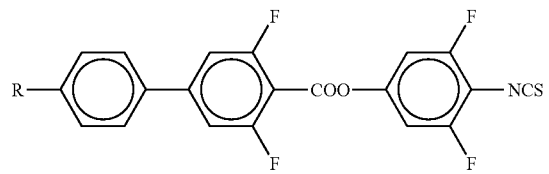
Z-12
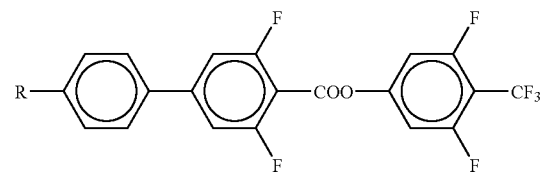

-continued
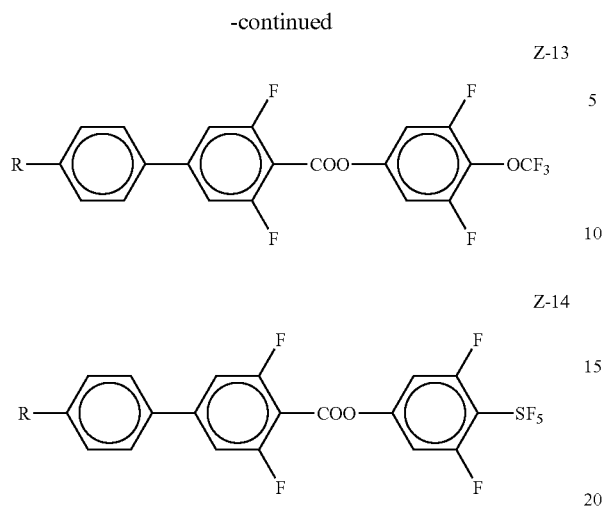
Z-13
Z-14
Especially preferred are mixtures containing 5-35 wt. %, preferably 10-30 wt. % and especially preferred 10-20 wt. %.
The component B contains additionally one or more compounds selected from the group
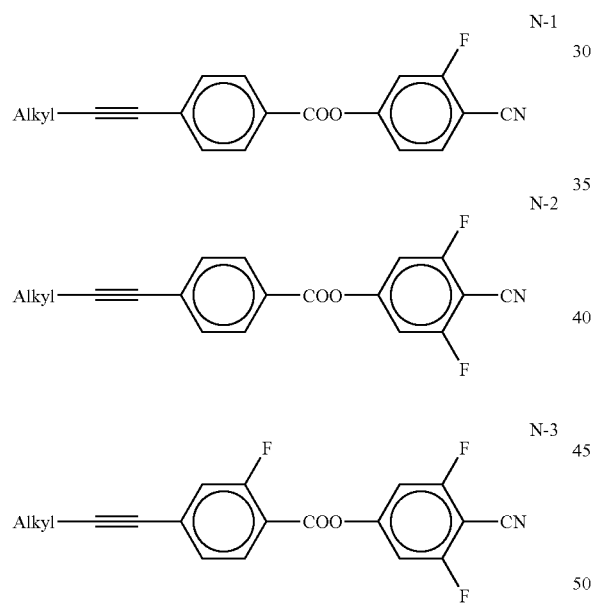
N-1
N-2
N-3
N-4
N-5
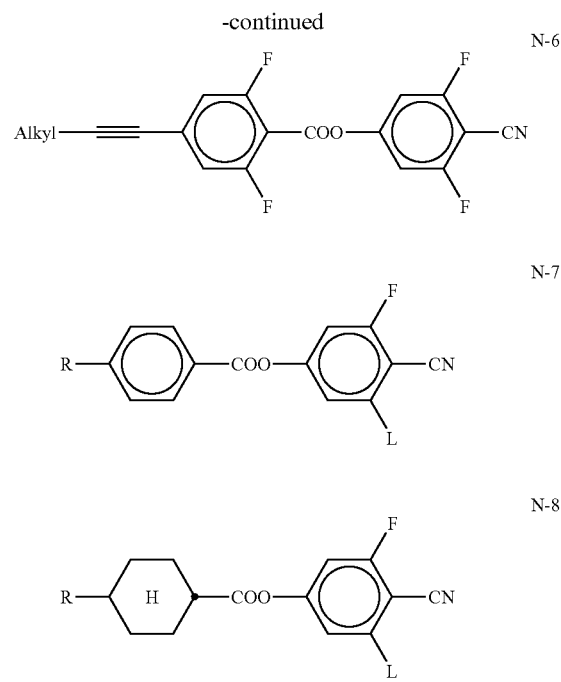
N-6
N-7
N-8
N-9
N-10
The medium component B additionally comprises one or more compounds selected from the group consisting of the general formulae III to VII:
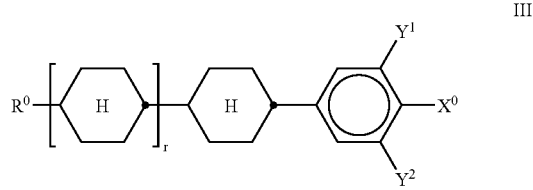
III
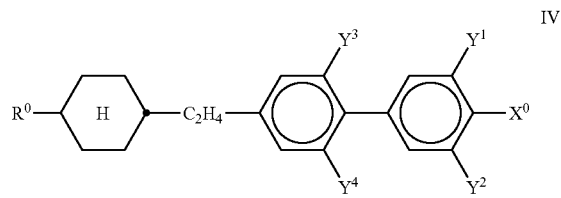
IV

V

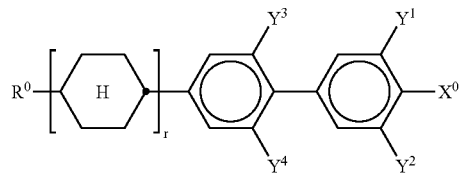

VI

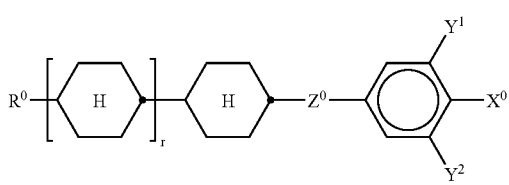

VII

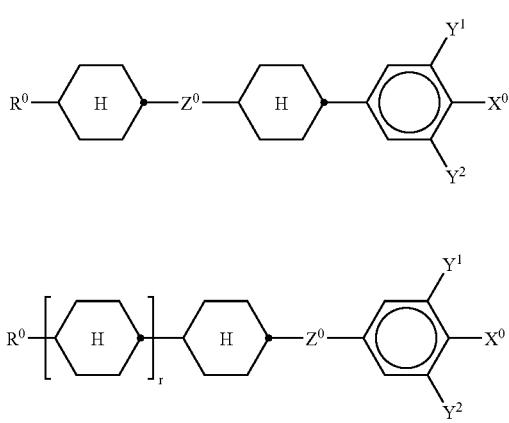

in which the individual radicals have the following meanings:
R⁰ is n-alkyl, alkoxy, oxaalkyl, fluoroalkyl or alkenyl, each having up to 9 carbon atoms,
X⁰ is CN, SF5, NCS, SO₂CF₃, F, Cl, halogenated alkyl, halogenated alkenyl, halogenated alkenyloxy or halogenated alkoxy having up to 6 carbon atoms,
Z⁰ is —C₂F₄—, —CF=CF—, —C₂H₄—, —(CH₂)₄—, —OCH₂—, —CH₂O—, —CH=CH—, —CF₂O— or —OCF₂—, —C₂F₄—,
Y¹ to Y⁴ are each, independently of one another, H or F,
r is 0 or 1.

The compound of the formula V is preferably

Va

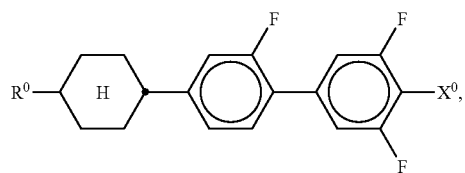

Vb

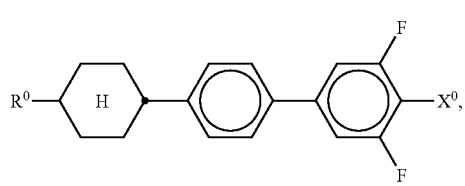

Vc

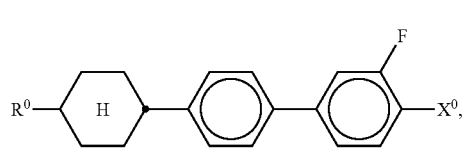

Vd

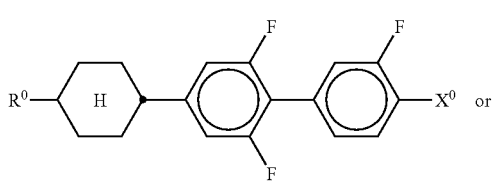 or

Ve

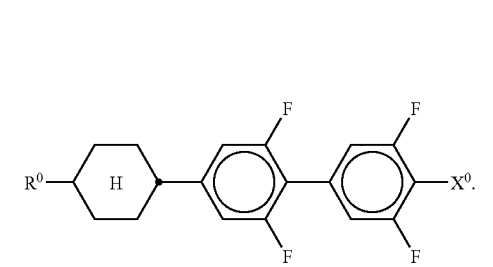

The component B additionally comprises one or more compounds selected from the group consisting of the general formulae VIII to XV:

VIII

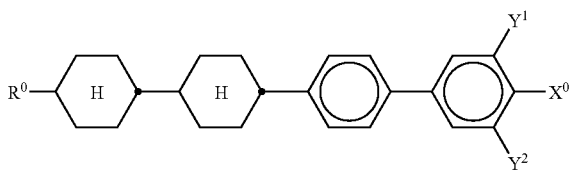

IX

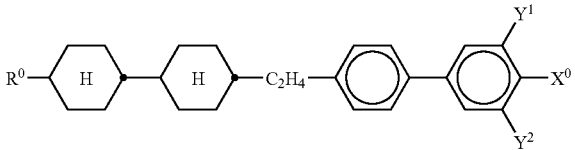

X

XI

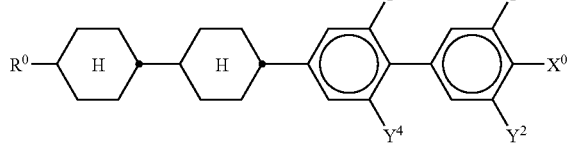

-continued

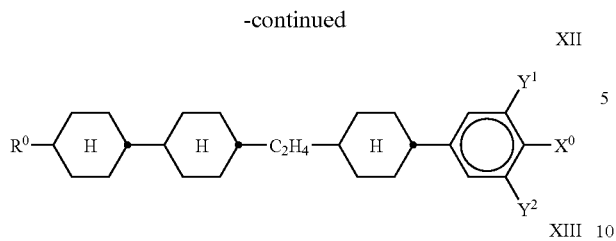

XII

XIII

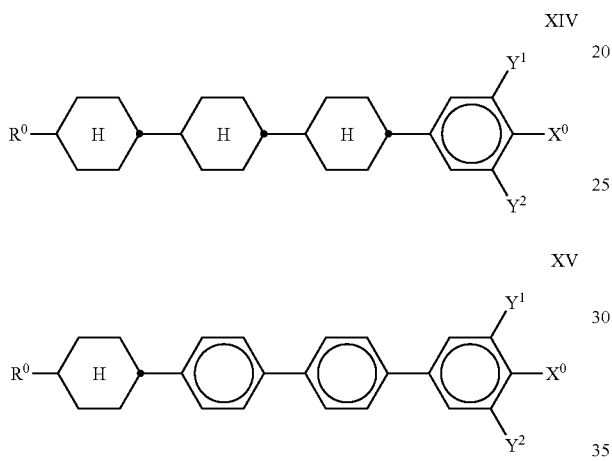

XIV

XV in which $R^0$, $X^0$ and $y^{1-4}$ are each, independently of one another, as defined in Claim 3. $X^0$ is preferably F, Cl, $CF_3$, $OCF_3$ or $OCHF_2$. $R^0$ is preferably alkyl, oxaalkyl, fluoroalkyl or alkenyl, each having up to 6 carbon atoms.

The component B additionally comprises one or more compounds of the formulae E-a to E-d

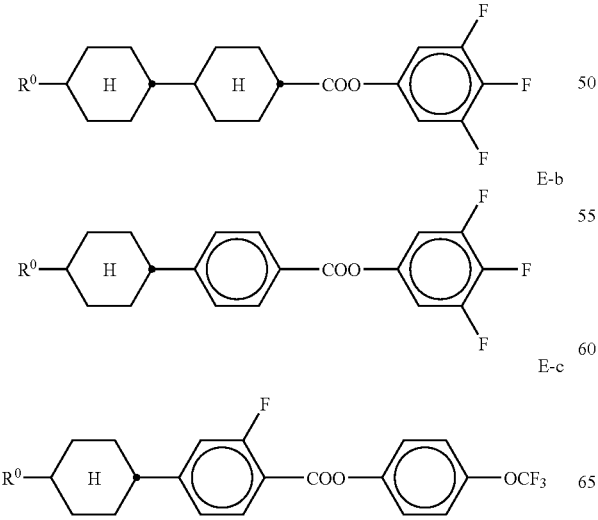

E-a

E-b

E-c

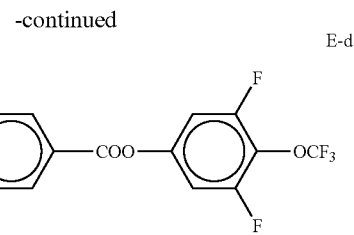

E-d in which $R^0$ is as defined in Claim 3;

The proportion of the compounds of the formulae E-a to E-d is preferably 10-30% by weight, in particular 15-25% by weight;

The proportion of compounds of the formulae II to VII in the mixture as a whole is from 1 to 30 weight;

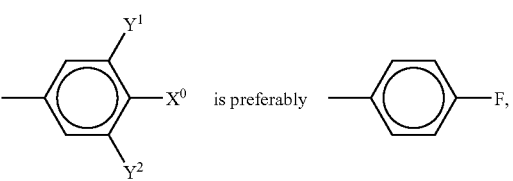 is preferably

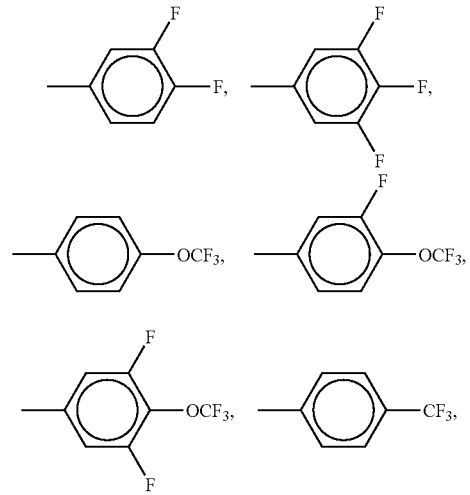

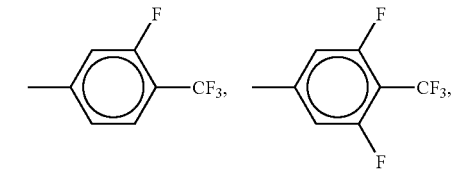

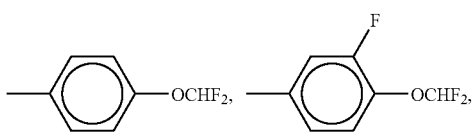

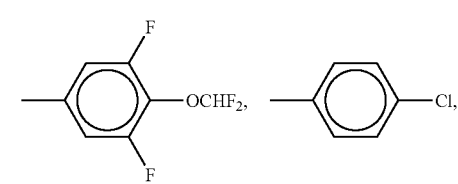

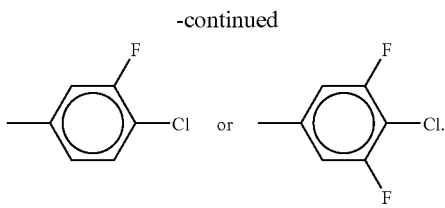

The medium comprises compounds of the formulae II, III, IV, V and/or VI;

R⁰ is straight-chain alkyl or alkenyl having from 2 to 7 carbon atoms;

Component B comprises further compounds, preferably selected from the following group consisting of the general formulae XVI to XX:

XVI

R⁰—⌬—⌬—⌬—X⁰

XVII

R⁰—⌬—⌬—CH₂CH₂—⌬(Y¹)—X⁰

XVIII

R⁰—⌬—CH₂CH₂—⌬—⌬—X⁰

XIX

R⁰—⌬(F)—⌬—C₂H₄—⌬—X⁰

XX

R⁰—⌬—⌬(F)—⌬(F,F)—X⁰ in which R⁰ and X⁰ are as defined above. The 1,4-phenylene rings may additionally be substituted by CN, chlorine or fluorine. The 1,4-phenylene rings are preferably monosubstituted or polysubstituted by fluorine atoms.

Liquid crystalline medium additionally comprises one, two, three or more, preferably two or three, compounds of the formulae

O1 alkyl—H—H—CH₂O—H—alkyl*

O2 alkyl—H—H—CH₂O—H—H—alkyl in which "alkyl" and "alkyl*" are as defined below. The proportion of the compounds of the formulae O1 and/or O2 in the mixtures according to the invention is preferably 5-10% by weight.

The medium preferably comprises one, two or three compounds of the formula IVa in which X⁰ is F or OCF₃.

The medium preferably comprises one or more compounds of the formulae IIa to IIg

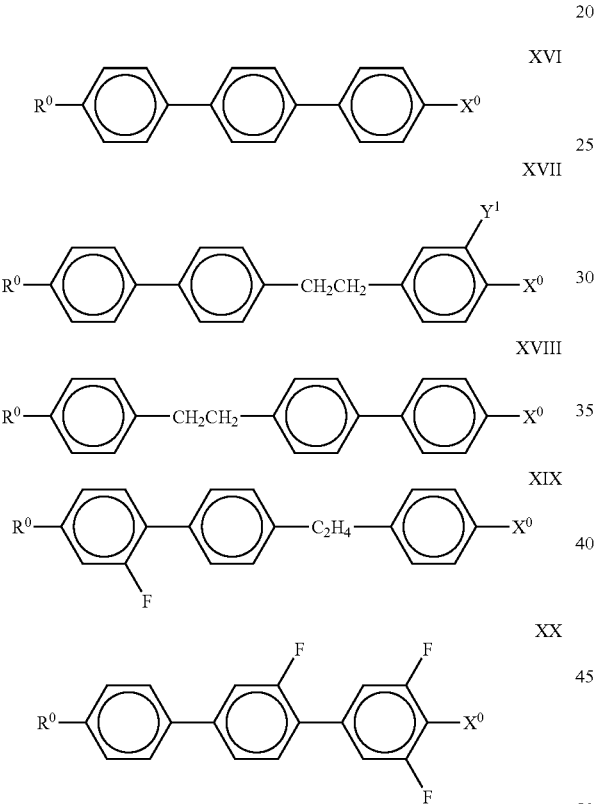

in which R⁰ is as defined above. In the compounds of the formulae IIa-IIg, R⁰ is preferably methyl, ethyl, n-propyl, n-butyl or n-pentyl.

The medium preferably comprises one or more compounds of the formulae

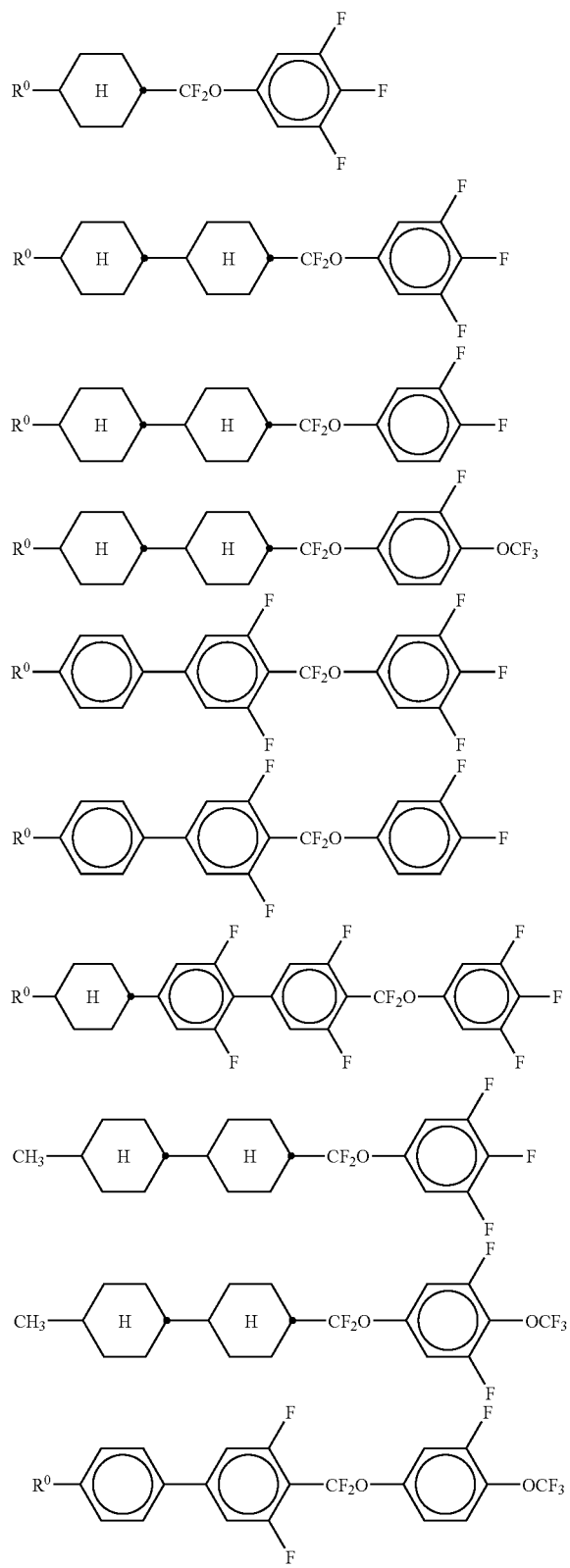

in which $R^0$ is as defined above.

The proportion of the compounds of the formula IVb and/or IVc in which $X^0$ is fluorine and $R^0$ is $CH_3$, $C_2H_5$, n-$C_3H_7$, n-$C_4H_9$ or n-$C_5H_{11}$ in the mixture as a whole is from 2 to 20% by weight, in particular from 2 to 15% by weight.

The medium preferably comprises compounds of the formulae II to VI in which $R^0$ is methyl.

The medium particularly preferably comprises compounds of the formulae

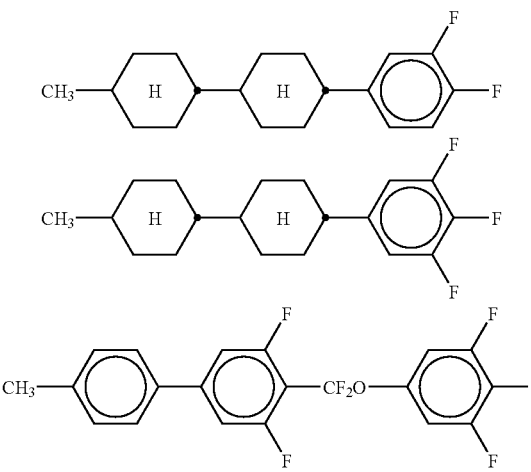

The medium preferably comprises one, two or more, preferably one or two, dioxane compounds of the formulae

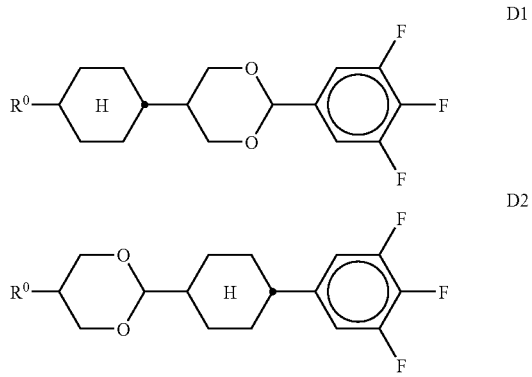

The medium additionally comprises one, two or more bicyclic compounds of the formulae Z1 to Z6

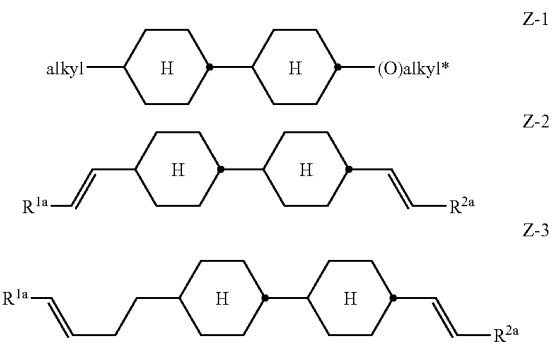

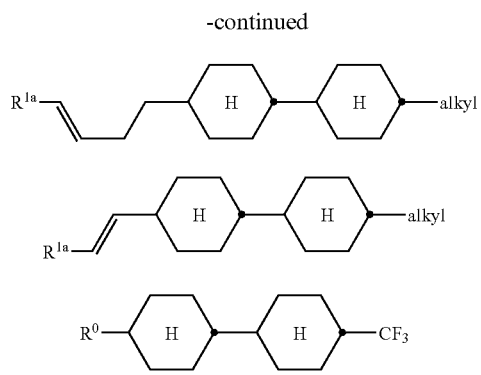

in which $R^{1a}$ and $R^{2a}$ are each, independently of one another, H, $CH_3$, $C_2H_5$ or n-$C_3H_7$. $R^0$, alkyl and alkyl* are as defined in claim 3 or as defined below.

Of the said bicyclic compounds, particular preference is given to the compounds Z-1, Z-2, Z-5 and Z-6.

The medium additionally comprises one, two or more compounds having fused rings, of the formulae AN1 to AN11:

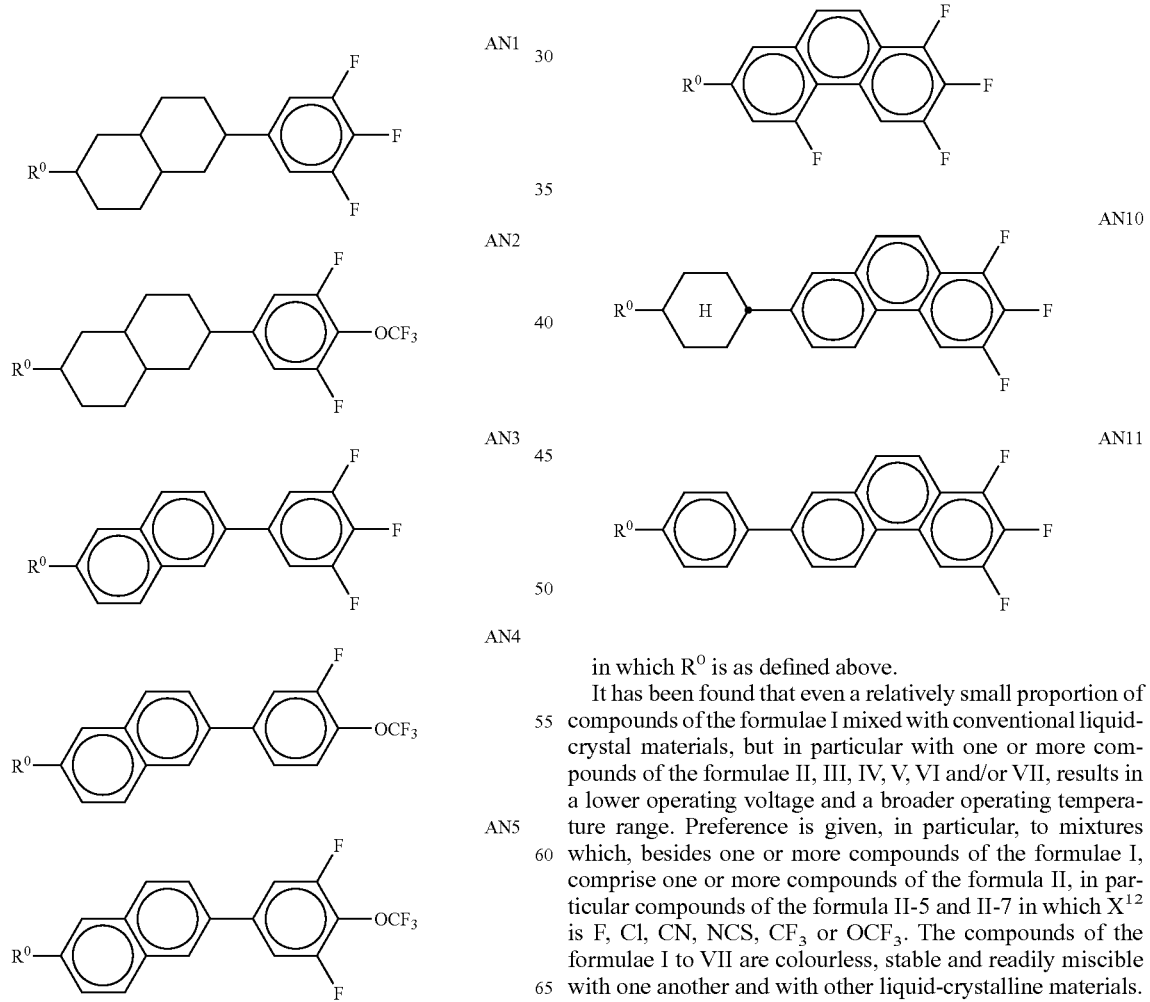

in which $R^0$ is as defined above.

It has been found that even a relatively small proportion of compounds of the formulae I mixed with conventional liquid-crystal materials, but in particular with one or more compounds of the formulae II, III, IV, V, VI and/or VII, results in a lower operating voltage and a broader operating temperature range. Preference is given, in particular, to mixtures which, besides one or more compounds of the formulae I, comprise one or more compounds of the formula II, in particular compounds of the formula II-5 and II-7 in which $X^{12}$ is F, Cl, CN, NCS, $CF_3$ or $OCF_3$. The compounds of the formulae I to VII are colourless, stable and readily miscible with one another and with other liquid-crystalline materials.

The term "alkyl" or "alkyl*" covers straight-chain and branched alkyl groups having 1-7 carbon atoms, in particular the straight-chain groups methyl, ethyl, propyl, butyl, pentyl, hexyl and heptyl. Groups having 1-5 carbon atoms are generally preferred.

The term "alkenyl" covers straight-chain and branched alkenyl groups having 2-7 carbon atoms, in particular the straight-chain groups. Preferred alkenyl groups are $C_2$-$C_7$-1E-alkenyl, $C_4$-$C_7$-3E-alkenyl, $C_5$-$C_7$-4-alkenyl, $C_6$-$C_7$-5-alkenyl and $C_7$-6-alkenyl, in particular $C_2$-$C_7$-1E-alkenyl, $C_4$-$C_7$-3E-alkenyl and $C_5$-$C_7$-4-alkenyl. Examples of particularly preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably covers straight-chain groups having a terminal fluorine, i.e. fluoromethyl, 2-fluoroethyl, 3-fluoropropyl, 4-fluoro-butyl, 5-fluoropentyl, 6-fluorohexyl and 7-fluoroheptyl. However, other positions of the fluorine are not excluded.

The term "oxaalkyl" preferably covers straight-chain radicals of the formula $C_nH_{2n+1}$—O—$(CH_2)_m$, in which n and m are each, independently of one another, from 1 to 6. Preferably, n=1 and m is from 1 to 6.

The optimum mixing ratio of the compounds of the formulae I and II+III+IV+V+VI+VII depends substantially on the desired properties, on the choice of the components of the formulae III, IV, V, VI and/or VII, and on the choice of any other components that may be present. Suitable mixing ratios within the range given above can easily be determined from case to case.

The total amount of compounds of the formulae I to XV in the mixtures according to the invention is not crucial. The mixtures can therefore comprise one or more further components for the purposes of optimisation of various properties. However, the observed effect on the operating voltage and the operating temperature range is generally greater, the higher the total concentration of compounds of the formulae I to XV.

In a particularly preferred embodiment, the media according to the invention comprise compounds of the formulae III to VII in which $X^0$ is F, $OCF_3$, $OCHF_2$, $OCH=CF_2$, $OCF=CF_2$ or $OCF_2$—$CF_2H$. A favourable synergistic effect with the compounds of the formulae I results in particularly advantageous properties. In particular, mixtures comprising compounds of the formula I and of the formula II are distinguished by their low operating voltages.

The individual compounds of the formulae I to XX and their sub-formulae which can be used in the media according to the invention are either known or can be prepared analogously to the known compounds.

The construction of the MLC display according to the invention from polarisers, electrode base plates and surface-treated electrodes corresponds to the conventional construction for displays of this type. The term conventional construction is broadly drawn here and also covers all derivatives and modifications of the MLC display, in particular including matrix display elements based on poly-Si TFT or MIM.

A significant difference between the displays according to the invention and the conventional displays based on the twisted nematic cell consists, however, in the choice of the liquid-crystal parameters of the liquid-crystal layer.

The media according to the invention are prepared in a manner conventional per se. In general, the components are dissolved in one another, advantageously at elevated temperature. By means of suitable additives, the liquid-crystalline phases in accordance with the invention can be modified in such a way that they can be used in all types of liquid crystal display elements that have been disclosed hitherto. Additives of this type are known to the person skilled in the art and are described in detail in the literature (H. Kelker/R. Hatz, Handbook of Liquid Crystals, Verlag Chemie, Weinheim, 1980). For example, pleochroic dyes can be added for the preparation of coloured guest-host systems or substances can be added in order to modify the dielectric anisotropy, the viscosity and/or the alignment of the nematic phases. Furthermore, stabilisers and antioxidants can be added.

The mixtures according to the invention are suitable for TN, STN, ECB and IPS applications and isotropic switching mode (ISM) applications. Hence, there use in an electro-optical device and an electro-optical device containing liquid crystal media comprising at least one compound according to the invention are subject matters of the present invention.

The inventive mixtures are highly suitable for devices which operate in an optically isotropic state. The mixtures of the invention are surprisingly found to be highly suitable for the respective use.

Electro-optical devices that are operated or operable in an optically isotropic state recently have become of interest with respect to video, TV, and multi-media applications. This is because conventional liquid crystal displays utilizing electro-optical effects based on the physical properties of liquid crystals exhibit a rather high switching time which is undesired for said applications. Furthermore most of the conventional displays show a significant viewing angle dependence of contrast that in turn makes necessary measures to compensate this undesired property.

With regard to devices utilizing electro-optical effects in an isotropic state the German Patent Application DE 102 17 273 A1 for example discloses light controlling (light modulation) elements in which the mesogenic controlling medium for modulation is in the isotropic phase at the operating temperature. These light controlling elements have a very short switching time and a good viewing angle dependence of contrast. However, the driving or operating voltages of said elements are very often unsuitably high for some applicatons.

German Patent Application DE 102 41 301 yet unpublished describes specific structures of electrodes allowing a significant reduction of the driving voltages. However, these electrodes make the process of manufacturing the light controlling elements more complicated.

Furthermore, the light controlling elements, for example, disclosed in both DE 102 17 273 A1 and DE 102 41 301 show a significant temperature dependence. The electro-optical effect that can be induced by the electrical field in the controlling medium being in an optical isotropic state is most pronounced at temperatures close to the clearing point of the controlling medium. In this range the light controlling elements have the lowest values of their characteristic voltages and, thus, require the lowest operating voltages. As temperature increases the characteristic voltages and hence the operating voltages increase remarkably. Typical values of the temperature dependence are in the range from about a few volts per centigrade up to about ten or more volts per centigrade. While DE 102 41 301 describes various structures of electrodes for devices operable or operated in the isotropic state, DE 102 17 273 A1 discloses isotropic media of varying composition that are useful in light controlling elements operable or operated in the isotropic state. The relative temperature dependence of the threshold voltage in these light controlling elements is at a temperature of 1 centigrade above the clearing point in the range of about 50%/centigrade. That temperature dependence decreases with increasing temperature so that it is at a temperature of 5 centigrade above the clearing point of about 10%/centigrade. However, for many practical applications of displays utilizing said light controlling elements the temperature dependence of the electro-optical effect is too high. To the contrary, for practical uses it is desired that the operating voltages are independent from the operating temperature over a temperature range of at least some centigrades, preferably of about 5 centigrades or more, even more preferably of about 10 centigrades or more and especially of about 20 centigrades or more.

Now it has been found that the use of the inventive mixtures are highly suitable as controlling media in the light controlling elements as described above and in DE 102 17 273 A1, DE 102 41 301 and DE 102 536 06 and broaden the temperature range in which the operating voltages of said electro-optical operates. In this case the optical isotropic state or the blue phase is almost completely or completely independent from the operating temperature.

This effect is even more distinct if the mesogenic controlling media exhibit at least one so-called "blue phase" as described in yet unpublished DE 103 13 979. Liquid crystals having an extremely high chiral twist may have one or more optically isotropic phases. If they have a respective cholesteric pitch, these phases might appear bluish in a cell having a sufficiently large cell gap. Those phases are therefore also called "blue phases" (Gray and Goodby, "Smectic Liquid Crystals, Textures and Structures", Leonhard Hill, USA, Canada (1984)). Effects of electrical fields on liquid crystals existing in a blue phase are described for instance in H. S. Kitzerow, "The Effect of Electric Fields on Blue Phases", Mol. Cryst. Liq. Cryst. (1991), Vol. 202, p. 51-83, as well as the three types of blue phases identified so far, namely BP I, BP II, and BP III, that may be observed in field-free liquid crystals. It is noteworthy, that if the liquid crystal exhibiting a blue phase or blue phases is subjected to an electrical field, further blue phases or other phases different from the blue phases I, II and III might appear.

The inventive mixtures can be used in an electro-optical light controlling element which comprises one or more, especially two substrates;

an assembly of electrodes;

one or more elements for polarizing the light; and said controlling medium;

whereby said light controlling element is operated (or operable) at a temperature at which the controlling medium is in an optically isotropic phase when it is in a non-driven state.

The controlling medium of the present invention has a characteristic temperature, preferably a clearing point, in the range from about −30° C. to about 8020 C., especially up to about 5520 C.

The operating temperature of the light controlling elements is preferably above the characteristic temperature of the controlling medium said temperature being usually the transition temperature of the controlling medium to the blue phase; generally the operating temperature is in the range of about 0.1° to about 50°, preferably in the range of about 0.1° to about 10° above said characteristic temperature. It is highly preferred that the operating temperature is in the range from the transition temperature of the controlling medium to the blue phase up to the transition temperature of the controlling medium to the isotropic phase which is the clearing point. The light controlling elements, however, may also be operated at temperatures at which the controlling medium is in the isotropic phase.

(For the purposes of the present invention the term "characteristic temperature" is defined as follows:

If the characteristic voltage as a function of temperature has a minimum, the temperature at this minimum is denoted as characteristic temperature.

If the characteristic voltage as a function of temperature has no minimum and if the controlling medium has one or more blue phases, the transistion temperature to the blue phase is denoted as characteristic temperature; in case there are more than one blue phase, the lowest transition temperature to a blue phase is denoted as characteristic temperature.

If the characteristic voltage as a function of temperature has no minimum and if the controlling medium has no blue phase, the transistion temperature to the isotropic phase is denoted as characteristic temperature.)

In the context of the present invention the term "alkyl" means—as long as it is not defined in a different manner elsewhere in this description or in the claims—straight-chain and branched hydrocarbon (aliphatic) radicals with 1 to 15 carbon atoms. The hydrocarbon radicals may be unsubstituted or substituted with one or more substituents being independently selected from the group consisting of F, Cl, Br, I or CN.

The dielectrics may also comprise further additives known to the person skilled in the art and described in the literature. For example, 0-15% of pleochroic dyes, antioxidants or stabilizers can be added.

C denotes a crystalline phase, S a smectic phase, $S_C$ a smectic C phase, N a nematic phase, I the isotropic phase and BP the blue phase.

$V_{10}$ denotes the voltage for 10% transmission, V100 denotes the voltage for 100% transmission (viewing angle perpendicular to the plate surface). $t_{on}$ denotes the switch-on time and $t_{off}$ the switch-off time at an operating voltage corresponding the value of V100.

$\Delta n$ denotes the optical anisotropy. $\Delta \in$ denotes the dielectric anisotropy ($\Delta \in = \in_{\parallel} - \in_{\perp}$, where $\in_{\parallel}$ denotes the dielectric constant parallel to the longitudinal molecular axes and $\in_{\perp}$ denotes the dielectric constant perpendicular thereto). The electro-optical data are measured in a TN cell at the 1st minimum (i.e. at a d·$\Delta n$ value of 0.5 μm) at 20° C., unless expressly stated otherwise. The optical data are measured at 20° C., unless expressly stated otherwise.

In the present application and in the examples below, the structures of the liquid-crystal compounds are indicated by means of acronyms, the transformation into chemical formulae taking place in accordance with Tables A and B below. All radicals $C_nH_{2n+1}$ and $C_mH_{2m+1}$ are straight-chain alkyl radicals having n and m carbon atoms respectively; n and m are integers and are preferably 0, 1, 2, 3, 4, 5, 6, 7, 8, 9, 10, 11 or 12. The coding in Table B is self-evident. In Table A, only the acronym for the parent structure is indicated. In individual cases, the acronym for the parent structure is followed, separated by a dash, by a code for the substituents $R^{1*}$, $R^{2*}$, $L^{1*}$ and $L^{2*}$:

| Code for $R^{1*}$, $R^{2*}$, $L^{1*}$, $L^{2*}$ | $R^{1*}$ | $R^{2*}$ | $L^{1*}$ | $L^{2*}$ |
|---|---|---|---|---|
| nm | $C_nH_{2n+1}$ | $C_mH_{2m+1}$ | H | H |
| nOm | $OC_nH_{2n+1}$ | $C_mH_{2m+1}$ | H | H |
| nO.m | $C_nH_{2n+1}$ | $OC_mH_{2m+1}$ | H | H |
| n | $C_nH_{2n+1}$ | CN | H | H |
| nN.F | $C_nH_{2n+1}$ | CN | F | H |
| nN.F.F | $C_nH_{2n+1}$ | CN | F | F |
| nF | $C_nH_{2n+1}$ | F | H | H |
| nCl | $C_nH_{2n+1}$ | Cl | H | H |
| nOF | $OC_nH_{2n+1}$ | F | H | H |
| nF.F | $C_nH_{2n+1}$ | F | F | H |
| nF.F.F | $C_nH_{2n+1}$ | F | F | F |
| nmF | $C_nH_{2n+1}$ | $C_mH_{2m+1}$ | F | H |
| $nOCF_3$ | $C_nH_{2n+1}$ | $OCF_3$ | H | H |
| $nOCF_3.F$ | $C_nH_{2n+1}$ | $OCF_3$ | F | H |
| n-S | $C_nH_{2n+1}$ | NCS | H | H |
| n-Vm | $C_nH_{2n+1}$ | $-CH=CH-C_mH_{2m+1}$ | H | H |
| nV-Vm | $C_nH_{2n+1}-CH=CH-$ | $-CH=CH-C_mH_{2m+1}$ | H | H |

Preferred mixture components are given in Tables A and B.

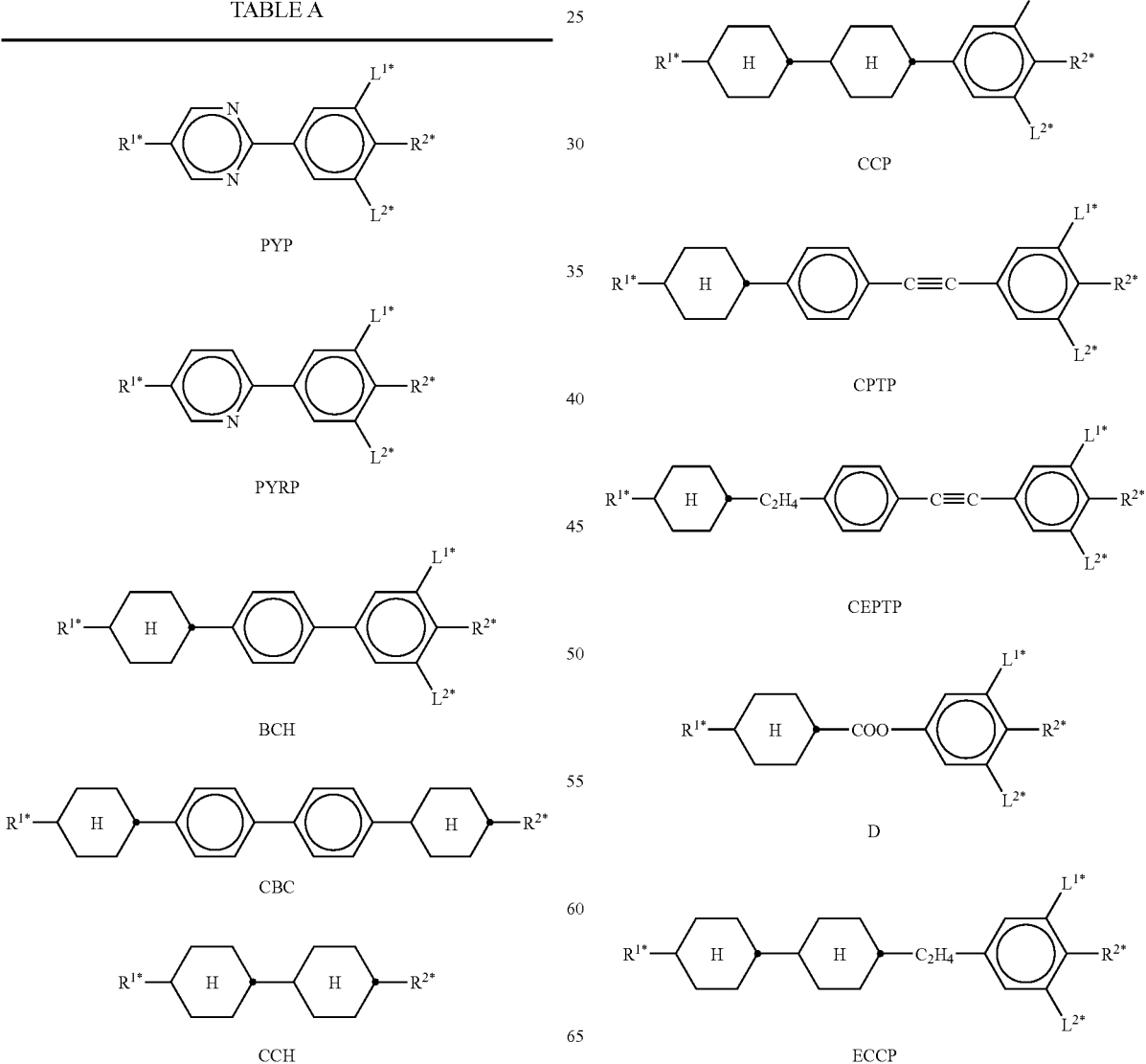

TABLE A

PYP

PYRP

BCH

CBC

CCH

TABLE A-continued

CCP

CPTP

CEPTP

D

ECCP

TABLE A-continued
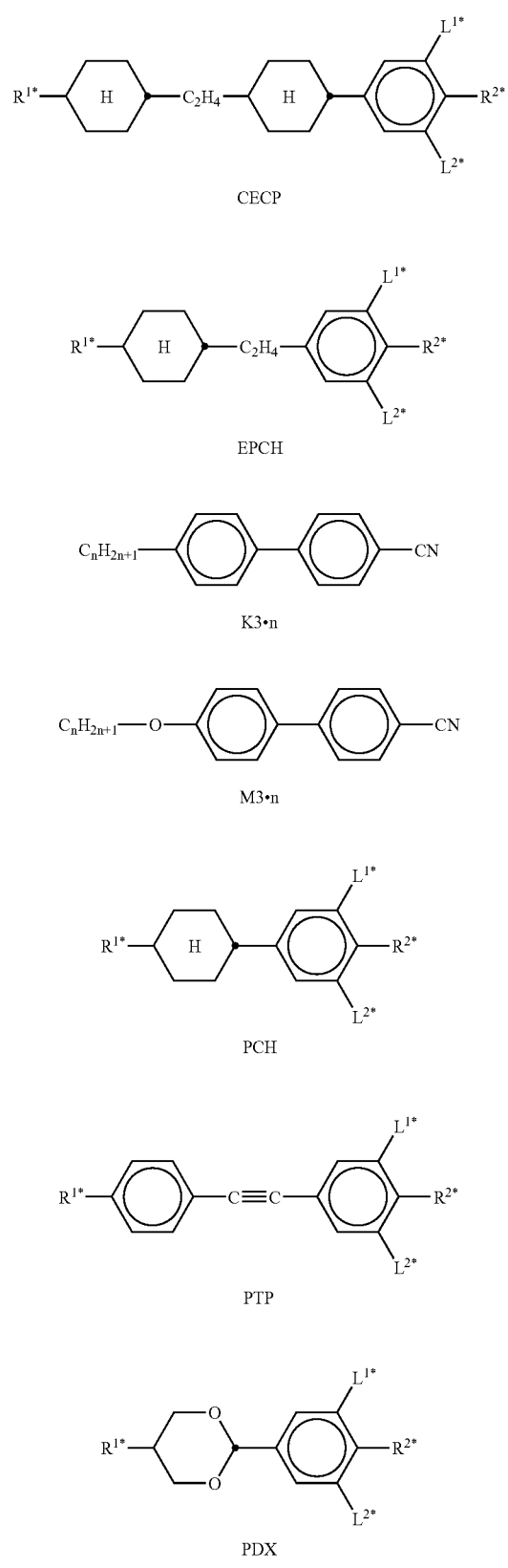
TABLE A-continued
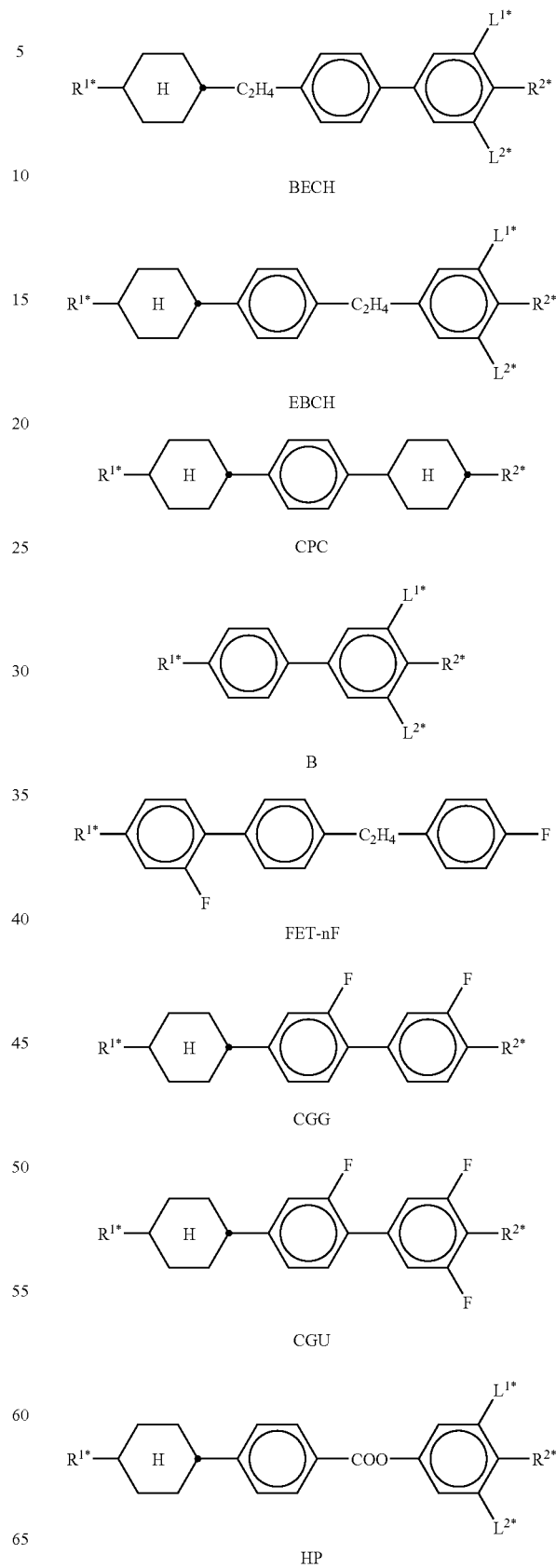

TABLE A-continued
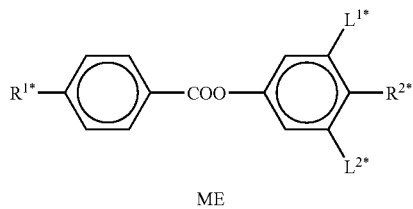
ME
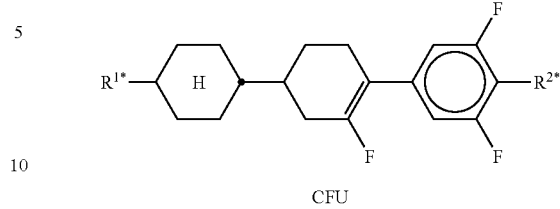
CFU
TABLE B
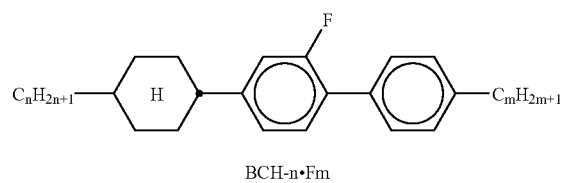
BCH-n·Fm
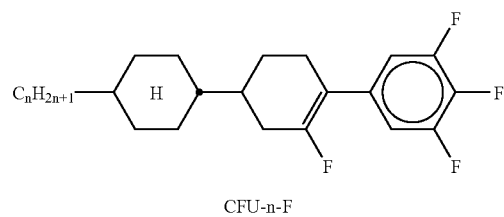
CFU-n-F
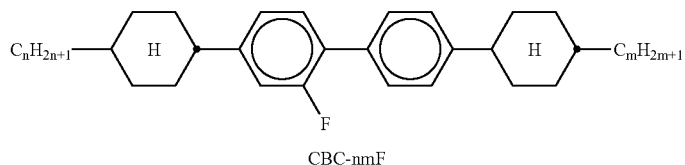
CBC-nmF
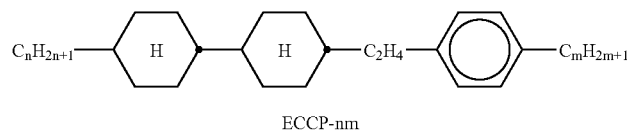
ECCP-nm
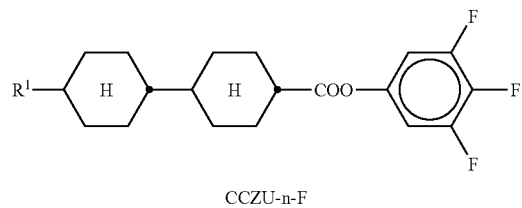
CCZU-n-F
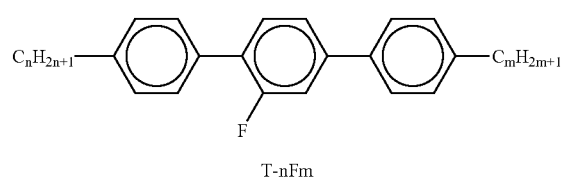
T-nFm TABLE B-continued
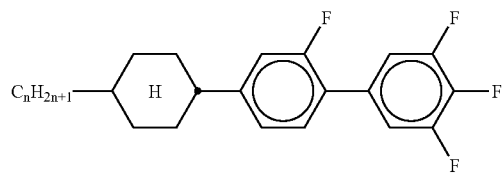
CGU-n-F
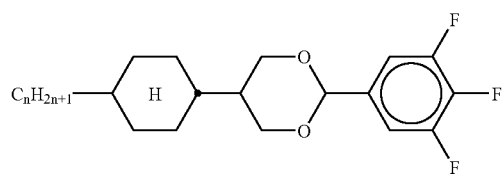
CDU-n-F
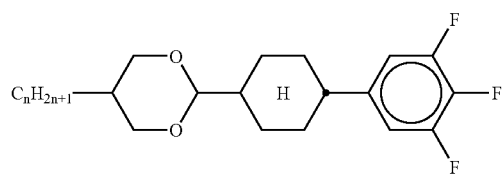
DCU-n-F
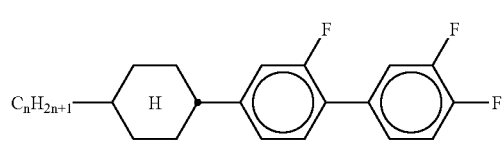
CGG-n-F
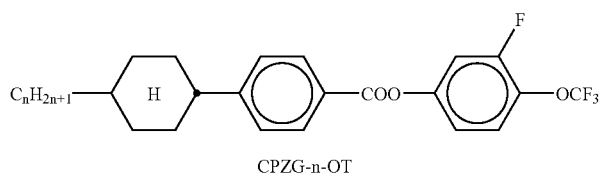
CPZG-n-OT
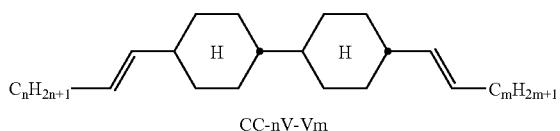
CC-nV-Vm
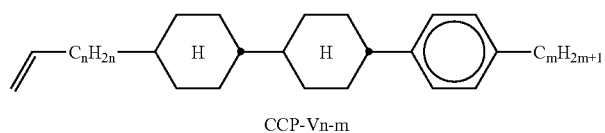
CCP-Vn-m
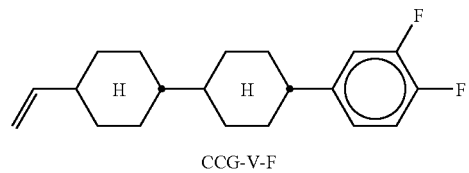
CCG-V-F TABLE B-continued
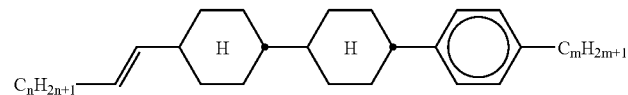
CCP-nV-m
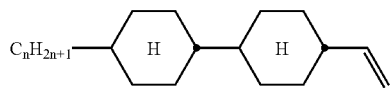
CC-n-V
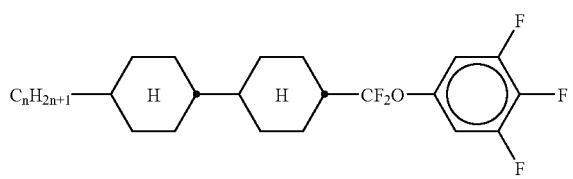
CCQU-n-F
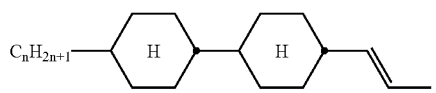
CC-n-V1
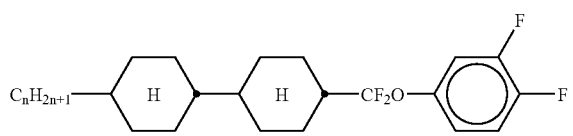
CCQG-n-F
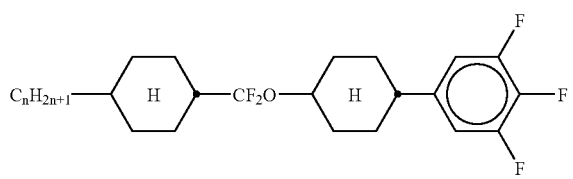
CQCU-n-F
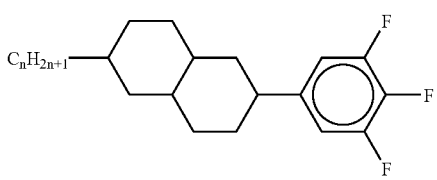
Dec-U-n-F
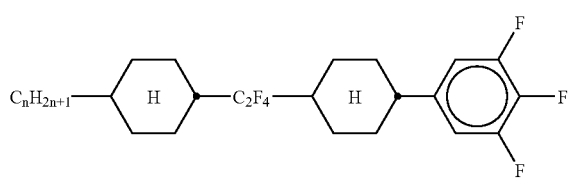
CWCU-n-F TABLE B-continued
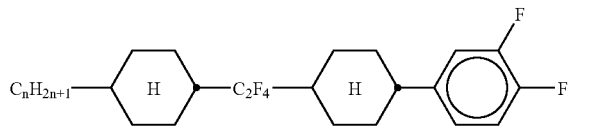
CWCG-n-F
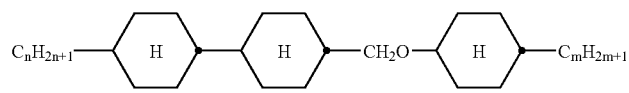
CCOC-n-m
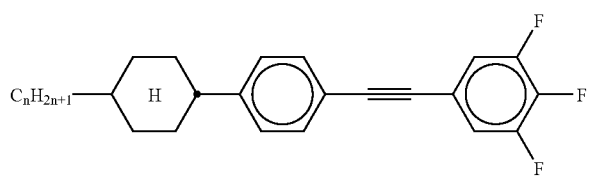
CPTU-n-F
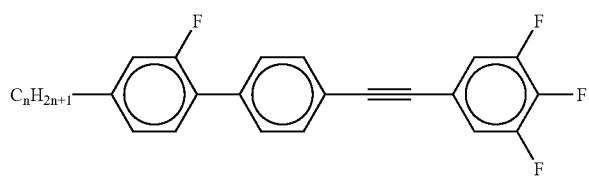
GPTU-n-F
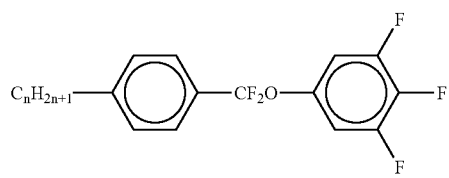
PQU-n-F
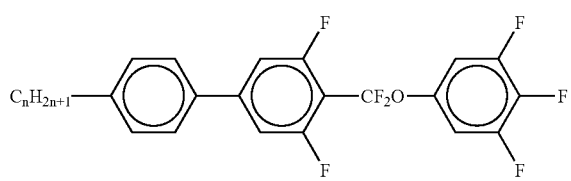
PUQU-n-F
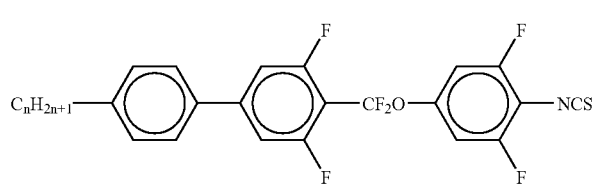
PUQU-n-S
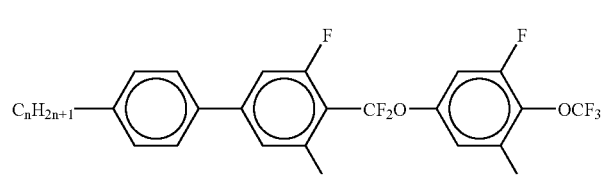
PUQU-n-OT TABLE B-continued
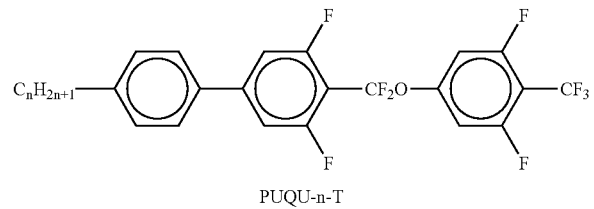
PUQU-n-T
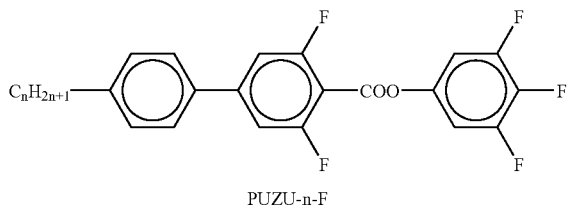
PUZU-n-F
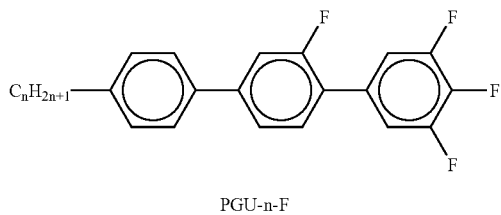
PGU-n-F
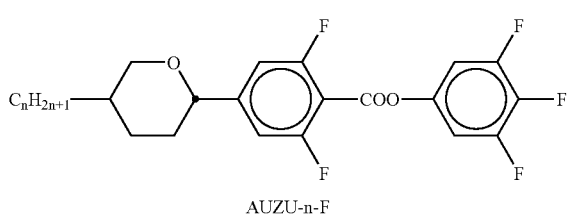
AUZU-n-F
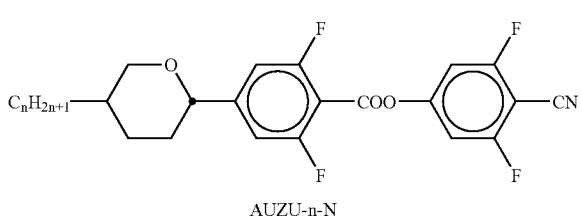
AUZU-n-N
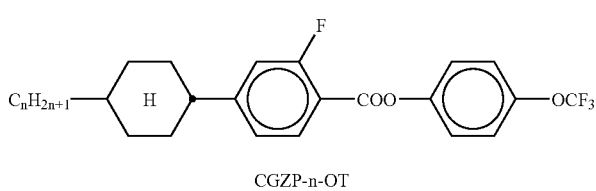
CGZP-n-OT
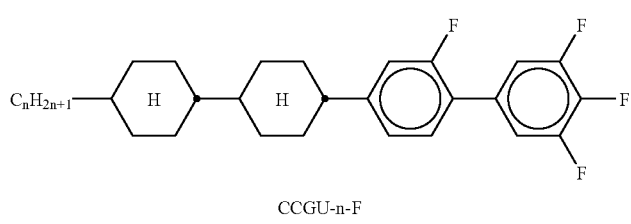
CCGU-n-F TABLE B-continued
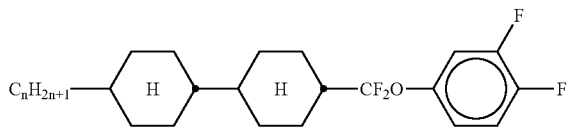
CCQG-n-F
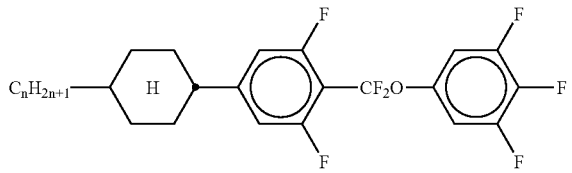
CUQU-n-F
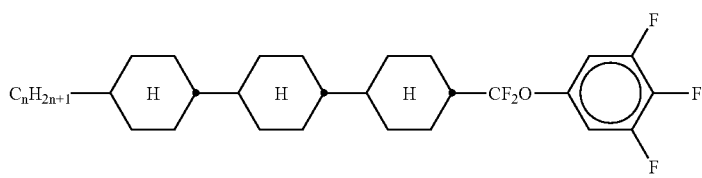
CCCQU-n-F
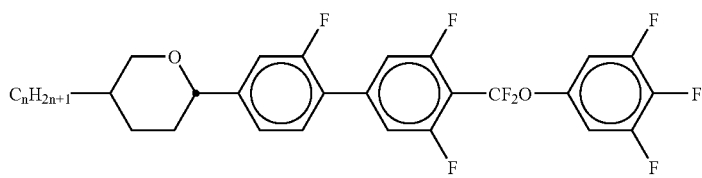
AGUQU-n-F
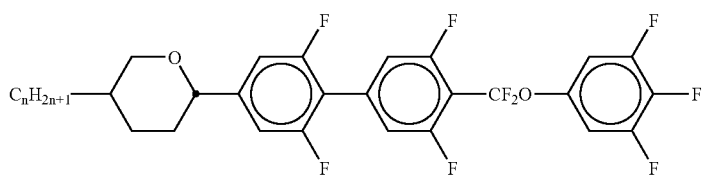
AUUQU-n-F
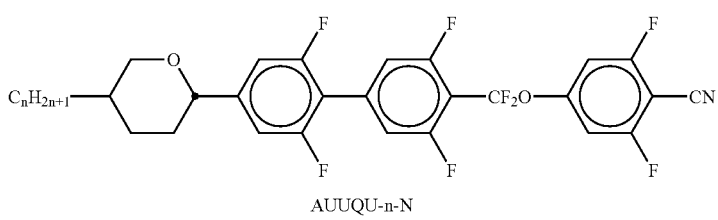
AUUQU-n-N
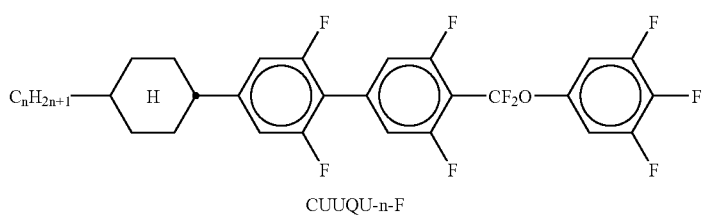
CUUQU-n-F TABLE B-continued
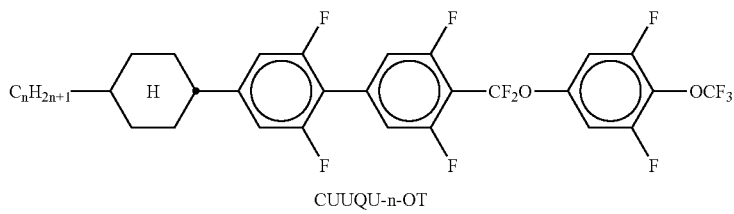
CUUQU-n-OT
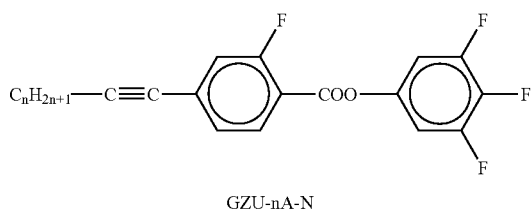
GZU-nA-N
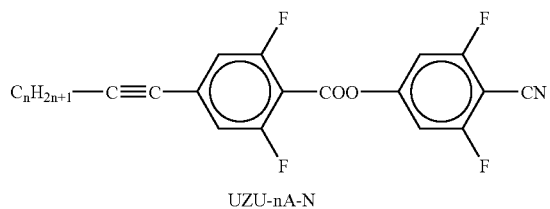
UZU-nA-N
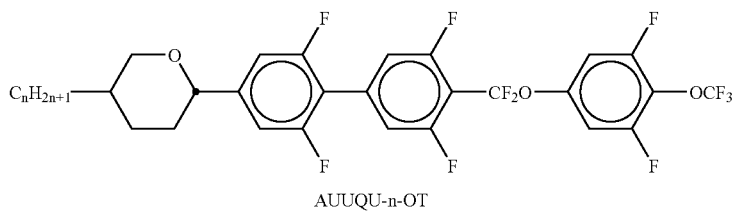
AUUQU-n-OT
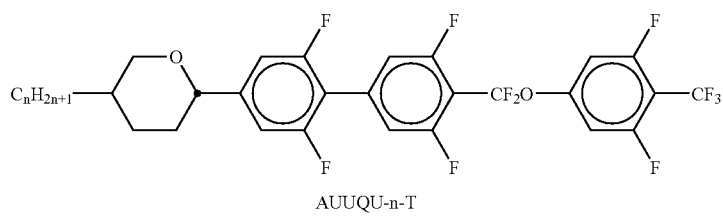
AUUQU-n-T
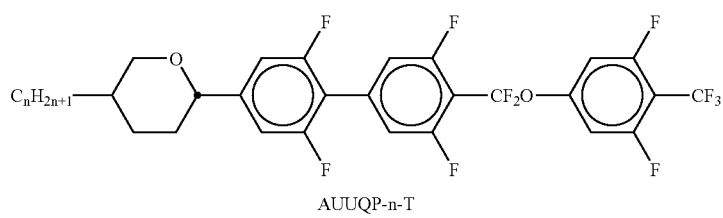
AUUQP-n-T
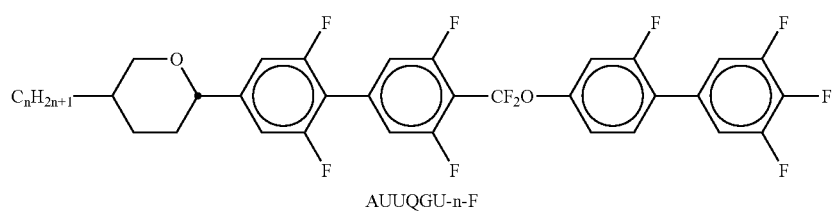
AUUQGU-n-F

TABLE B-continued

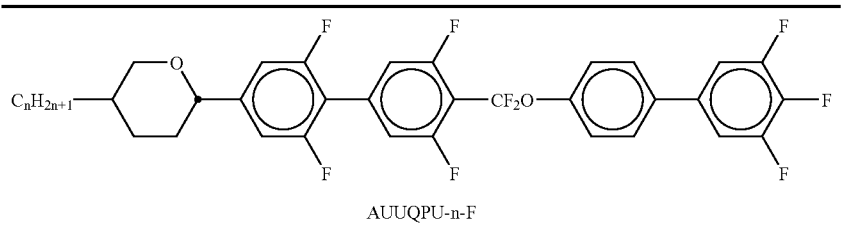

AUUQPU-n-F

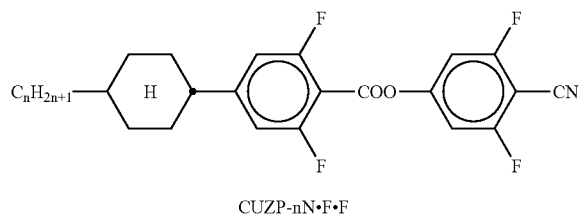

CUZP-nN•F•F

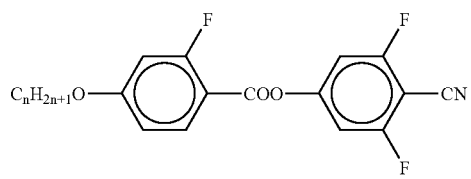

GZU-nO-N

Particular preference is given to liquid-crystalline mixtures which, besides the compounds of the formula I, comprise at least one, two, three or four compounds from Table B.

TABLE C

Table C shows possible dopants according to component C which are generally added to the mixtures alone or in combination two, three or more) according to the invention.

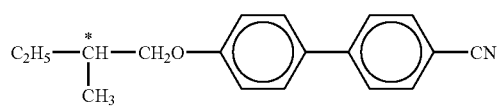

C 15

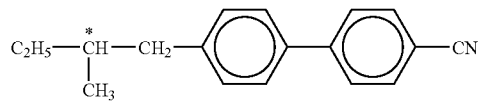

CB 15

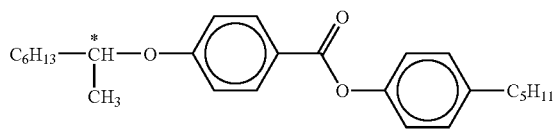

CM 21

TABLE C-continued
Table C shows possible dopants according to component C which are generally added to the mixtures alone or in combination two, three or more) according to the invention.
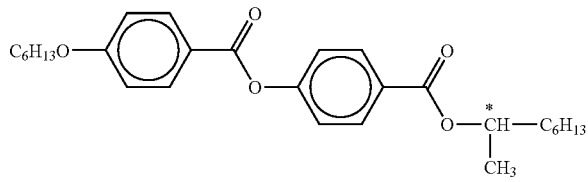
R/S-811
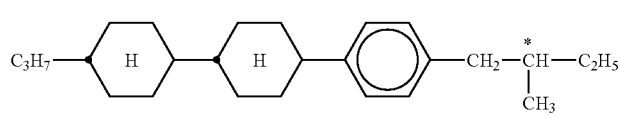
CM 44
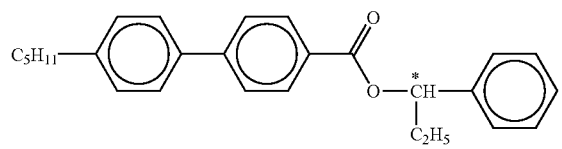
CM 45
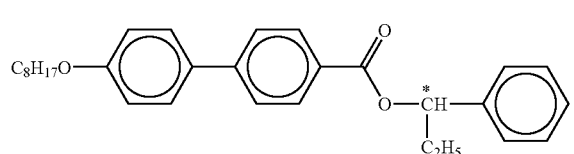
CM 47
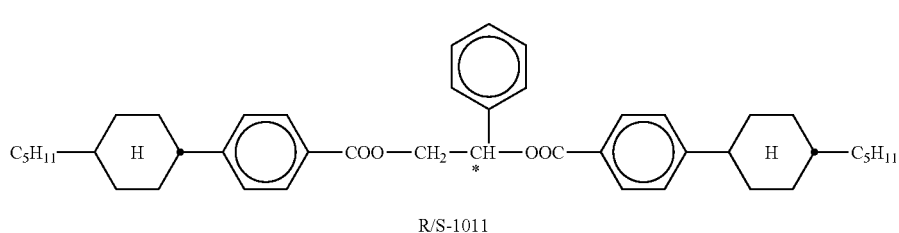
R/S-1011
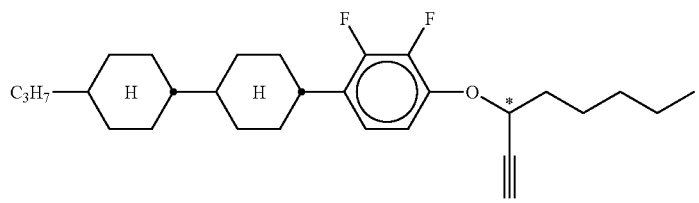
R/S-3011
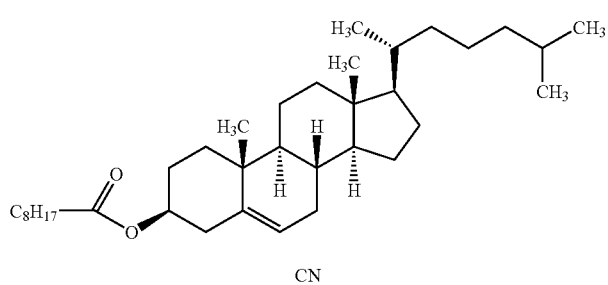
CN TABLE C-continued
Table C shows possible dopants according to component C which are generally added to the mixtures alone or in combination two, three or more) according to the invention.
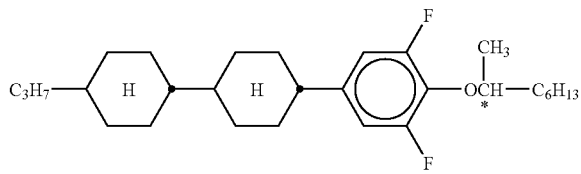
R/S-2011
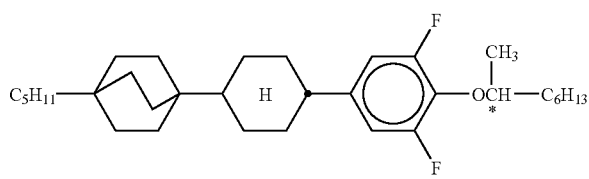
R/S-4011
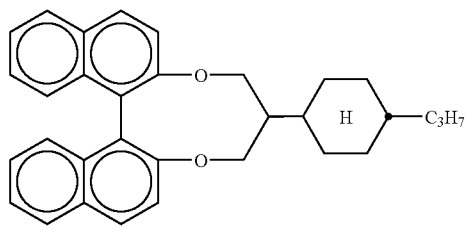
R/S-5011
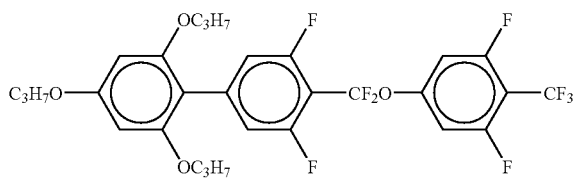
IS-11480
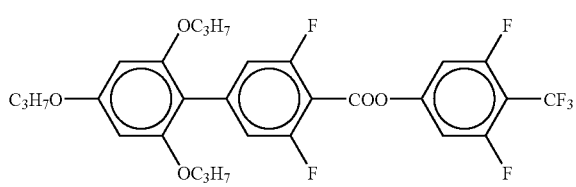
IS-11489

TABLE C-continued
Table C shows possible dopants according to component C which are generally added to the mixtures alone or in combination two, three or more) according to the invention.
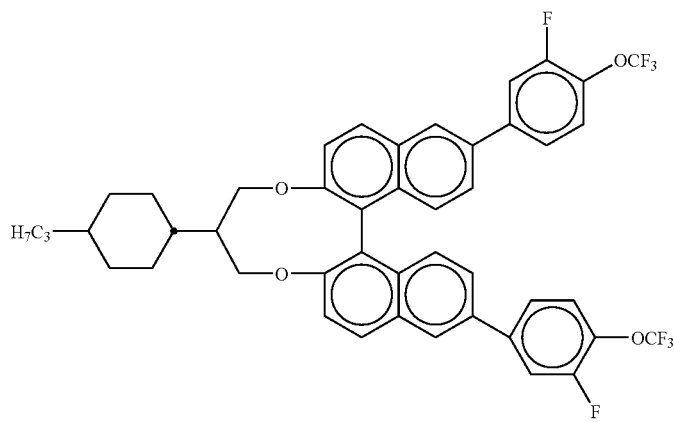
IS-11663
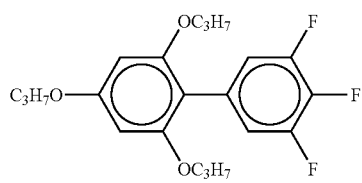
IS-11851
TABLE D
Stabilisers which can be added, for example, to the mixtures according to the invention are mentioned below.
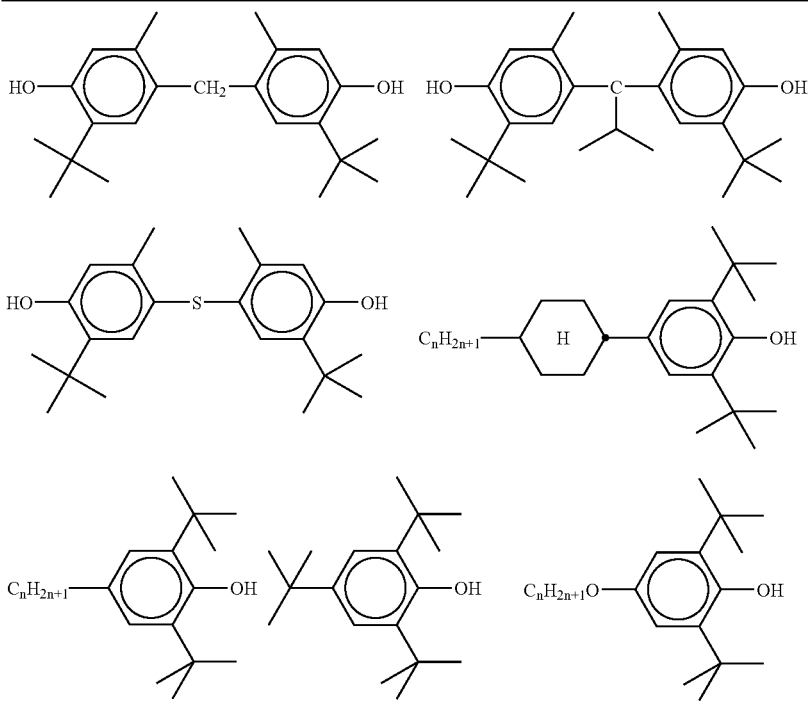

TABLE D-continued
Stabilisers which can be added, for example, to the mixtures according to the invention are mentioned below.
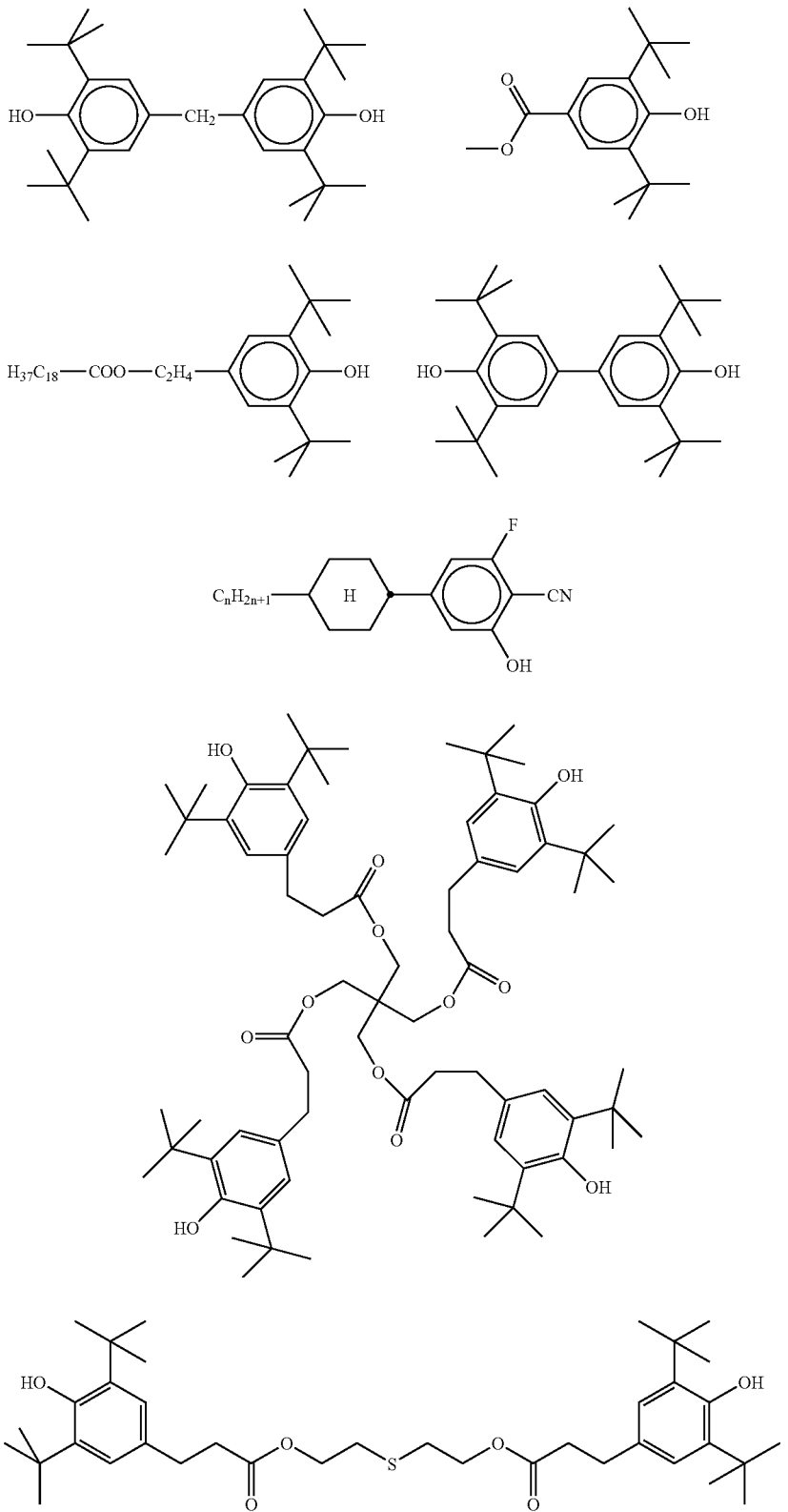

TABLE D-continued
Stabilisers which can be added, for example, to the mixtures according to the invention are mentioned below.
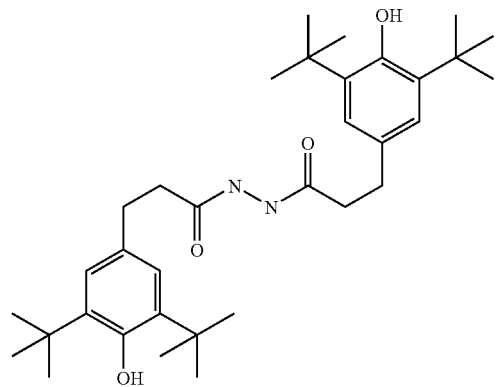
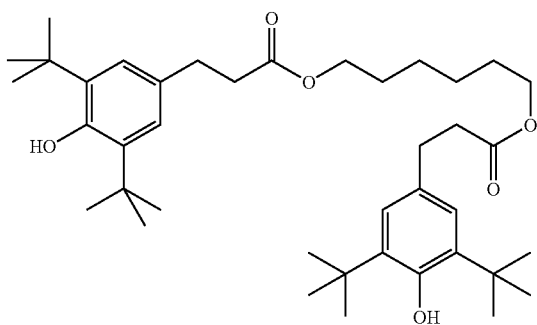
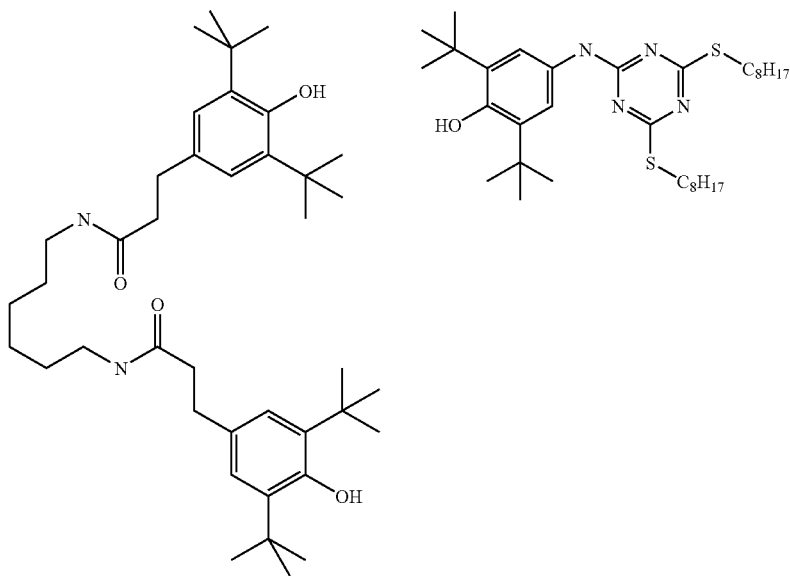

TABLE D-continued
Stabilisers which can be added, for example, to the mixtures according to the invention are mentioned below.
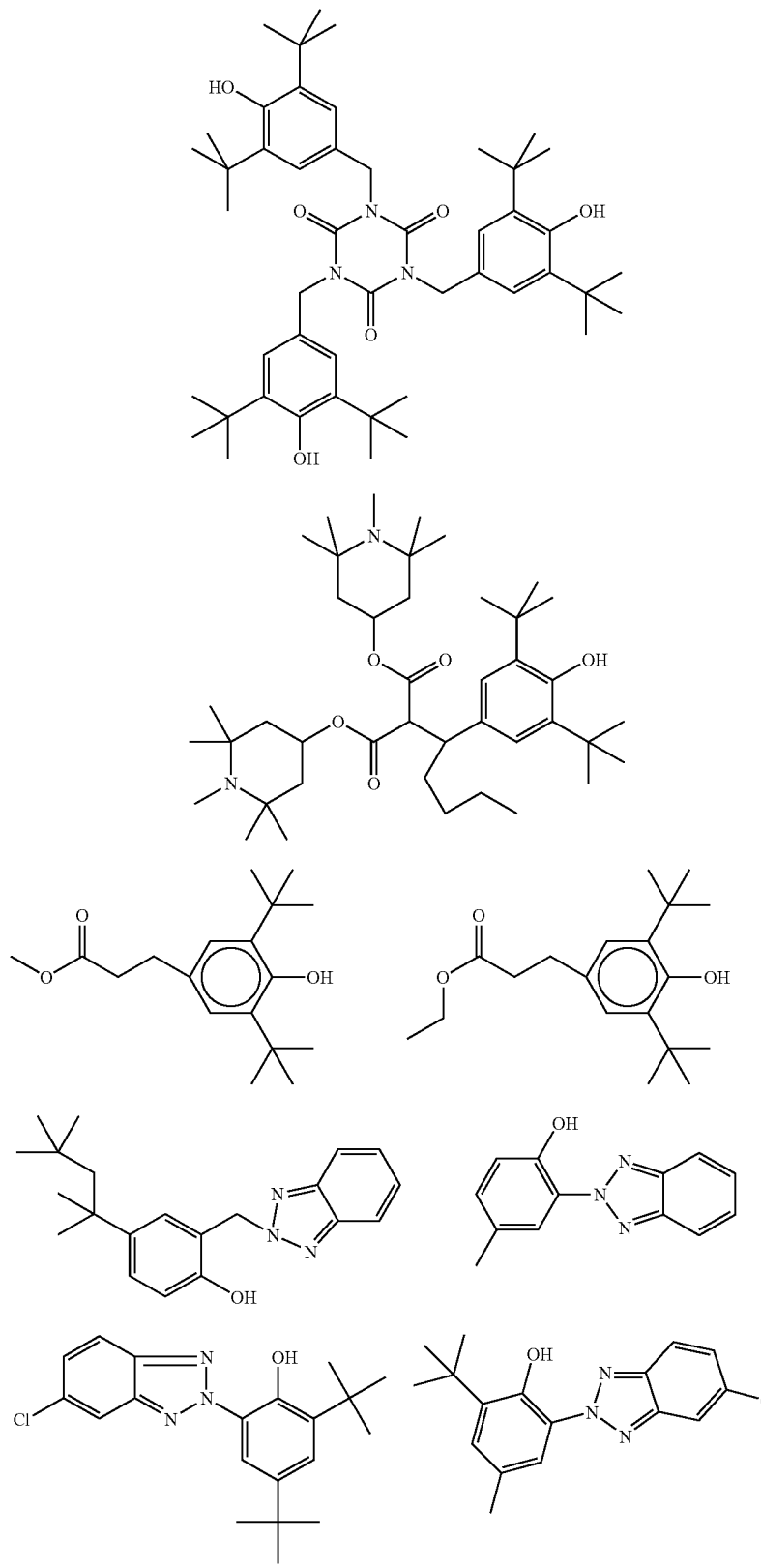

TABLE D-continued
Stabilisers which can be added, for example, to the mixtures according to the invention are mentioned below.
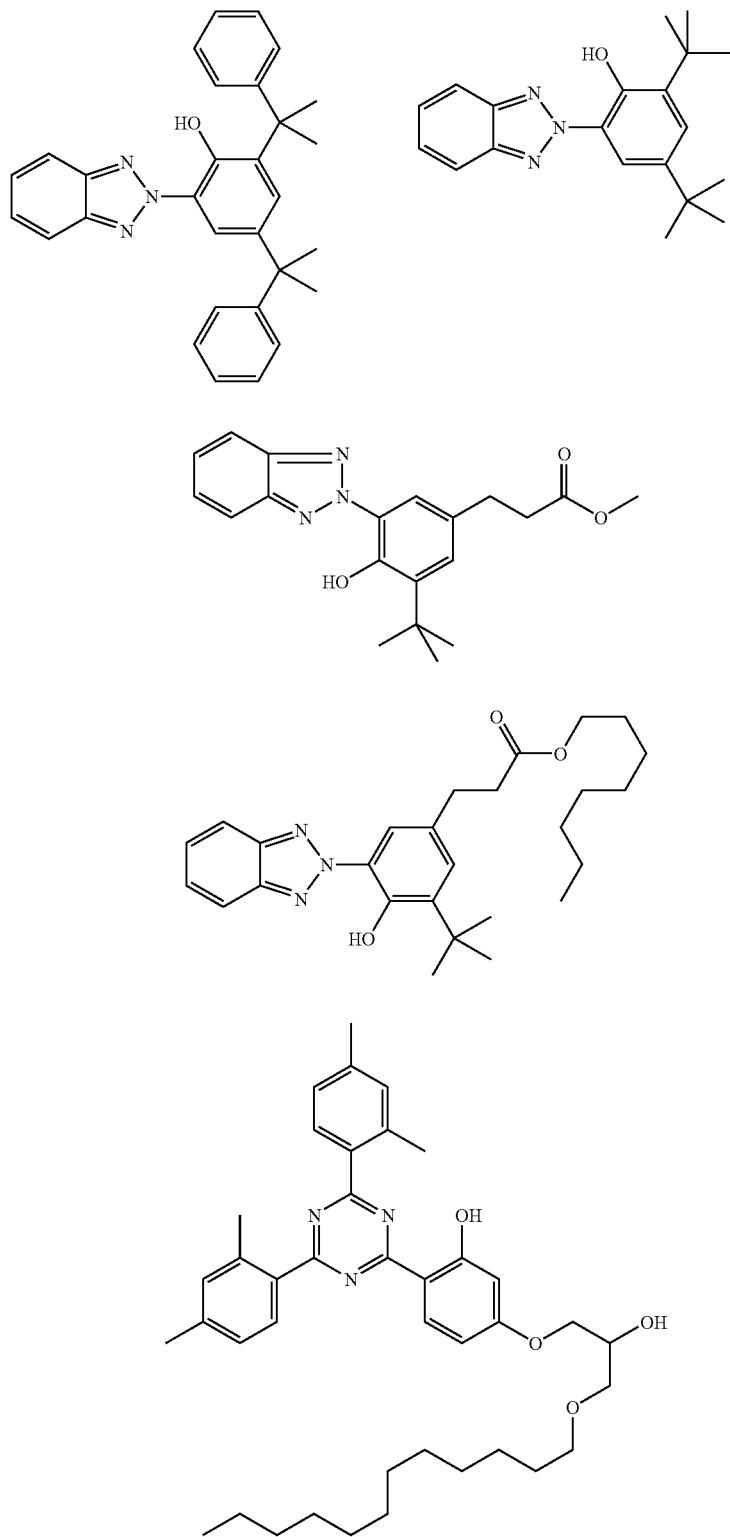

TABLE D-continued

Stabilisers which can be added, for example, to the mixtures according to the invention are mentioned below.

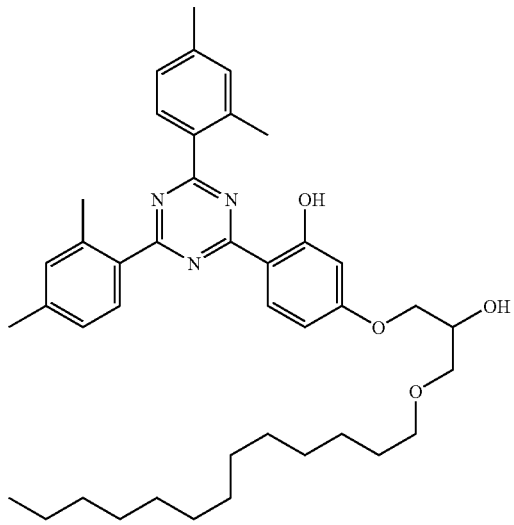

EXAMPLES

The following examples are intended to explain the invention without restricting it. Above and below, percentages are per cent by weight. All temperatures are given in degrees Celsius. m.p. denotes melting point, cl.p. clearing point. Furthermore, C=crystalline state, N=nematic phase, S=smectic phase, I=isotropic phase. $T_{Trans}$=transition temperature from cholesteric to blue phase (BP).

The medium is introduced into a test cell with interdigital electrodes on one substrate only. The thickness of the mesogenic layer in the cell is 10 µm and the distance between the electrodes is 10 µm, the electrode width is 10 µm.

The data between these symbols represent the transition temperatures. An denotes optical anisotropy (589 nm, 20° C.). The flow viscosity $v_{20}$ (mm²/sec) and the rotational viscosity $\gamma_1$ (mPa·s) were each determined at 20° C.

The physical data illustrate which properties can be achieved in which ranges.

The "usable range" is determined by switching times being smaller than 5 msec within this temperature range.

Examples

Example 1

| | | | |
|---|---|---|---|
| AGUQU-2-F | 9.90% | $T_{trans}$ [° C.]: | 12.0 |
| AGUQU-3-F | 4.50% | Blue Phase range [K]: | 10.0 |
| AUUQU-3-F | 11.70% | useable range [K]: | 7.0 |
| AUUQU-3-T | 11.70% | | |
| CUUQU-2-OT | 12.60% | | |
| CUUQU-3-OT | 12.60% | | |
| PUZU-5-F | 10.80% | | |
| PUQU-2-F | 7.20% | | |
| PUQU-3-F | 9.00% | | |
| R-5011 | 5.00% | | |
| IS-11480 | 5.00% | | |

Example 2

| | |
|---|---|
| AUUQU-3-N | 10.00% |
| CUZP-3N.F.F | 9.00% |
| GZU-3A-N | 9.00% |
| AUUQU-3-OT | 10.00% |
| AUUQU-3-F | 9.00% |
| AUUQU-3-T | 8.00% |
| AUUQP-3-T | 4.00% |
| PUZU-3-F | 9.00% |
| PUZU-5-F | 8.00% |
| PUQU-2-F | 9.00% |
| IS-11480 | 10.00% |
| R-5011 | 5.00% |

Example 3

| | | | |
|---|---|---|---|
| AUUQU-3-N | 10.00% | $T_{trans}$ [° C.]: | 73.5 |
| AUZU-3-N | 10.00% | | |
| CUZP-4N.F.F | 9.00% | | |
| GZU-3A-N | 8.00% | | |
| GZU-4A-N | 5.00% | | |
| HP-3N.F | 8.00% | | |
| AUUQU-3-OT | 9.50% | | |
| AUUQU-3-T | 8.00% | | |
| AUUQPU-3-F | 7.00% | | |
| AUUQGU-3-F | 8.00% | | |
| IS-11480 | 12.50% | | |
| R-5011 | 5.00% | | |

Example 4

| | | | |
|---|---|---|---|
| AUUQU-3-N | 10.00% | $T_{trans}$ [° C.]: | 38.0 |
| AUZU-3-N | 10.00% | Blue Phase range [K]: | 13.0 |
| CUZP-4N.F.F | 9.00% | | |

-continued

| | |
|---|---|
| GZU-3A-N | 8.00% |
| HP-3N.F | 8.00% |
| HP-5N.F | 3.00% |
| AUUQU-3-OT | 10.00% |
| AUUQU-3-T | 8.00% |
| AUUQU-3-F | 9.00% |
| AUUQGU-3-F | 8.00% |
| IS-11480 | 10.00% |
| R-5011 | 7.00% |

Example 5

| | | | |
|---|---|---|---|
| AUUQU-3-N | 10.00% | $T_{trans}$ [° C.]: | 66.0 |
| AUZU-3-N | 10.00% | | |
| CUZP-4N.F.F | 9.00% | | |
| GZU-3A-N | 8.00% | | |
| GZU-4A-N | 3.00% | | |
| HP-3N.F | 8.00% | | |
| HP-5N.F | 8.00% | | |
| AUUQU-3-T | 7.00% | | |
| AUUQPU-3-F | 7.00% | | |
| AUUQGU-3-F | 8.00% | | |
| IS-11480 | 15.00% | | |
| R-5011 | 7.00% | | |

Example 6

| | | | |
|---|---|---|---|
| AUUQU-3-N | 10.00% | $T_{trans}$ [° C.]: | 31.0 |
| AUZU-3-N | 10.00% | Blue Phase range [K]: | 16.5 |
| AUZU-5-N | 10.00% | useable range [K]: | 13.0 |
| GZU-3A-N | 8.00% | | |
| HP-3N.F | 6.00% | | |
| AUUQU-3-OT | 10.00% | | |
| AUUQU-3-T | 8.00% | | |
| AUUQU-3-F | 9.00% | | |
| AUUQGU-3-F | 8.00% | | |
| PUZU-3-F | 7.00% | | |
| IS-11480 | 7.00% | | |
| R-5011 | 7.00% | | |

Example 7

| | | | |
|---|---|---|---|
| UZU-4A-N | 6.00% | $T_{trans}$ [° C.]: | −2.5 |
| UZU-5A-N | 6.00% | | |
| GZU-3A-N | 6.00% | | |
| GZU-4A-N | 6.00% | | |
| AUUQU-3-OT | 9.00% | | |
| AUUQU-3-F | 8.00% | | |
| AUUQU-3-T | 8.00% | | |
| AGUQU-3-F | 2.00% | | |
| PUZU-3-F | 8.00% | | |
| PUZU-5-F | 8.00% | | |
| AUZU-3-N | 8.00% | | |
| AUZU-5-N | 8.00% | | |
| IS-11489 | 10.00% | | |
| IS-11663 | 7.00% | | |

Example 8

| | | | |
|---|---|---|---|
| AUUQU-3-N | 10.092% | $T_{trans}$ [° C.]: | 31.0 |
| AUZU-3-N | 10.092% | Blue Phase range [K]: | 17.0 |
| AUZU-5-N | 10.092% | useable range [K]: | 13.0 |
| GZU-3A-N | 8.091% | | |
| HP-3N.F | 6.090% | | |
| AUUQU-3-OT | 10.092% | | |
| AUUQU-3-T | 8.091% | | |
| AUUQU-3-F | 9.135% | | |
| AUUQGU-3-F | 8.091% | | |
| PUZU-3-F | 7.134% | | |
| R-5011 | 8.000% | | |
| IS-11480 | 5.000% | | |

Example 9

| | | | |
|---|---|---|---|
| R-5011 | 9.00% | $T_{trans}$ [° C.]: | 20.6 |
| IS-11480 | 5.00% | Blue Phase range [K]: | 20.0 |
| AUUQU-3-N | 9.98% | useable range [K]: | 15.0 |
| AUZU-3-N | 9.98% | | |
| AUZU-5-N | 9.98% | | |
| GZU-3A-N | 8.00% | | |
| HP-3N.F | 6.02% | | |
| AUUQU-3OT | 9.98% | | |
| AUUQU-3-T | 8.00% | | |
| AUUQU-3-F | 9.03% | | |
| AUUQGU-3-F | 8.00% | | |
| PUZU-3-F | 7.05% | | |

Example 10

| | |
|---|---|
| R-5011 | 9.00% |
| IS-11489 | 5.00% |
| AUUQU-3-N | 9.98% |
| AUZU-3-N | 9.98% |
| AUZU-5-N | 9.98% |
| GZU-3A-N | 8.00% |
| HP-3N.F | 6.02% |
| AUUQU-3-OT | 9.98% |
| AUUQU-3-T | 8.00% |
| AUUQU-3-F | 9.03% |
| AUUQGU-3-F | 8.00% |
| PUZU-3-F | 7.05% |

Example 11

| | |
|---|---|
| AUUQU-3-N | 9.976% |
| AUZU-3-N | 9.976% |
| AUZU-5-N | 9.976% |
| GZU-3A-N | 7.998% |
| HP-3N.F | 6.020% |
| AUUQU-3-OT | 9.976% |
| AUUQU-3-T | 7.998% |
| AUUQU-3-F | 9.030% |
| AUUQGU-3-F | 7.998% |
| PUZU-3-F | 7.052% |
| R-5011 | 2.000% |
| IS-11480 | 12.000% |

Example 12

| | | | |
|---|---|---|---|
| R-5011 | 5.00% | $T_{trans}$ [° C.]: | 22.5 |
| IS-11851 | 10.00% | Blue Phase range [K]: | 6.0 |
| GZU-40-N | 6.80% | | |
| AUUQU-3-N | 10.20% | | |
| AUZU-3-N | 10.20% | | |
| CUZP-4N.F.F | 10.20% | | |
| GZU-3A-N | 8.50% | | |
| GZU-4A-N | 8.50% | | |
| HP-3N.F | 3.40% | | |
| HP-5N.F | 3.40% | | |
| AUUQU-3-T | 6.80% | | |
| AUUQPU-3-F | 5.10% | | |
| AUUQGU-3-F | 5.10% | | |
| UZU-3A-N | 6.80% | | |

The invention claimed is:

1. A liquid-crystalline medium, comprising
   a) 1-25% by weight of a component A containing at least one compound of formula I

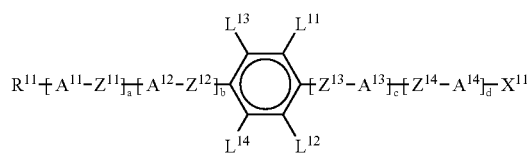

wherein a, b, c and d are, each independently of each other, 0, 1 or 2, wherein $a+b+c+d \leq 4$;

$R^{11}$ is an alkyl or alkoxy radical having 1 to 15 carbon atoms, wherein one or more methylene groups of said alkyl or alkoxy radical may be replaced independently of each other by —O—, —S—, —SiR$^x$R$^y$—, —CH═CH—, —C≡C—, —CO—O— and/or —O—CO— in such a way that oxygen and/or sulfur atoms are not linked directly to each other, said alkyl or alkoxy radical being unsubstituted or mono-substituted with a —CN group or mono- or poly-substituted with halogen;

$L^{11}$, $L^{12}$, $L^{13}$ and $L^{14}$ are, each independently of each other, hydrogen, halogen, a CN group, an alkyl or alkoxy radical having 1 to 15 carbon atoms, wherein one or more methylene groups of said alkyl or alkoxy radical may be replaced independently of each other by —O—, —S—, —SiR$^x$R$^y$—, —CH═CH—, —C≡C—, —CO—O— and/or —O—CO— in such a way that oxygen and/or sulfur atoms are not linked directly to each other, said alkyl or alkoxy radical being unsubstituted or mono-substituted with a —CN group or mono- or poly-substituted with halogen, with the proviso that at least one of $L^{11}$, $L^{12}$, $L^{13}$ and $L^{14}$ is alkoxy;

$X^{11}$ is halogen, —CN, —NCS, —SF$_5$, S—R$^z$, —SO$_2$— R$^z$ an alkyl or alkoxy radical having 1 to 15 carbon atoms, wherein one or more methylene groups of said alkyl or alkoxy radical may be replaced independently of each other by —O—, —S—, —SiR$^x$R$^y$—, —CH═CH—, —C≡C—, —CO—O— and/or —O—CO— in such a way that oxygen and/or sulfur atoms are not linked directly to each other, said alkyl or alkoxy radical being unsubstituted or mono-substituted with a —CN group or mono- or poly-substituted with halogen;

$R^x$ and $R^y$ are, each independently of each other, hydrogen or an alkyl radical having 1 to 7 carbon atoms;

$R^z$ is an alkyl radical having 1 to 7 carbon atoms, said alkyl radical being unsubstituted or mono- or poly-substituted with halogen;

$A^{11}$, $A^{12}$, $A^{13}$ and $A^{14}$ are, each independently of each other, one of the following

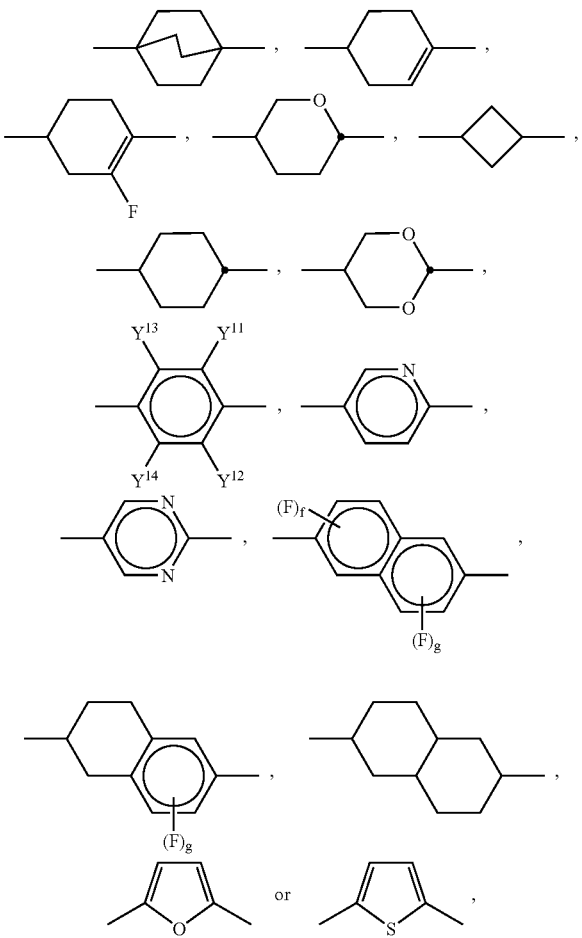

wherein each of $A^{11}$, $A^{12}$, $A^{13}$ and $A^{14}$ may be the same ring or two different rings if present twice;

$Y^{11}$, $Y^{12}$, $Y^{13}$ and $Y^{14}$ are, each independently of each other, hydrogen, halogen, CN, an alkyl or alkoxy radical having 1 to 15 carbon atoms, wherein one or more methylene groups of said alkyl or alkoxy radical may be replaced independently of each other by —O—, —S—, —SiR$^x$R$^y$—, —CH═CH—, —C≡C—, —CO—O— and/or —O—CO— in such a way that oxygen and/or sulfur atoms are not linked directly to each other, said alkyl or alkoxy radical being unsubstituted or mono- or poly-substituted with halogen;

f, g and h are, each independently of each other, 0, 1, 2 or 3;

$Z^{11}$, $Z^{12}$, $Z^{13}$ and $Z^{14}$ are, independently of each other, a single bond, —(CH$_2$)$_4$—, —CH$_2$CH$_2$—, —CF$_2$— CF$_2$—, —CF$_2$—CH$_2$—, —CH$_2$—CF$_2$—, —CH═CH—, —CF═CF—, —CF═CH—, —(CH$_2$)$_3$ O—, —O(CH$_2$)$_3$—, —CH=CF—, —C≡C—, —CH$_2$O—, —OCH$_2$—, —CF$_2$O—, —OCF$_2$—, —CO—O— or —O—CO—, wherein each of Z$^{11}$, Z$^{12}$, Z$^{13}$ and Z$^{14}$ may have the same or a different meaning if present twice;

b) 5-80% by weight of a component B containing at least one compound of formula II

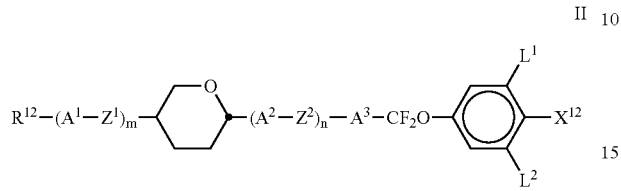

II wherein

R$^{12}$ is an alkyl or alkoxy radical having 1 to 15 carbon atoms, wherein one or more methylene groups of said alkyl or alkoxy radical may be replaced independently of each other by —O—, —S—, —SiR$^x$R$^y$—, —CH=CH—, —C≡C—, —CO—O— and/or —O—CO— in such a way that oxygen and/or sulfur atoms are not linked directly to each other, said alkyl or alkoxy radical being unsubstituted or mono-substituted with a —CN group or mono- or poly-substituted with halogen;

A$^1$, A$^2$, A$^3$ are, each independently of each other, one of the following

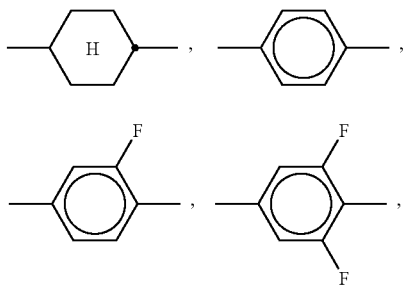

-continued

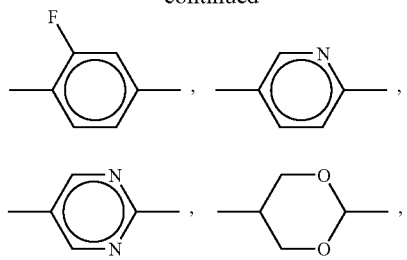

Z$^1$ and Z$^2$ are, independently of each other, a single bond, —(CH$_2$)$_4$—, —CH$_2$CH$_2$—, —CF$_2$—CF$_2$—, —CF$_2$—CH$_2$—, —CH$_2$—CF$_2$—, —CH=CH—, —CF=CF—, —CF=CH—, —(CH$_2$)$_3$O—, —O(CH$_2$)$_3$—, —CH=CF—, —C≡C—, —CH$_2$O—, —OCH$_2$—, —CF$_2$O—, —OCF$_2$—, —CO—O— or —O—CO—, wherein each of Z$^{11}$, Z$^{12}$, Z$^{13}$ and Z$^{14}$ may have the same or a different meaning if present twice;

X$^{12}$ is halogen, —CN, —NCS, —SF$_5$, —SO$_2$CF$_3$, alkyl, alkenyl, alkenyloxy or alkylalkoxy or alkoxy radical each mono- or polysubstituted by CN and/or halogen;

L$^1$ and L$^2$ are, each independently of each other, H or F; and m and n are, each independently of each other, 0, 1, or 2, wherein m+n≦2;

and c) optionally 1-20% by weight of component C containing at least one chiral compound with an absolute value of HTP of ≧20 μm$^{-1}$.

2. A liquid-crystalline medium according to claim 1, comprising one or more compounds of formula I wherein at least three of L$^{11}$ to L$^{14}$ are alkoxy.

3. A liquid-crystalline medium according to claim 2, comprising one or more compounds of formula I wherein at least two of L$^{11}$ to L$^{14}$ are alkoxy.

4. A liquid-crystalline medium according to claim 1, comprising 1-20% of component C.

5. A liquid-crystalline medium according to claim 1 comprising one, two or more compounds of formulae II-1 to II-8:

II-1

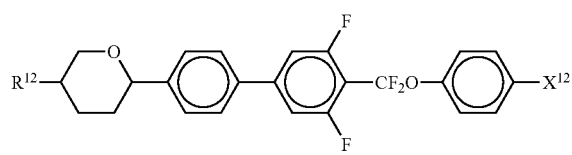

II-2

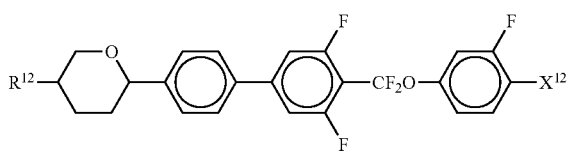

II-3

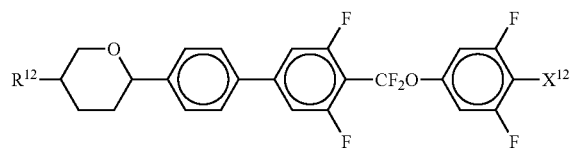

II-4

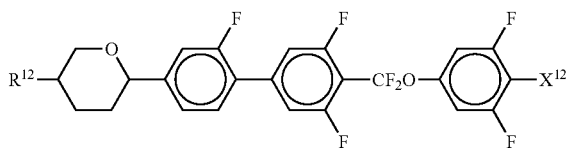

-continued

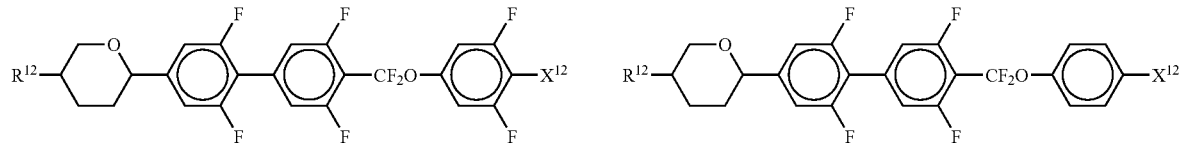
II-5, II-6

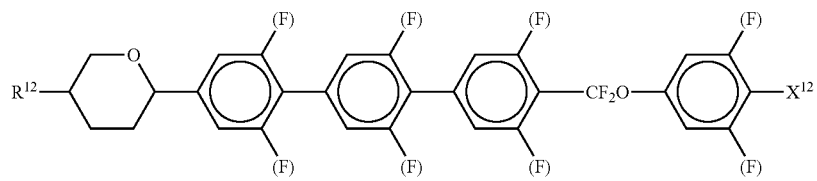
II-7

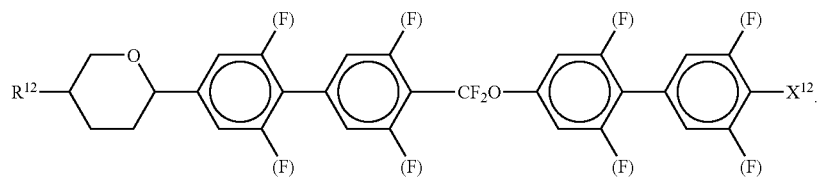
II-8

6. An electro-optical device, which contains a liquid crystal medium according to claim 1.

7. An electro-optical device according to claim 6, which is operated or is operable in an optically isotropic state.

8. A liquid-crystalline medium according to claim 5, which comprises two or more compounds of formulae II-1 to II-8.

9. A liquid-crystalline medium according to claim 1, which exhibits a blue phase.

10. A liquid-crystalline medium according to claim 1, which comprises one or more of the following compounds

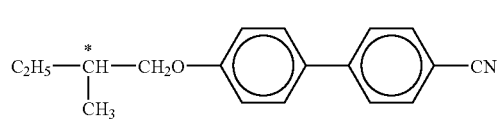
C 15

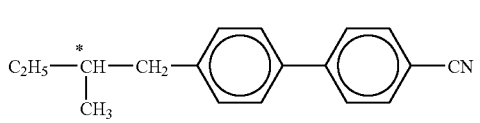
CB 15

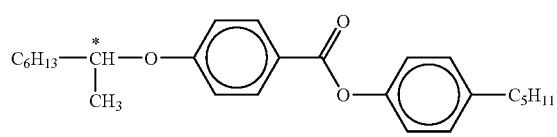
CM 21

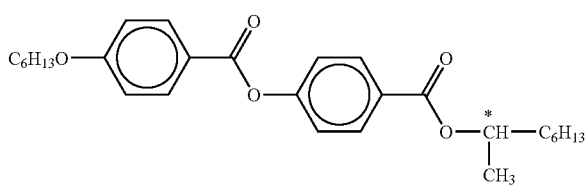
R/S-811

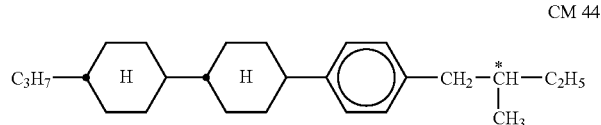
CM 44

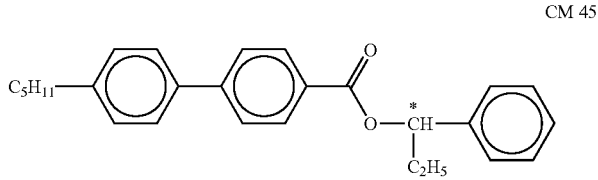
CM 45

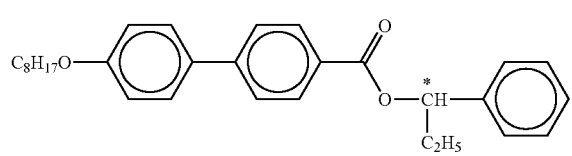
CM 47

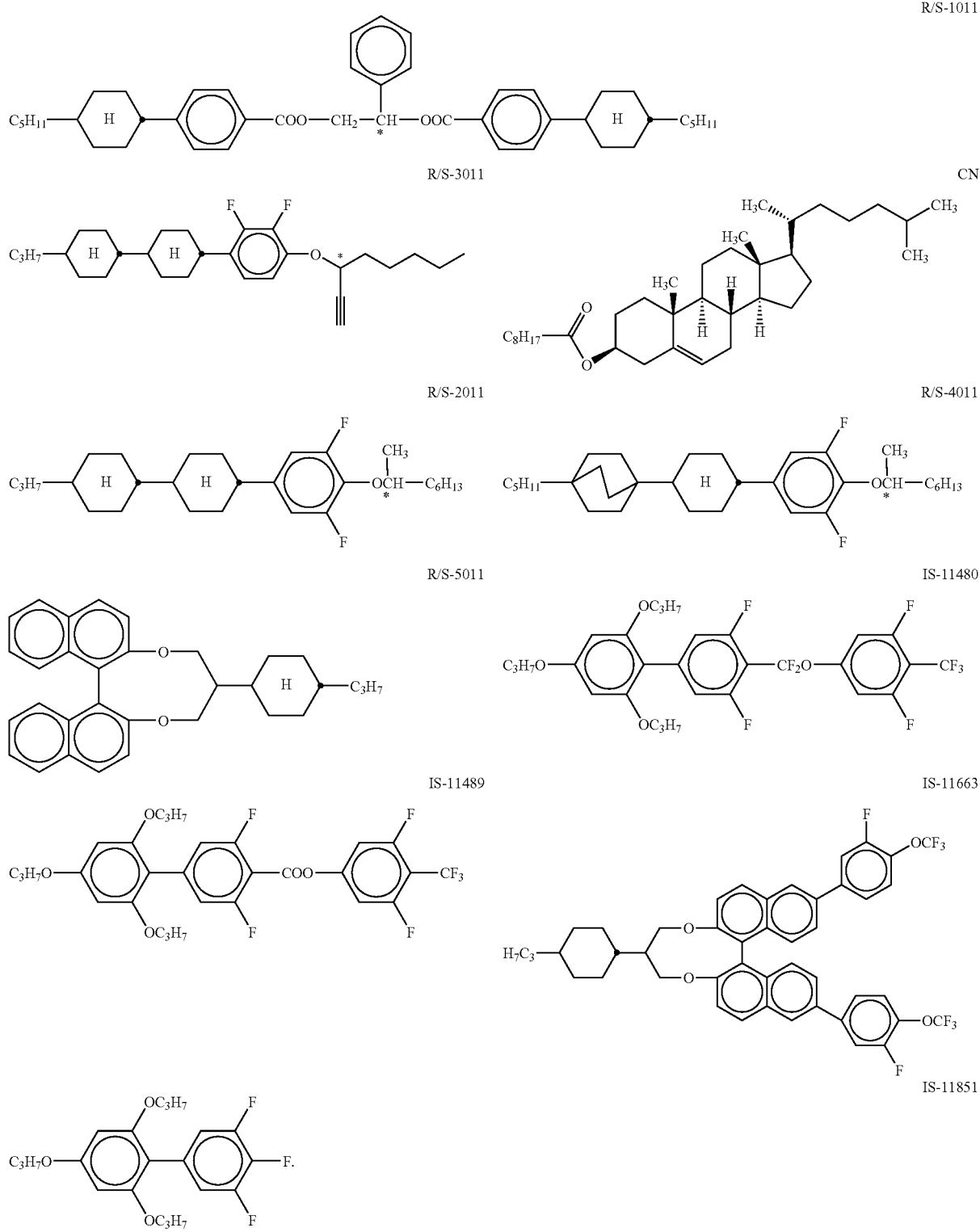

11. A liquid-crystalline medium according to claim 1, which contains compounds of formula I which contain thee alkoxy groups.

12. A liquid-crystalline medium according to claim 10, which exhibits a blue phase.

13. A liquid-crystalline medium according to claim 11, which exhibits a blue phase.

14. A liquid-crystalline medium according to claim 1, which comprises one or more of the following compounds

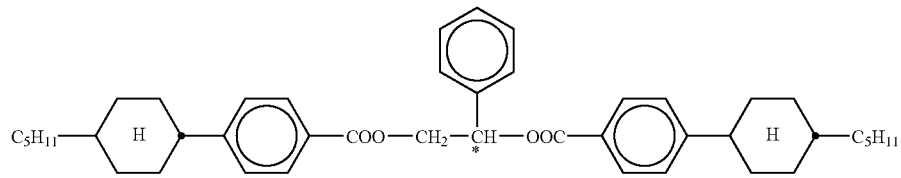 R/S-1011

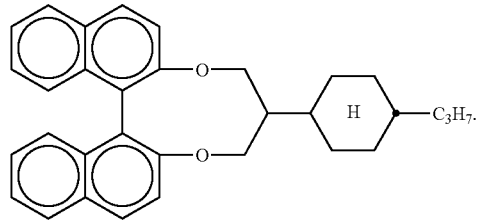 R/S-5011

15. A liquid-crystalline medium according to claim 1, wherein in the compound of formula I, the values for a, b, c and d are such that $1 \leq a+b+c+d \leq 4$.

16. A liquid-crystalline medium according to claim 1, wherein in the compound of formula I, the values for a, b, c and d are such that $2 \leq a+b+c+d \leq 3$.

17. A liquid-crystalline medium according to claim 14, which exhibits a blue phase.

18. A liquid-crystalline medium according to claim 15, which exhibits a blue phase.

19. A liquid-crystalline medium according to claim 3, which exhibits a blue phase.

20. An electro-optical device, which contains a liquid crystal medium according to claim 19.

* * * * *

UNITED STATES PATENT AND TRADEMARK OFFICE
CERTIFICATE OF CORRECTION

PATENT NO. : 7,419,706 B2  Page 1 of 1
APPLICATION NO. : 10/569460
DATED : September 2, 2008
INVENTOR(S) : Michael Heckmeier It is certified that error appears in the above-identified patent and that said Letters Patent is hereby corrected as shown below:

Column 140, line 44, reads " 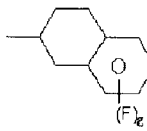 " should read

-- 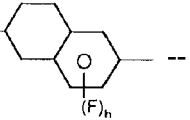 --

Signed and Sealed this

Twentieth Day of January, 2009

JON W. DUDAS
*Director of the United States Patent and Trademark Office*